US009295089B2

(12) United States Patent  
Chitrapu et al.

(10) Patent No.: US 9,295,089 B2  
(45) Date of Patent: Mar. 22, 2016

(54) BANDWIDTH MANAGEMENT, AGGREGATION AND INTERNET PROTOCOL FLOW MOBILITY ACROSS MULTIPLE-ACCESS TECHNOLOGIES

(75) Inventors: Prabhakar Chitrapu, Blue Bell, PA (US); Kushanava Laha, Haryana (IN); John Tomici, Southold, NY (US); John Cartmell, Lynbrook, NY (US); Kenneth Lynch, Wayne, PA (US); Alexander Reznik, Titusville, NJ (US); Oscar Lopez-Torres, San Antonio, TX (US); Chunxuan Ye, Wayne, PA (US); Dale Seed, Allentown, PA (US); Michelle Perras, Montreal (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

(21) Appl. No.: 13/820,724

(22) PCT Filed: Sep. 6, 2011

(86) PCT No.: PCT/US2011/050577  
§ 371 (c)(1),  
(2), (4) Date: Feb. 12, 2014

(87) PCT Pub. No.: WO2012/033774  
PCT Pub. Date: Mar. 15, 2012

(65) Prior Publication Data  
US 2014/0161055 A1 Jun. 12, 2014

Related U.S. Application Data

(60) Provisional application No. 61/380,527, filed on Sep. 7, 2010, provisional application No. 61/475,023, filed on Apr. 13, 2011, provisional application No. 61/514,895, filed on Aug. 3, 2011.

(51) Int. Cl.  
*H04W 36/08* (2009.01)  
*H04W 76/02* (2009.01)  
(Continued)

(52) U.S. Cl.  
CPC ............ *H04W 76/022* (2013.01); *H04W 28/08* (2013.01); *H04W 36/08* (2013.01);  
(Continued)

(58) Field of Classification Search  
CPC . H04W 28/0215; H04W 76/02; H04W 48/18; H04W 24/10; H04W 36/0027; H04W 72/00; H04W 36/14; H04W 72/12; H04W 36/08; H04W 36/22; H04W 88/16; H04W 88/04; H04W 76/025; H04W 60/005; H04W 76/022; H04W 48/20; H04W 4/18; H04W 28/08; H04W 84/045; H04W 88/06; H04W 8/082; H04W 36/0033; H04W 76/04; H04W 36/28; H04W 92/02; H04W 12/08; H04W 80/04; H04L 5/0035; H04L 47/40; H04L 47/2441; H04L 67/14; H04L 69/08; H04L 12/66  
USPC ............. 370/235, 254, 328, 329, 395.2, 468, 370/420, 332, 331, 401, 389; 455/434, 455/436–444, 411, 461, 73; 713/171, 172; 709/220, 246  
See application file for complete search history.

(56) References Cited

U.S. PATENT DOCUMENTS 6,937,566 B1 8/2005 Forslow  
7,324,553 B1 1/2008 Varier et al.  
(Continued)

FOREIGN PATENT DOCUMENTS

EP 2 170 002 3/2010  
EP 2 192 799 6/2010  
(Continued)

OTHER PUBLICATIONS

"3rd Generation Partnership Project: Technical Specification Group Services and System Aspects; Multi access PDN connectivity and IP flow Mobility (Release 9)", 3GPP TR 23.861 V1.23.0, Sep. 2009, 51 Pages.*

(Continued)

*Primary Examiner* — Edan Orgad  
*Assistant Examiner* — Ivan O Latorre  
(74) *Attorney, Agent, or Firm* — Julian F. Santos

(57) ABSTRACT

Systems, apparatuses and methods for bandwidth management, aggregation and internet protocol ("IP") flow mobility ("IFOM") across multiple-access technologies are provided. Included is a method that includes selecting, from a packet data network ("PDN") connection formed through a plurality of access systems communicatively coupled with a wireless transmit and/or receive unit ("WTRU"), an access system over which to transport a flow of internet protocol ("IP") traffic to and/or from the WTRU. The method may also include sending, to the WTRU, a request to associate the flow of IP traffic with the selected access system.

23 Claims, 33 Drawing Sheets

(51) Int. Cl.
*H04W 72/12* (2009.01)
*H04W 28/08* (2009.01)
*H04W 88/06* (2009.01)
*H04W 36/28* (2009.01)
*H04W 88/16* (2009.01)
*H04W 48/18* (2009.01)
*H04L 29/06* (2006.01)
*H04W 24/10* (2009.01)
*H04W 36/00* (2009.01)
*H04W 36/14* (2009.01)
*H04W 72/00* (2009.01)

(52) U.S. Cl.
CPC ............. *H04W 36/28* (2013.01); *H04W 48/18* (2013.01); *H04W 72/12* (2013.01); *H04W 88/06* (2013.01); *H04W 88/16* (2013.01); *H04L 69/08* (2013.01); *H04W 24/10* (2013.01); *H04W 36/0027* (2013.01); *H04W 36/14* (2013.01); *H04W 72/00* (2013.01)

(56) References Cited

U.S. PATENT DOCUMENTS

| | | | |
|---|---|---|---|
| 8,130,655 | B2 | 3/2012 | Foottit et al. |
| 8,416,690 | B2 | 4/2013 | Zhao et al. |
| 8,681,739 | B1 * | 3/2014 | Zhao et al. .................... 370/331 |
| 2002/0114305 | A1 | 8/2002 | Oyama et al. |
| 2004/0166835 | A1 | 8/2004 | Johansson et al. |
| 2004/0205752 | A1 | 10/2004 | Chou et al. |
| 2004/0215828 | A1 * | 10/2004 | Li et al. ........................ 709/246 |
| 2005/0058131 | A1 * | 3/2005 | Samuels et al. ............... 370/389 |
| 2007/0097926 | A1 | 5/2007 | Liu et al. |
| 2008/0020775 | A1 | 1/2008 | Willars |
| 2008/0212583 | A1 | 9/2008 | Rey et al. |
| 2008/0214189 | A1 * | 9/2008 | Taaghol ...................... 455/432.2 |
| 2009/0069025 | A1 | 3/2009 | Pischella |
| 2009/0279522 | A1 * | 11/2009 | Leroy et al. .................... 370/338 |
| 2010/0034089 | A1 | 2/2010 | Kovvali et al. |
| 2010/0067400 | A1 | 3/2010 | Dolganow et al. |
| 2010/0080172 | A1 * | 4/2010 | Jin et al. ........................ 370/328 |
| 2010/0208698 | A1 | 8/2010 | Lu et al. |
| 2010/0208706 | A1 | 8/2010 | Hirano et al. |
| 2010/0216462 | A1 * | 8/2010 | Aso et al. ...................... 455/434 |
| 2011/0038304 | A1 | 2/2011 | Lin et al. |
| 2011/0055572 | A1 * | 3/2011 | Vogt et al. .................... 713/171 |
| 2011/0090794 | A1 * | 4/2011 | Cherian et al. ................ 370/235 |
| 2011/0103260 | A1 * | 5/2011 | Jeyatharan et al. ........... 370/254 |
| 2011/0158171 | A1 * | 6/2011 | Centonza et al. ............. 370/328 |
| 2011/0170408 | A1 | 7/2011 | Furbeck et al. |
| 2011/0170410 | A1 | 7/2011 | Zhao et al. |
| 2011/0170517 | A1 * | 7/2011 | Bakker et al. ................. 370/331 |
| 2011/0194535 | A1 | 8/2011 | Johansson et al. |
| 2011/0280130 | A1 | 11/2011 | Foottit et al. |
| 2012/0044804 | A1 | 2/2012 | Rahman et al. |
| 2012/0079559 | A1 | 3/2012 | Reznik et al. |
| 2012/0178416 | A1 * | 7/2012 | Miklos et al. ................. 455/410 |
| 2012/0188895 | A1 * | 7/2012 | Punz et al. .................... 370/252 |
| 2012/0201137 | A1 | 8/2012 | Le Faucheur et al. |
| 2012/0324100 | A1 | 12/2012 | Tomici et al. |
| 2012/0327779 | A1 | 12/2012 | Gell et al. |
| 2013/0028193 | A1 * | 1/2013 | Rommer et al. .............. 370/328 |
| 2013/0058275 | A1 * | 3/2013 | Melia et al. ................... 370/328 |
| 2013/0121206 | A1 * | 5/2013 | Tur nyi et al. ................. 370/254 |
| 2014/0126362 | A1 | 5/2014 | Ogura |

FOREIGN PATENT DOCUMENTS

| | | |
|---|---|---|
| WO | WO-2004/084500 | 9/2004 |
| WO | WO-2010/022374 | 2/2010 |
| WO | WO-2010/072652 A1 | 7/2010 |
| WO | WO-2010/080966 | 7/2010 |
| WO | WO-2010/102652 | 9/2010 |
| WO | WO-2010/121191 | 10/2010 |
| WO | WO-2011/069096 A2 | 6/2011 |
| WO | WO-2012/018824 | 2/2012 |

OTHER PUBLICATIONS

"3rd Generation Partnership Project; Technical Specification Group Core Network and Terminals; Access to the 3GPP Evolved Packet Core (EPC)", 3GPP TS 24.302 10.3.1, Apr. 2011, 57 pages.

"3rd Generation Partnership Project; Technical Specification Group Core Network and Terminals; User Data Convergence (UDC); Technical realization and information flows; Stage 2 (Release 10)", 3GPP TS 23.335 V10.0.0, Mar. 2011, 39 pages.

"3rd Generation Partnership Project; Technical Specification Group Services and System Aspects ; IP flow mobility and seamless Wireless Local Area Network (WLAN) offload; Stage 2 (Release 10)", 3GPP TS 23.261 v10 .0.0, Jun. 10, 2010, 20 pages.

"3rd Generation Partnership Project; Technical Specification Group Services and System Aspects; Architecture enhancements for non-3GPP accesses (Release 10)", 3GPP TS 23.402 V10.3.0, Mar. 2011, 227 pages.

"3rd Generation Partnership Project; Technical Specification Group Services and System Aspects; IP flow mobility and seamless Wireless Local Area Network (WLAN) offload; Stage 2 (Release 10)", 3GPP TS 23.261 V10.1.0, Sep. 2010, 22 pages.

"3rd Generation Partnership Project; Technical Specification Group Services and System Aspects; Multi access PDN connectivity and IP flow mobility (Release 9)", 3GPP TR 23.861 1.3.0, Sep. 2009, 49 pages.

"3rd Generation Partnership Project; Technical Specification Group Services and System Aspects; Policy and charging control architecture (Release 11)", 3GPP TS 23.203 V11.1.0, Mar. 2011, 136 pages.

"3rd Generation Partnership Project; Technical Specification Group Services and System Aspects; Study on Policy solutions and enhancements (Release 10)", 3GPP TR 23.813 V0.5.0, Feb. 2011, 40 pages.

"International Search Report and Written Opinion of the International Searching Authority", International Patent Application No. PCT/US2011/050577, 18 pages.

"International Search Report and Written Opinion of the International Searching Authority", International Application No. PCT/US2012/033560, Jul. 19, 2012, 14 pages.

"Invitation to Pay Additional Fees and Communication Relating to the Results of the Partial International Search", PCT Form 206, International Application No. PCT/US2011/050577, Jan. 19, 2012, 6 pages.

U.S. Appl. No. 12/684,227.

U.S. Appl. No. 13/446,685.

Alcatel-Lucent, "Policy based terminal triggered, ANDSF decided access selection", 3GPP TSG SA WG2 Architecture—S2#63, S2-081658, Athens, Greece, Feb. 18, 2008, 6 pages.

Mark, et al., "A Multipath Flow Routing Approach for Increasing Throughput in the Internet", George Mason University, Dept. of Electrical and Computer Engineering, Aug. 2007, 4 pages.

Sklower, "The PPP Multilink Protocol (MP)", IETF Network Working Group, Aug. 1996, 23 pages.

Tansir, et al., "Multi Access Data Network Connectivity and IP Flow Mobility in Evolved Packet System (EPS)", Wireless Communications and Networking Conference (WCNC), 2010 IEEE, Piscataway, NJ; USA, Apr. 18, 2010, 6 pages.

"3rd Generation Partnership Project 2; cdma2000 Packet Data Services; Wireless Local Area Network (WLAN) Interworking Access to Operator Service and Mobility", 3GPP2 TS X.S0028-200-0 V1.0, Mar. 2007, 56 pages.

"3rd Generation Partnership Project; Technical Specification Group Core Network and Terminals; Proxy Mobile IPv6 (PMIPv6) based Mobility and Tunnelling protocols; Stage 3 (Release 10)", 3GPP TS 29.275 V10.2.0, Jun. 2011, 72 pages.

"3rd Generation Partnership Project; Technical Specification Group Core Network and Terminals; Proxy Mobile IPv6 (PMIPv6) based Mobility and Tunnelling protocols; Stage 3 (Release 9)", 3GPP TS 29.275 V9.5.0, Jun. 2011, 71 pages.

(56) References Cited

OTHER PUBLICATIONS

"3rd Generation Partnership Project; Technical Specification Group Core Network and Terminals; Proxy Mobile IPv6 (PMIPv6) based Mobility and Tunnelling protocols; Stage 3 (Release 9)", 3GPP TS 29.275 V9.2.0, Jun. 2010, 74 pages.

"3rd Generation Partnership Project; Technical Specification Group Services and System Aspects; 3GPP system to Wireless Local Area Network (WLAN) interworking; System description (Release 9)", 3GPP TS 23.234 V9.0.0, Dec. 2009, 84 pages.

"3rd Generation Partnership Project; Technical Specification Group Services and System Aspects; Architecture enhancements for non-3GPP accesses (Release 10)", 3GPP TS 23.402 V10.1.0, Sep. 2010, 227 pages.

"3rd Generation Partnership Project; Technical Specification Group Services and System Aspects; Architecture enhancements for non-3GPP accesses (Release 9)", 3GPP TS 23.402 V9.5.0, Jun. 2010, 200 pages.

"3rd Generation Partnership Project; Technical Specification Group Services and System Aspects; Feasibility study on 3GPP system to Wireless Local Area Network (WLAN) interworking (Release 9)", 3GPP TR 22.934 V9.0.0, Dec. 2009, 30 pages.

"3rd Generation Partnership Project; Technical Specification Group Services and System Aspects; Feasibility study on 3GPP system to Wireless Local Area Network (WLAN) interworking (Release 9)", 3GPP TR 22.934 V9.1.0, Sep. 2010, 30 pages.

"3rd Generation Partnership Project; Technical Specification Group Services and System Aspects; General Packet Radio Service (GPRS) enhancements for Evolved Universal Terrestrial Radio Access Network (E-UTRAN) access (Release 10)", 3GPP TS 23.401 V10.0.0, Jun. 2010, 261 pages.

"3rd Generation Partnership Project; Technical Specification Group Services and System Aspects; General Packet Radio Service (GPRS) enhancements for Evolved Universal Terrestrial Radio Access Network (E-UTRAN) access (Release 9)", 3GPP TS 23.401 V9.5.0, Jun. 2010, 259 pages.

"3rd Generation Partnership Project; Technical Specification Group Services and System Aspects; General Packet Radio Service (GPRS); Service description; Stage 2 (Release 9)", 3GPP TS 23.060 V9.5.0, Jun. 2010, 298 pages.

"3rd Generation Partnership Project; Technical Specification Group Services and System Aspects; IP Flow Mobility and seamless WLAN offload; Stage 2 (Release 10)", 3GPP TS 23.261 V0.3.0, Mar. 2010, 20 pages.

"3rd Generation Partnership Project; Technical Specification Group Services and System Aspects; Mobility between 3GPP-Wireless Local Area Network (WLAN) interworking and 3GPP systems (Release 10)", 3GPP TS 23.327 V10.0.0, Mar. 2011, 27 pages.

"3rd Generation Partnership Project; Technical Specification Group Services and System Aspects; Mobility between 3GPP-Wireless Local Area Network (WLAN) interworking and 3GPP systems (Release 9)", 3GPP TS 23.327 V9.0.0, Dec. 2009, 27 pages.

"3rd Generation Partnership Project; Technical Specification Group Services and System Aspects; Policy and charging control architecture (Release 10)", 3GPP TS 23.203 V10.0.0, Jun. 2010, 126 pages.

"3rd Generation Partnership Project; Technical Specification Group Services and System Aspects; Policy and charging control architecture (Release 9)", 3GPP TS 23.203 V9.5.0, Jun. 2010, 123 pages.

"Email Thread Re: [MEXT] Text for Binding Update Race condition issue", Mobile IPv6 Extensions, Apr. 6, 2009, 5 pages.

Bernardos, C.J., "Proxy Mobile IPv6 Extensions to Support Flow Mobility", draft-bernardos-netext-pmipv6-flowmob-03 (work in progress), Mar. 14, 2011, 20 pages.

China Mobile, et al., "Policy control based on network condition", 3GPP Tdoc S2-105228, 3GPP TSG WG2 Meeting #81, Prague, Czech Republic, Oct. 11-15, 2010, 4 pages.

Johnson, D., et al., "Mobility Support in IPv6", RFC 3775, Jun. 2004, 165 pages.

LG Electronics, "Traffic steering across multiple PDN connections over 3GPP access", 3GPP Tdoc S2-105026, 3GPP TSG SA WG2 Meeting # 81 Prague, Czech Republic, Oct. 11-15, 2010, 5 Pages.

Melia, T., "Logical Interface Support for multi-mode IP Hosts", draft-melia-netext-logical-interface-support-01, Jul. 5, 2010, 20 pages.

Soliman, H., et al., "Flow Bindings in Mobile IPv6 and NEMO Basic Support", draft-ieff-mext-flow-binding-01 (work in progress), Feb. 13, 2009, 31 pages.

Soliman, H., et al., "Flow Bindings in Mobile IPv6 and NEMO Basic Support", draft-ieff-mext-flow-binding-04 (work in progress), Nov. 9, 2009, 37 pages.

Soliman, H., et al., "Flow Bindings in Mobile IPv6 and NEMO Basic Support", draft-ieff-mext-flow-binding-06 (work in progress), Mar. 1, 2010, 39 pages.

Soliman, H., "Mobile IPv6 Support for Dual Stack Hosts and Routers", RFC 5555, Jun. 2009, 41 pages.

Tsirtsis, G., et al., "Traffic Selectors for Flow Bindings", draft-ieff-mext-binary-ts-02 (work in progress), Dec. 16, 2009, 18 Pages.

Tsirtsis, G., et al., "Traffic Selectors for Flow Bindings", draft-ieff-mext-binary-ts-04 (work in progress), Feb. 26, 2010, 19 pages.

Wakikawa, Ryuji, et al., "Multiple Care-of Addresses Registration", RFC 5648, Oct. 2009, 36 pages.

"3rd Generation Partnership Project; Technical Specification Group Core Network and Terminals; Policy and Charging Control over Gx/Sd reference point (Release 11)", 3GPP TS 29.212 V11.1.0, Jun. 2011, 152 pages.

"3rd Generation Partnership Project; Technical Specification Group Services and System Aspects; Policy and charging control architecture (Release 11)", 3GPP TS 23.203 V11.3.0, Sep. 2011, 167 pages.

"3rd Generation Partnership Project; Technical Specification Group Core Network and Terminals; Access Network Discovery and Selection Function (ANDSF) Management Object (MO) (Release 10)", 3GPP TS 24.312 10.2.1, Apr. 2011, 153 pages.

"3rd Generation Partnership Project; Technical Specification Group Core Network and Terminals; Access Network Discovery and Selection Function (ANDSF); Management Object (MO); Release 10", 3GPP TS 24.312 V10.3.0, Jun. 2011, 155 pages.

"3rd Generation Partnership Project; Technical Specification Group Core Network and Terminals; Access to the 3GPP Evolved Packet Core (EPC) via non-3GPP access networks; Stage 3 (Release 8)", 3GPP TS 24.302 V8.10.0, Sep. 2011, 50 pages.

"3rd Generation Partnership Project; Technical Specification Group Core Network and Terminals; Access to the 3GPP Evolved Packet Core (EPC) via non-3GPP access networks; Stage 3 (Release 9)", 3GPP TS 24.302 V9.7.0, Sep. 2011, 53 pages.

"3rd Generation Partnership Project; Technical Specification Group Core Network and Terminals; Access to the 3GPPEvolved Package Core (EPC) via non-3GPP access networks; Stage 3 (Release 10)", 3GPP TS 24.302 V10.4.0, Jun. 2011, 58 pages.

"3rd Generation Partnership Project; Technical Specification Group Core Network and Terminals; IP multimedia call control protocol based on Session Initiation Protocol (SIP) and Session Description Protocol (SDP); Stage 3 (Release 10)", 3GPP TS 24.229 V10.3.0, Mar. 2011, 702 pages.

"3rd Generation Partnership Project; Technical Specification Group Core Network and Terminals; Non-Access-Stratum (NAS) protocol for Evolved Packet System (EPS); Stage 3 (Release 8)", 3GPP TS 24.301 V8.10.0, Jun. 2011, 277 pages.

"3rd Generation Partnership Project; Technical Specification Group Core Network and Terminals; Policy and Charging Control over Gx/Sd reference point (Release 11)", 3GPP TS 29.212 V11.1.0, Jun. 2011, 147 pages.

"3rd Generation Partnership Project; Technical Specification Group Radio Access Network; Evolved Universal Terrestrial Radio Access Network (E-UTRAN); S1 Application Protocol (S1AP) (Release 8)", 3GPP TS 36.413 V8.10.0, Jun. 2010, 217 pages.

"3rd Generation Partnership Project; Technical Specification Group Radio Access Network; Evolved Universal Terrestrial Radio Access Network (E-UTRAN); S1 Application Protocol (S1AP) (Release 9)", 3GPP TS 36.413 V9.8.0, Dec. 2011, 243 pages.

"3rd Generation Partnership Project; Technical Specification Group Radio Access Network; Physical layer; Measurements (FDD) (Release 10)", 3GPP TS 25.215 V10.0.0, Mar. 2011, 23 pages.

(56) References Cited

OTHER PUBLICATIONS

"3rd Generation Partnership Project; Technical Specification Group Services and System Aspects; Architecture enhancements for non-3GPP accesses (Release 10)", 3GPP TS 23.402 V10.2.1, Jan. 2011, 228 pages.

"3rd Generation Partnership Project; Technical Specification Group Services and System Aspects; Data Identification in ANDSF (DIDA) (Release 11)", 3GPP TR 23.8xy V0.1.0, Apr. 2011, 8 pages.

"3rd Generation Partnership Project; Technical Specification Group Services and System Aspects; General Packet Radio Service (GPRS) enhancements for Evolved Universal Terrestrial Radio Access Network (E-UTRAN) access (Release 10)", 3GPP TS 23.401 V10.4.0, Jun. 2011, 281 pages.

"3rd Generation Partnership Project; Technical Specification Group Services and System Aspects; Generic Authentication Architecture (GAA); Support for subscriber certificates (Release 10)", 3GPP TS 33.221 V10.0.0, Mar. 2011, 25 pages.

"3rd Generation Partnership Project; Technical Specification Group Services and System Aspects; IP Multimedia Subsystem (IMS); Stage 2 (Release 11)", 3GPP TS 23.228 V11.0.0, Mar. 2011, 272 pages.

"3rd Generation Partnership Project; Technical Specification Group Services and System Aspects; Policy and charging control architecture (Release 11)", 3GPP TS 23.203 V11.2.0, Jun. 2011, 142 pages.

"3rd Generation Partnership Project; Technical Specification Group Services and System Aspects; Study on Policy solutions and enhancements (Release 11)", 3GPP TR 23.813 V11.0.0, Jun. 2011, 41 pages.

"3rd Generation Partnership Project; Technical Specification Group Core Network and Terminals; User Data Convergence (UDC); Technical realization and information flows; Stage 2 (Release 9)", 3GPP TS 23.335 V9.3.0, Dec. 2010, 39 pages.

"International Preliminary Report on Patentability from the International Preliminary Examining Authority", International Application No. PCT/US2014/011099, Jan. 16, 2015, 16 pages.

"International Search Report and the Written Opinion of the International Searching Authority", International Application No. PCT/US2013/026550, May 21, 2013, 10 pages.

"International Search Report and Written Opinion of the International Search Authority", International Application No. PCT/US2012/057068, Feb. 8, 2013, 14 pages.

"International Search Report and Written Opinion of the International Searching Authority", International Application No. PCT/US2014/011099, Apr. 15, 2014, 12 pages.

"Invitation to Pay Additional Fees and Partial International Search", International Application No. PCT/US2013/046174, Oct. 10, 2013, 5 pages.

"Invitation to Pay Additional Fees and Partial International Search", International Application No. PCT/US2013/051029, Nov. 27, 2013, 7 pages.

"New WID for Data identification in ANDSF", 3GPP Tdoc SP-110084, 3GPP TSG SA Meeting #51 Kansas City, USA, Mar. 21-23, 2011, 5 pages.

"WID for Study on User plane congestion management", 3GPP Tdoc S2-113383, 3GPP SA WG2 Meeting #85 Naantali, Finland, Jul. 11-15, 2011, 5 pages.

"WID for Study on User plane congestion management", 3GPP Tdoc S2-113752, 3GPP SA WG2 Meeting #85 Naantali, Finland, Jul. 11-15, 2011, 5 pages.

"Written Opinion of the International Preliminary Examining Authority", International Application No. PCT/US2013/026550, Jun. 3, 2014, 10 pages.

"Written Opinion of the International Preliminary Examining Authority", International Application No. PCT/US2012/057068, Oct. 17, 2013, 7 pages.

China Mobile, "Interface/Network Selection based on UE detected Network Information", 3GPP Tdoc S2-113264; 3GPP SA WG2 Meeting #86, Naantali, Finland, Jul. 11-15, 2011, 2 pages.

Das, S., et al., "DHCPv4 and DHCPv6 Options for Access Network Discovery and Selection Function (ANDSF) Discovery", IETF RFC 6153, Feb. 2011, 7 pages.

Huawei, "Discussion on H(e)NB LIPA/SIPTO management requirements", 3GPP TSG-SA5 (Telecom Management) Meeting SA5#72; S5-101780, Jul. 12-16, 2010, 3 pages.

12R, "eICIC for HeNB UL and MUE DL based on HeNB UL Measurement", 3GPP TSG RAN WG1 Meeting #62; R1-104732, Madrid, Spain, Aug. 23-27, 2010, 5 pages.

IEEE, "Part 11: Wireless LAN Medium Access Control (MAC) and Physical Layer (PHY) Specifications, Amendment 9: Interworking with External Networks", IEEE Std 802.11u-2011, Feb. 25, 2011, 208 pages.

ITU-T, "Opinion model for video-telephony applications", ITU-T Recommendation G.1070, Apr. 2007, 28 pages.

Nokia Siemens Networks, On X2 Signaling for TDM eICIC in Macro+Pico Scenarios, 3GPP Tdoc R3-103555, 3GPP TSG RAN WG3 #70 Meeting, Jacksonville, United States, Nov. 15-19, 2010, 4 pages.

Open Mobile Alliance, "OMA Device Management Representation Protocol", OMA-TS-DM_RepPro-V2_0-20101011-D, Oct. 11, 2010, 76 pages.

Swetina, Joerg, et al., "Use Cases for User Plane Congestion Management (UPCON)", 3GPP Tdoc S1-113149, Sep. 6, 2011, 11 pages.

U.S. Appl. No. 13/446,685, filed Apr. 13, 2012.
U.S. Appl. No. 13/944,077, filed Jul. 17, 2013.
U.S. Appl. No. 14/376,973, filed Feb. 16, 2013.
U.S. Appl. No. 14/408,133, filed Jun. 17, 2013.
U.S. Appl. No. 14/759,818, filed Jan. 10, 2014.

\* cited by examiner

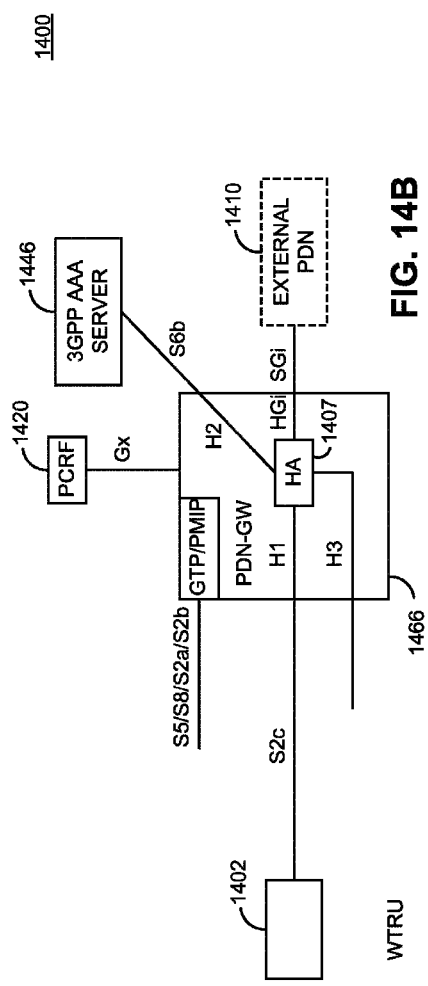

BANDWIDTH MANAGEMENT, AGGREGATION AND INTERNET PROTOCOL FLOW MOBILITY ACROSS MULTIPLE-ACCESS TECHNOLOGIES

CROSS-REFERENCE TO RELATED APPLICATIONS

This application claims the benefit of (i) U.S. ("US") Provisional Patent Application Ser. No. ("Prov. Pat. Appln. Ser. No.") 61/380,527, filed on 7 Sep. 2010, and entitled "Enhanced Interworking Wireless Local Area Network for Bandwidth Aggregation and Femto-Based Deployment", (ii) U.S. Prov. Pat. Appln. Ser. No. 61/475,023, filed on 13 Apr. 2011, and entitled "Method and Apparatus for Multicarrier and Multiple Radio Access (Multi-Rat) Bandwidth Management (BWM) Policy Management and Enforcement", and (iii) U.S. Prov. Pat. Appln. Ser. No. 61/514,895, filed on 3 Aug. 2011, and entitled "Network-Initiated and/or Network-Managed Internet Protocol Flow Mobility across Multiple-Access Technologies".

BACKGROUND

1. Field

This application is related to wireless communications.

2. Related Art

Mobile operators may employ any of macro cells, femtocells, microcells, wireless local area networks ("WLAN"), and the like to improve coverage and capacity of communications for their subscribers, especially indoors. As a function of the improved coverage and capacity, the subscribers may experience better voice quality/data rates and battery life of mobile devices over connecting to macro cells alone. Depending on the carrier, the subscribers may also be offered more attractive tariffs, e.g., discounted calls from home.

SUMMARY

Systems, apparatuses and methods for bandwidth management, aggregation and internet protocol ("IP") flow mobility ("IFOM") across multiple-access technologies are provided. Included among systems, apparatuses and methods is a method that includes selecting, from a packet data network ("PDN") connection formed through a plurality of access systems of a network communicatively coupled with a wireless transmit and/or receive unit ("WTRU"), an access system over which to transport a flow of internet protocol ("IP") traffic to and/or from the WTRU. The method may also include sending, to the WTRU, a request to associate the flow of IP traffic with the selected access system.

BRIEF DESCRIPTION OF THE DRAWINGS

A more detailed understanding may be had from the detailed description below, given by way of example in conjunction with drawings appended hereto. Figures in such drawings, like the detailed description, are examples. As such, the Figures and the detailed description are not to be considered limiting, and other equally effective examples are possible and likely. Furthermore, like reference numerals in the Figures indicate like elements, and wherein:

FIGS. 14A-14B are block diagrams illustrating an example of a communication system in which one or more disclosed embodiments may be implemented and/or carried out;

FIG. 15B is a chart illustrating an example of a flow table for performing IFOM across multiple access technologies;

DETAILED DESCRIPTION

In the following detailed description, numerous specific details are set forth to provide a thorough understanding of embodiments and/or examples disclosed herein. However, it will be understood that such embodiments and examples may be practiced without some or all of the specific details set forth herein. In other instances, well-known methods, procedures, components and circuits have not been described in detail, so as not to obscure the following description. Further, embodiments and examples not specifically described herein may be practiced in lieu of, or in combination with, the embodiments and other examples disclosed herein.

Figure 1:
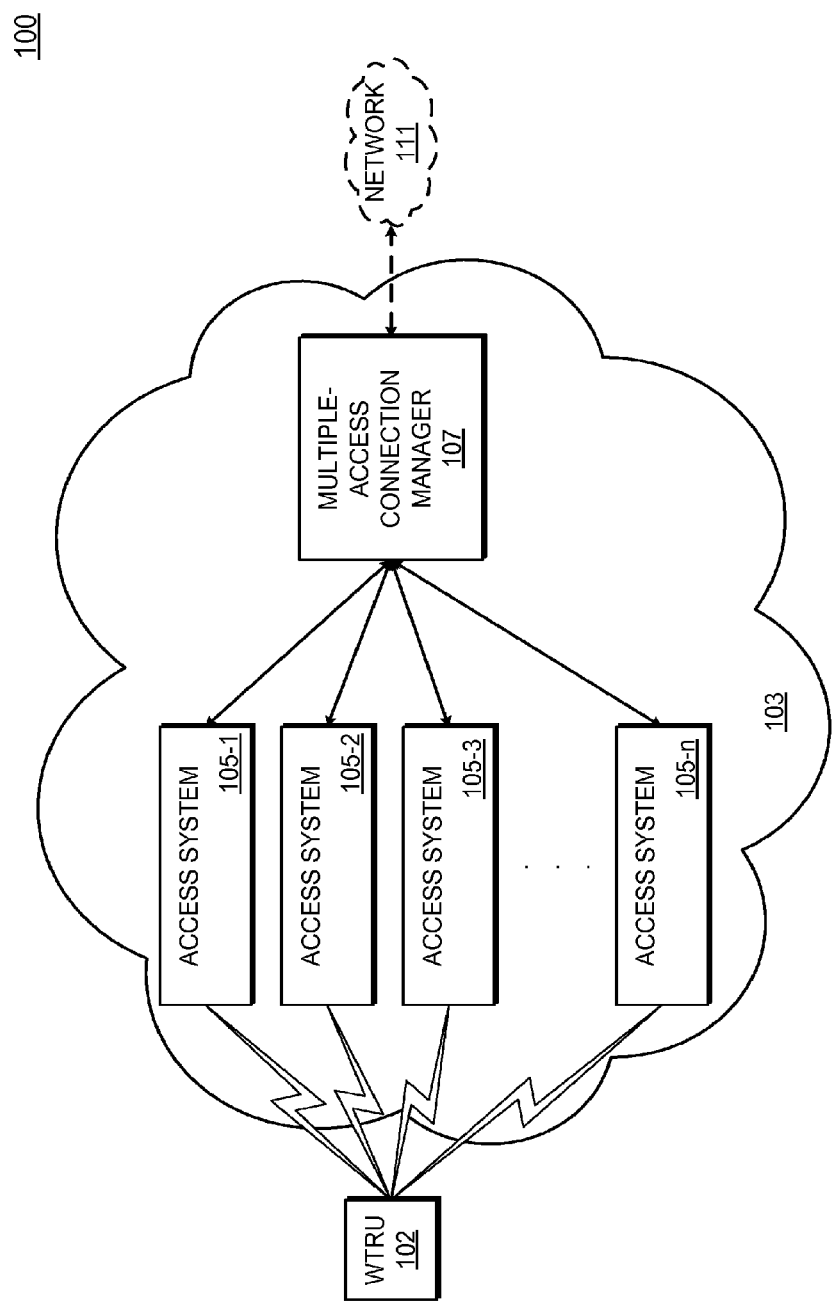
FIG. 1 is a block diagram illustrating an example of a communications system in which one or more disclosed embodiments may be implemented and/or carried out.

FIG. 1 is a block diagram illustrating an example of a communications system 100 in which one or more disclosed embodiments may be implemented and/or carried out. The communications system 100, for example, may be suitable for implementing and/or carrying out any of bandwidth management, bandwidth aggregation and internet protocol ("IP") flow mobility ("IFOM") across multiple access technologies. The IFOM may be based on IP-level protocols. These IP-level protocols may include, for example, general-packet-radio service ("GPRS") tunneling protocol ("GTP"), and/or protocols based and/or built on Mobile-IP ("MIP"), such as, for example, dual-stack MIP ("DSMIP") and proxy MIP ("PMIP").

In general, the communications system 100 defines an architecture that supports a plurality of access systems over which multiple wireless users may access and/or exchange (e.g., send and/or receive) content, such as voice, data, video, messaging, broadcast, etc. The architecture also supports having two or more of the access systems use and/or be configured in accordance with multiple (i.e., different) access technologies. This way, the communications system 100 may service the wireless users capable of using a single access technology, and the wireless users capable of using two or more of the multiple access technologies.

The communications system 100 may enable the wireless users to access the content through sharing and/or distribution of system resources, including, for example, wireless bandwidth. The communications system 100, for example, may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

The communications system 100 may include a wireless transmit and/or receive unit ("WTRU") 102 and a network 103. The network 103 may include a plurality of access systems $105_{1-n}$ communicatively coupled with a network entity 107. The network 103 may also include one or more additional access systems and/or other network elements, nodes, entities, etc.; none of which are shown in FIG. 1 for simplicity of exposition. Details of example architectures of various networks, any of which may be representative of the network 103, are described herein.

The network entity 107 may be configured and/or adapted (collectively "configured") to manage one or more packet data network ("PDN") connections carried over the access systems $105_{1-n}$ (hereinafter "multi-access connection manager 107"). In general, the WTRU 102 may be any type of device configured to operate and/or communicate over wireless or wireless and wired media. The WTRU 102, for example, may be configured to exchange signals over the wireless and/or wired media, and may include user equipment ("UE"), a mobile station, a fixed or mobile subscriber unit, a pager, a cellular telephone, a personal digital assistant (PDA), a Smartphone, a laptop, a netbook, a personal computer, a wireless sensor, consumer electronics, and the like. The WTRU 102 may also include a number of elements to facilitate its operation; none of which, however, are shown in FIG. 1 for simplicity of exposition. Details of example architectures of various WTRUs, any of which may be representative of the WTRU 102, are described herein.

Each of the access systems $105_{1-n}$ may be configured in accordance with the same access technology. Alternatively, some or all of the access systems $105_{1-n}$ may be configured in accordance with different access technologies. For example, the first, second and third access systems $105_1$, $105_2$ and $105_3$ may be configured in accordance with different access technologies; and the remaining access systems $105_{4-n}$ may be configured in accordance the same access technology (e.g., the same access technology as access system $105_2$). Examples of the multiple access technologies may include an access technologies as specified in a release promulgated by the third generation partnership project ("3GPP"), IEEE 802.11, IEEE 802.16, other non-3GPP cellular access technologies and the like.

Each of the access systems $105_{1-n}$ may provide any of ingress into and egress from the network 103 for communications exchanged between, for example, the WTRU 102 and a network 111 external to the communications system 100. The network ("external network") 111 may include and/or be one or more of various types of communication networks, including, for example, any of a core network, a mobile core network, an internet, a service-provider network and other like-type network.

To facilitate communication over the access systems $105_{1-n}$, the WTRU 102 and the access systems $105_{1-n}$ may establish respective air interfaces $116_{1-n}$ (e.g., wireless links) in accordance with the respective access technologies. The WTRU 102 may also establish PDN connections and/or IP connectivity with various nodes (e.g., packet data gateways ("PDGs")) of the network 103 and/or with the network 110 over the access systems $105_{1-n}$ (individually or combined). The PDN connections and/or IP connectivity may be established over interfaces defined in accordance with the access technologies of the corresponding access systems $105_{1-n}$.

The WTRU 102 may also establish connectivity with the multi-access connection manager 107 via one or more of the access systems $105_{1-n}$. Such connectivity may be established via any previously-established PDN connection or IP connection, for example. The WTRU 102 and multi-access connection manager 107 may use also use an existing tunnel or, alternatively, establish a tunnel to obtain connectivity and/or to exchange communications.

The WTRU 102 and multi-access connection manager 107 may, for example, exchange communications (e.g., signaling messages) to facilitate and/or manage IP traffic carried over the PDN connections. The WTRU 102 and multi-access connection manager 107 may, for example, exchange messages to facilitate forming and form a single PDN connection from various PDN and IP connections carried over the access systems $105_1$. These messages may include one or more messages for binding together or otherwise combining (i) multiple PDN connections, (ii) one or more PDN connections with one or more IP connections and/or (iii) multiple IP connections for use as the single PDN connection (hereinafter "multi-access PDN connection").

The WTRU 102 and multi-access connection manager 107 may also exchange messages and to facilitate and/or control any of routing, forwarding and/or other transport of one or more flows of IP traffic ("IP flows") over the access systems $105_{1-n}$ of the multi-access PDN connection. In addition, the WTRU 102 and multi-access connection manager 107 may maintain in respective data structures (e.g., tables) information identifying the multi-access PDN connection, the PDN and IP connections bound to the multi-access PDN connection, and the IP flows associated with the multi-access PDN connection.

FIGS. 2-11 are flow diagrams illustrating respective examples of processes 200-1100 for performing IFOM across multiple access technologies. Each of the processes 200-1100 is described with reference to the communications system 100 of FIG. 1. The processes 200-1100 may be carried out using other architectures, as well. Where applicable, reference may be made between and/or among the processes 200-1100 or elements thereof.

Figure 2:
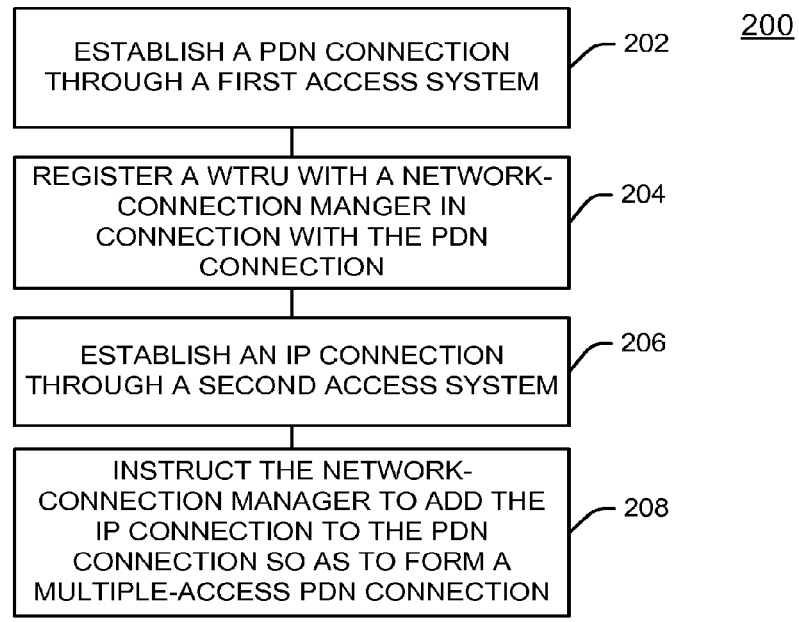
FIG. 2 is a flow diagram illustrating an example of a flow for performing ("IP") flow mobility ("IFOM") across multiple access technologies.

Referring now to FIG. 2, a flow diagram illustrating an example of a process 200 for performing IFOM across multiple access technologies is shown. The WTRU 102 may connect to and establish a PDN connection through the access system $105_1$ ("initial PDN connection"), as shown in block 202. During establishment of the initial PDN connection, information relating to the WTRU 102 in connection with the initial PDN connection may be assigned to and/or associated with the WTRU 102 ("initial PDN-connection information"). The initial PDN-connection information may include, for example, an IP address assigned to the WTRU 102 ("anchor address").

As shown in block 204, the WTRU 102 may register with the multi-access connection manager 107 in connection with the initial PDN connection. The WTRU 102 may initiate registration by sending to the multi-access connection manager 107 a message configured to instruct the multi-access connection manager 107 to register the WTRU 102 in connection with the PDN connection. This message ("registration message") may include the initial PDN-connection information, or alternatively, a portion of such initial PDN-connection information, such as, for example, the anchor address.

After receipt, the multi-access connection manager 107 may extract the initial PDN-connection information from the registration message. The multi-access connection manager 107 may then populate some or all of the initial PDN-connection information into the connection manager data structure of multi-access connection manager 107 (hereinafter "connection manager data structure").

Thereafter, the multi-access connection manager 107 may send to the WTRU 102 a message to acknowledge the registration message ("registration-ack message"). The registration-ack message may include an indication that the multi-access connection manager 107 successfully registered the WTRU 102. Responsive to the successful registration, the WTRU 102 may populate the WTRU data structure with some or all of the initial PDN-connection information. The initial PDN-connection information populated in the WTRU data structure may be the same as or different from the initial PDN-connection information populated into the connection manager data structure.

As shown in block 206, the WTRU 102 may connect to, and establish an IP connectivity over with, the access system $105_2$ (hereinafter "second-access connectivity") During establishment of the second-access connectivity, information relating to the WTRU 102 in connection with the second-access connectivity may be assigned and/or associated with the WTRU 102 ("second-access-connectivity information"). The second-access-connectivity information may include, for example, an IP address assigned to the WTRU 102 ("routing address").

After connecting to the access system $105_2$, the WTRU 102 may instruct the multi-access connection manager 107 to add or join the access system $105_2$ to initial PDN connection, as shown in block 208. The WTRU 102 may instruct the multi-access connection manager 107 by sending a message with instructions to bind the second-access connectivity to the initial PDN connection. This message ("binding message") may include the second-access-connectivity information. Alternatively, the binding message may include a portion of the second-access-connectivity information, such as, for example, the routing address. After receipt of the binding message, the multi-access connection manager 107 may populate second-access-connectivity information into the network data structure in association with the initial PDN-connection information.

The multi-access connection manager 107 may send to the WTRU 102 a message to acknowledge the binding message ("binding-ack message"). The binding-ack message may include an indication for notifying the WTRU 102 that the multi-access connection manager 107 successfully added the access system $105_2$ to the multi-access PDN connection. Responsive to such notification, the WTRU 102 may populate the second-access-connectivity information into the WTRU data structure in association with the initial PDN-connection information. The second-access-connectivity information populated into the WTRU data structure may be the same as or different from the second-access-connectivity information populated into the connection manager data structure.

Although not shown in FIG. 2, one or more of the access systems $105_{3-n}$ may be added to the multiple-access PDN connection by repeating blocks 206-208 for each of the access systems $105_{3-n}$ to be added. Alternatively, any of the access systems $105_{3-n}$ may be added and/or joined to the initial PDN connection in lieu of the access system $105_2$.

Figure 3:
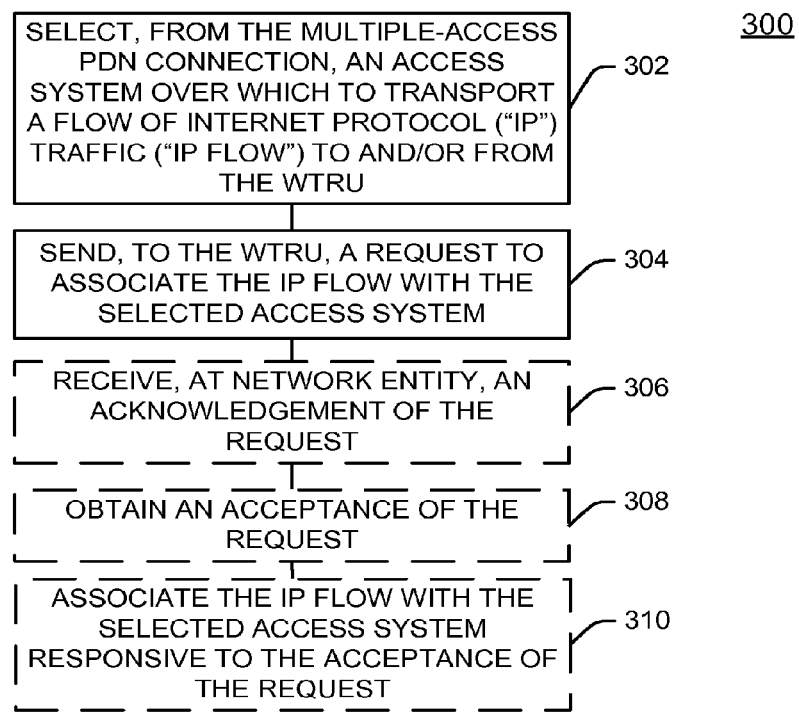
FIG. 3 is a flow diagram illustrating an example of a flow for performing IFOM across multiple access technologies.

FIG. 3 is a flow diagram illustrating an example of a process 300 for performing IFOM across multiple access technologies. The process 300 may be performed after a multi-access PDN connection is established, as, for example, by the process 200 of FIG. 2. The process 300 may be performed after a multi-access PDN connection is established in other ways, as well. The process 300 may be used to facilitate assignment of and/or assign a given IP flow to a particular access system.

As shown in block 302, the multi-access connection manager 107 may select the access network $105_1$ to provide transport for a given IP flow. The multi-access connection manager 107 may select the access network $105_1$, for example, responsive to an event for triggering a change in assignment of the given IP flow ("flow-updating event"). The flow-updating event may be configured to occur at any of a predefined time or frequency (e.g., at certain times of a day, every few hours, at scheduled times for maintenance, etc.). Alternatively, the flow-updating event may be triggered responsive to one or more conditions of the communications system 100. Such conditions may include congestion and/or limited connectivity occurring (or anticipated to occur) in and/or in association with the communications system 107, including, any of the networks 103, 110; PDN connections; links associated with IP connectivity; access systems $105_{1\text{-}n}$; and air interfaces $116_{1\text{-}n}$. The flow-updating event may be based on one or more policies of the network 103 or the communications system 100, as well.

After selecting the access network $105_1$, the multi-access connection manager 107 may send to the WTRU 102 a request to associate the given IP flow with the access network $105_1$, as shown in block 304. The multi-access connection manager 107 may send the request using a signaling message configured for requesting an update to a previous bound connection (e.g., a binding update ("BU") message). This BU message may include the initial PDN-connection information and information associated with the given IP flow ("IP-flow information"). The IP-flow information may include an identifier assigned to the IP flow ("FID") and a routing filter. The routing filter may be configured to facilitate filtering of the given IP flow from other traffic and/or routing of the given IP flow. The routing filter may include a description and/or a characterization of the given IP flow. For example, the routing filter may include a traffic selector or any other n-tuple containing a source IP, destination IP, source port, destination port, transport protocol and any other fields in IP and higher layer headers (e.g. media type).

In one embodiment, as shown in block 306, the multi-access connection manager 107 may receive from the WTRU 102 an acknowledgement of the request. The acknowledgement may be carried in a signaling message configured for acknowledging a binding update (e.g., a binding acknowledging ("BA") message). The BA message may include the initial PDN-connection information and the IP-flow information. Such information may be used to confirm the binding update.

In one embodiment, as shown in block 308, the multi-access connection manager 107 may obtain an acceptance of the request. The multi-access connection manager 107 may obtain the acceptance of the request in a number of ways. For instance, the multi-access connection manager 107 may infer the acceptance from (i) receipt of the BA message, (ii) not receiving a response to the BU message or (II) not receiving a rejection of the request from the WTRU 102. Alternatively, the BA message may include an indication of the acceptance of the request.

In one embodiment, as shown in block 310, the multi-access connection manager 107 and the WTRU 102 may associate the given IP flow with the access network $105_1$, responsive to acceptance of the request. To facilitate making the association, the WTRU 102 may extract the IP-flow information from the BU message. Thereafter, the WTRU 102 may associate the given IP flow with the access network $105_1$, for example, by populating the IP-flow information into the WTRU data structure in association with the initial PDN-connection information. Similarly, the multi-access connection manager 107 may associate the given IP flow with the access network $105_1$ by populating the IP-flow information into the connection manager data structure in association with the initial PDN-connection information.

Although not shown in FIG. 3, the multi-access connection manager 107 may select the access system $105_2$ or any of the other the access systems $105_{3\text{-}n}$ (if added to the multiple-access PDN connection) for transport of the given IP flow.

Figure 4:
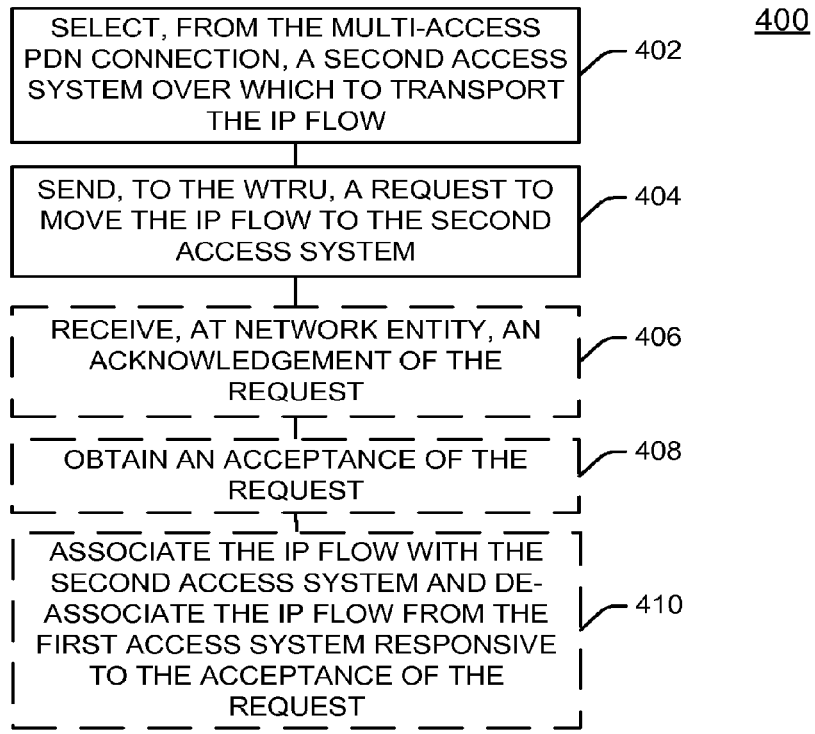
FIG. 4 is a flow diagram illustrating an example of a flow for performing IFOM across multiple access technologies.

FIG. 4 is a flow diagram illustrating an example of a process 400 for performing IFOM across multiple access technologies. The process 400 may be performed after a multi-access PDN connection is established, as, for example, by the process 200 of FIG. 2. The process 400 may be performed after a multi-access PDN connection is established in other ways, as well. The process 400 may be used to make a request to reassign (e.g., move) and/or to reassign the IP flow from one access system to another.

As shown in block 402, the multi-access connection manager 107 may select the access system $105_2$ of the multi-access PDN connection for transport of the IP flow to and/or from the WTRU 102. Selection of the access system $105_2$ by multi-access connection manager 107 may be responsive to a flow-updating event.

After selecting the access system $105_2$, the multi-access connection manager 107 may send to the WTRU 102 a request to reassign the IP flow to the access system $105_2$, as shown in block 404. The request ("reassignment request") may include requests to (i) associate the IP flow to access system $105_2$, and (ii) de-associate the IP flow from the access system $105_1$. The multi-access connection manager 107 may use a BU message, for example, to send the reassignment request to the WTRU 102. The BU message may include the second-access-connectivity information and the IP-flow information.

In one embodiment, the multi-access connection manager 107 may receive from the WTRU 102 an acknowledgement of the reassignment request, as shown in block 406. This acknowledgement may be carried in a BA message sent from the WTRU 102. The BA message may include the second-access-connectivity information and the IP-flow information, which may be used to signal to the multi-access connection manager 107 a confirmation of the binding update.

In one embodiment, the multi-access connection manager 107 may obtain an acceptance of the move request, as shown in block 408. The multi-access connection manager 107 may, for example, infer the acceptance from (i) receipt of the BA message, (ii) not receiving a response to the BU message or (iii) not receiving a rejection of the request from the WTRU 102. Alternatively, the BA message may include an indication of the acceptance of the request.

In one embodiment, the multi-access connection manager 107 and the WTRU 102 may associate the IP flow with the access network $105_2$ and de-associate the IP flow with the access network $105_1$, responsive to acceptance of the request, as shown in optional block 410. To facilitate making the association and de-association, the WTRU 102 may extract the IP-flow information from the BU message. Thereafter, the WTRU 102 may associate the IP flow with the access network $105_2$ and de-associate the IP flow with the access network $105_1$, for example, by populating the IP-flow information into the WTRU data structure in association with the second-access connection information. Similarly, the multi-access connection manager 107 may associate the IP flow with the access network $105_2$ and de-associate the IP flow with the access network $105_1$ by populating the IP-flow information into the connection manager data structure in association with the second-access connection information.

Although not shown in FIG. 4, the multi-access connection manager 107 may select any of the other the access systems $105_{3\text{-}n}$ if added to the multiple-access PDN connection for transport of the given IP flow.

Figure 5:
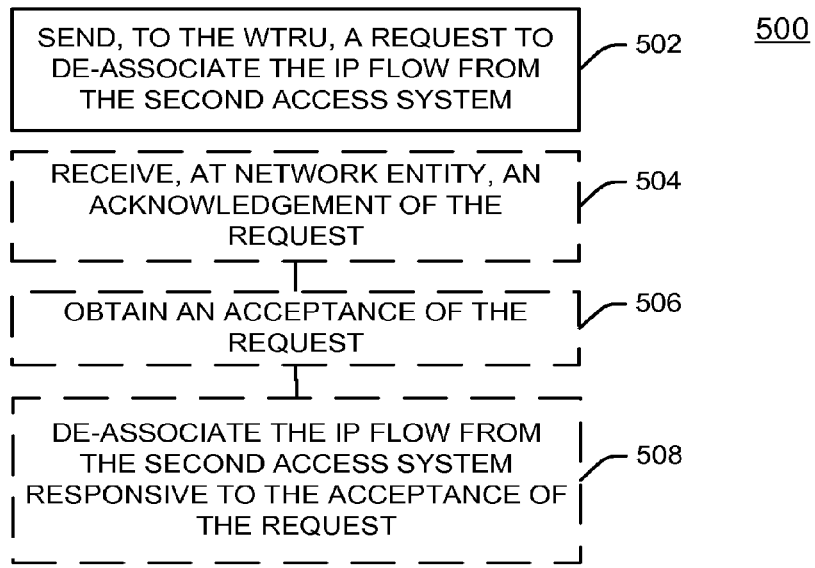
FIG. 5 is a flow diagram illustrating an example of a flow for performing IFOM across multiple access technologies.

FIG. 5 is a flow diagram illustrating an example of a process 500 for performing IFOM across multiple access technologies. The process 500 may be performed after a multi-access PDN connection is established, as, for example, by the process 200 of FIG. 2, and updated by the process 300 of FIG. 3. The process 500 may be performed after a multi-access PDN connection is established in other ways, as well. The process 500 may be used to request removal of and/or to remove the IP flow from the multi-access PDN connection.

As shown in block 502, the multi-access connection manager 107 may send to the WTRU 102 a request to de-associate the IP flow from the access network $105_2$. The multi-access connection manager 107 may send the request responsive to a flow-updating event, and use a BU message to the send the request. The BU message may include the second-access connection information.

In one embodiment, the multi-access connection manager 107 may receive from the WTRU an acknowledgement of the removal request, as shown in block 504. The acknowledgement may be carried in a BA message, for instance. The BA message may include the second-access-connection information.

The multi-access connection manager 107 may obtain an acceptance of the removal request, as shown in block 506. The multi-access connection manager 107 may, for example, infer the acceptance from (i) receipt of the BA message, (ii) not receiving a response to the BU message or (iii) not receiving a rejection of the request from the WTRU 102. Alternatively, the BA message may include an indication of the acceptance of the request.

As shown in block 508, the multi-access connection manager 107 and the WTRU 102 may de-associate the IP flow from the access network $105_2$, responsive to acceptance of the request. To facilitate making the de-association, the WTRU 102 may extract the second-access connection information from the BU message. Thereafter, the WTRU 102 may de-associate the IP flow from the access network $105_2$ by removing the IP-flow information from the WTRU data structure. Similarly, the multi-access connection manager 107 may de-associate the IP flow from the access network $105_2$ by removing the IP-flow information from the connection manager data structure.

Figure 6:
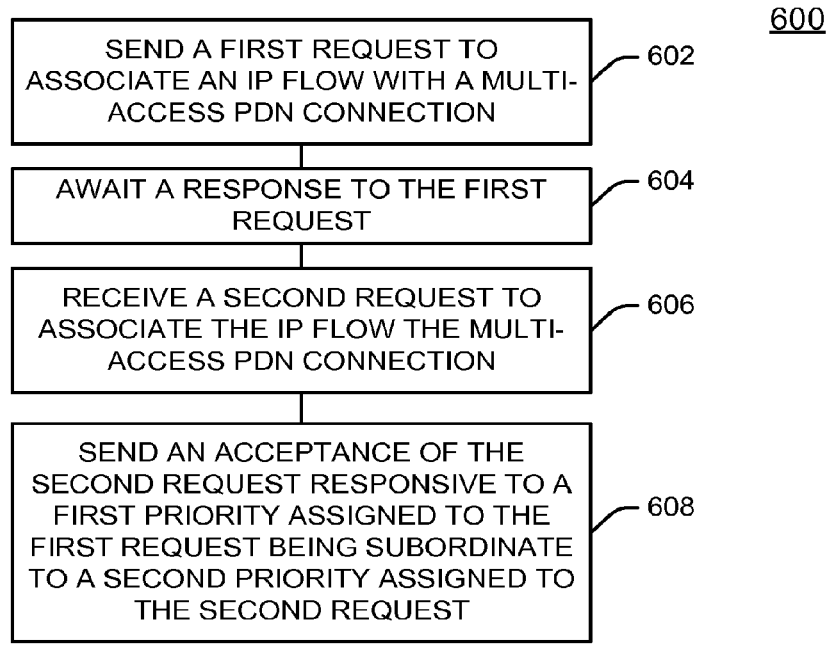
FIG. 6 is a flow diagram illustrating an example of a flow for performing IFOM across multiple access technologies.

FIG. 6 is a flow diagram illustrating an example of a process 600 for performing IFOM across multiple access technologies. The process 600 may be performed after a multi-access PDN connection is established, as, for example, by the process 200 of FIG. 2. The process 600 may be performed after a multi-access PDN connection is established in other ways, as well.

The process 600 may be used to resolve and/or avert potential collisions between a request associated with IFOM on a multi-access PDN connection ("IFOM request") initiated by the network-access manager 107 ("nw-initiated IFOM request") and a IFOM request initiated by the WTRU 102 ("wtru-initiated IFOM request"). To facilitate the process 600, the multi-access connection manager 107 and WTRU 102 are provisioned with respective priorities ("nw priority" and "wtru priority", respectively); one being subordinate to the other. The network-access manager 107 and WTRU 102 may refer to these priorities to resolve a potential collision between nw-initiated and wtru-initiated IFOM requests.

Provisioning of the nw-priority and wtru priority may be performed in a number of ways. For example, the nw-priority may be provisioned initially to be subordinate to the wtru priority (or, conversely, the wtru priority may be provisioned subordinate to the nw priority). The nw-priority and wtru priority may be updated repeatedly, as well. For example, the relative subordination of nw-priority and wtru priority may be provisioned in response to an event, such as, for example, a flow-updating event and like-type events. Alternatively, provisioning of the nw-priority and wtru priority may occur responsive to one or more conditions of the communications system 100, such as, for example, congestion and/or limited connectivity occurring (or anticipated to occur) in and/or in association with the communications system 107, including, any of the networks 103, 110; PDN connections; links associated with the IP connections; access systems $105_{1-n}$; and air interfaces $116_{1-n}$. Provisioning of the nw-priority and wtru priority may be based on one or more policies of the network 103 or the communications system 100, as well As shown in block 602, the multi-access connection manager 107 may send to the WTRU 102 an nw-initiated request to associate a given IP flow with the multi-access PDN connection. The multi-access connection manager 107 may use a BU message, for example, to send the nw-initiated request. After sending the nw-initiated request, the multi-access connection manager 107 may await a response, as shown in block 604. While awaiting the response, the multi-access connection manager 107 may receive from the WTRU 102 a wtru-initiated request to associate the given IP flow with the multi-access PDN connection, as shown in block 606. Like the nw-initiated request, the WTRU may use a BU message to send the wtru-initiated request. After receiving the wtru-initiated request, the multi-access connection manager 107 may refer to the nw-priority and wtru-priority, and responsive to the nw-priority being subordinate to the wtru-priority, the multi-access connection manager 107 may send to the WTRU 102 an acceptance to the wtru-initiated request, as shown in block 608.

Although not shown in FIG. 6, if, after referring to the nw-priority and wtru-priority, the wtru-priority is subordinate to the nw-priority, then the multi-access connection manager 107 may again await a response to the nw-initiated request (e.g., block 604). As another alternative, the multi-access connection manager 107 may abandon the nw-initiated request.

Figure 7:
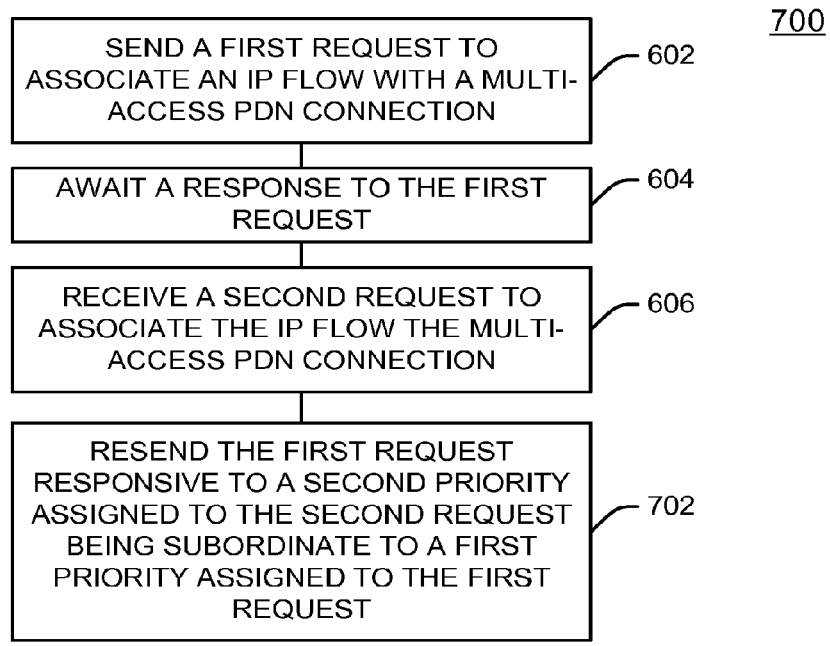
FIG. 7 is a flow diagram illustrating an example of a flow for performing IFOM across multiple access technologies.

Referring now to FIG. 7, a flow diagram illustrating an example of a process 700 for performing IFOM across multiple access technologies is shown. The process 700 of FIG. 7 is similar to the process 600 of FIG. 6, except as described below.

After receiving the wtru-initiated request (606), the multi-access connection manager 107 may refer to the nw-priority and wtru-priority. Responsive to the wtru-priority being subordinate to the nw-priority (unlike 608 of FIG. 6), the multi-access connection manager 107 may resend the nw-initiated request (or send another nw-initiated request), as shown in block 702.

Although not shown in FIG. 7, the multi-access connection manager 107 may then await a response to the resent nw-initiated request. Assuming the wtru-priority remains subordinate to nw-priority, the multi-access connection manager 107 may receive an acceptance to the nw-initiated request from the WTRU 102.

The process 600 of FIG. 6 and the process 700 of FIG. 7 may also be performed for the wtru-initiated request being sent prior to the nw-initiated request. For example, the WTRU 102 may await a response to the wtru-initiated request (604), and while awaiting the response, the WTRU 102 may receive a nw-initiated request (606). If, after referring to the nw-priority and wtru-priority, the nw-priority is subordinate to the wtru-priority (608), then the WTRU 102 may await a response to the wtru-initiated request (e.g., the acceptance to the wtru-initiated request (608)), resend the wtru-initiated request or send another wtru-initiated request (702). If the wtru-priority is subordinate to the nw-priority, then the WTRU 102 may send to the acceptance to the nw-initiated request (608). Further, as one of ordinary skill in the art will appreciate, block 702 of process 700 may be appended to process 600 as an alternative to block 608.

Figure 8:
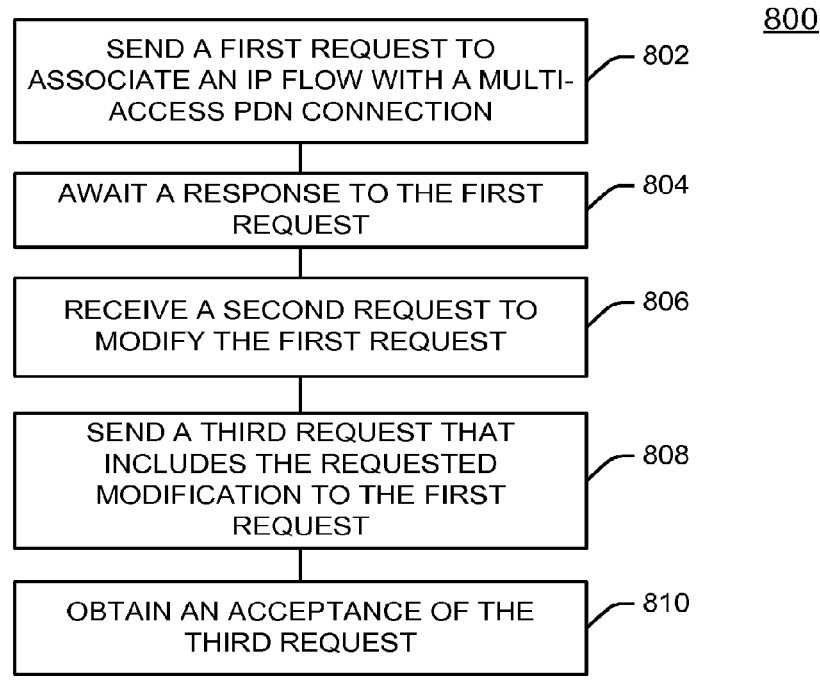
FIG. 8 is a flow diagram illustrating an example of a flow for performing IFOM across multiple access technologies.

FIG. 8 is a flow diagram illustrating an example of a process 800 for performing IFOM across multiple access technologies. The process 800 may be performed after a multi-access PDN connection is established, as, for example, by the process 200 of FIG. 2. The process 800 may be performed after a multi-access PDN connection is established in other ways, as well. The process 800 may be used to resolve and/or avert potential collisions between an nw-initiated IFOM request and a wtru-initiated IFOM request.

As shown in block 802, the multi-access connection manager 107 may send to the WTRU 102 an nw-initiated request to associate a given IP flow with the multi-access PDN connection. The multi-access connection manager 107 may use a BU message to send the nw-initiated request. After sending the nw-initiated request, the multi-access connection manager 107 may await a response, as shown in block 804. While awaiting the response, the multi-access connection manager 107 may receive from the WTRU 102 a request to modify the nw-initiated request ("wtru-modification request"), as shown in block 806. The WTRU 102 may use a signaling message configured for requesting modifications to a BU message ("Mod-BU message") to send the wtru-modification request. This Mod-BU message may include requested modifications to the nw-initiated request. The Mod-BU message may also include an identifier to differentiate the wtru-modification request from other requests ("modification-request identifier").

After extracting the requested modifications, the multi-access connection manager 107 may send to the WTRU 102 a request that includes the requested modifications ("updated-nw request"), as shown in block 808. The multi-access connection manager 107 may use a Mod-BU message to send the updated-nw request, as well. The Mod-BU message may include the modification-request identifier along with the updated-nw request.

As shown in block 810, the multi-access connection manager 107 may obtain an acceptance of the updated-nw request. The multi-access connection manager 107 may, for example, receive from the WTRU 102 an acknowledgement of the updated-nw request, which includes an acceptance of the updated-nw request. The acknowledgement may be carried in a BA message. The BA message may include the information for confirming acceptance of the updated-nw request. Alternatively, the multi-access connection manager 107 may infer the acceptance from (i) receipt of a BA message, (ii) not receiving a response to the Mod-BU message or (iii) not receiving a rejection of the updated-nw request from the WTRU 102.

Although not shown in FIG. 8, the multi-access connection manager 107 may send to the WTRU 102 a request to modify the wtru-modification request instead of sending the updated-nw request (806). This request ("nw-modification request") may be carried in a Mod-BU message, as well. The Mod-BU message may include requested modifications to the wtru-modification request. The Mod-BU message may also include a modification-request identifier to differentiate the nw-modification request from other requests (e.g., the wtru-modification request). The WTRU 102 may accept or reject nw-modification request, and notify the multi-access connection manager 107, accordingly.

Alternatively, the WTRU 102 may send another wtru-modification request to continue negotiating with the multi-access connection manager 107. The multi-access connection manager 107 may accept or reject the last received wtru-modification request, and notify the WTRU 102, accordingly. The multi-access connection manager 107 may send yet another nw-modification request to continue negotiating with the WTRU 102. The multi-access connection manager 107 and WTRU 102 may continue negotiations until agreement, indefinitely or until reaching a limit to the amount of negotiation. This limit may be based on time, number of messages, etc.

The process 800 may also be performed for the wtru-initiated request being sent prior to the nw-initiated request. By way of example, the WTRU 102 may send a wtru-initiated request to the multi-access connection manager 107 (802). After sending the wtru-initiated request, the WTRU 102 may await a response (804). While awaiting the response, the WTRU 102 may receive an nw-modification request from the multi-access connection manager 107 (806).

After extracting the requested modifications, the WTRU 102 may send to the multi-access connection manager 107 a request that includes the requested modifications ("updated-wtru request") (808). Thereafter, the WTRU 102 may use a Mod-BU message to send the updated-wtru request. The Mod-BU message may include a modification-request identifier along with the updated-wtru request. The WTRU 102 may obtain an acceptance of the updated-wtru request (810). The WTRU 102 may, for example, receive from the multi-access connection manager 107 an acknowledgement of the updated-wtru request, which includes the acceptance of the updated-wtru request. The acknowledgement may be carried in a BA message sent from the multi-access connection manager 107. Alternatively, the WTRU 102 may infer the acceptance from (i) receipt of a BA message, (ii) not receiving a response to the Mod-BU message or (iii) not receiving a rejection of the request from the multi-access connection manager 107.

Figure 9:
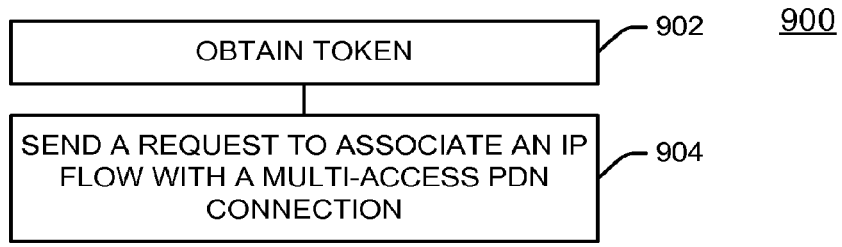
FIG. 9 is a flow diagram illustrating an example of a flow for performing IFOM across multiple access technologies.

FIG. 9 is a flow diagram illustrating an example of a process 900 for performing IFOM across multiple access technologies. The process 900 may be performed after a multi-access PDN connection is established, as, for example, by the process 200 of FIG. 2. The process 900 may be performed after a multi-access PDN connection is established in other ways, as well. The process 900 may be used to resolve and/or avert potential collisions between an nw-initiated IFOM request and a wtru-initiated IFOM request. To facilitate the process 900, a token, whose possession is required to initiate an IFOM request, may be made available to the multi-access connection manager 107 and to the WTRU 102. The token may be maintained by either the multi-access connection manager 107 or the WTRU 102 by default, and returned when not being used. Alternatively, a network entity of the network 103 may maintain the token, and issue it to the multi-access connection manager 107 or the WTRU 102 on request. As another alternative, an instance of the token may be generated when another instance is not in use. The token instance may expire after use or other event (e.g., a given time period). For simplicity of exposition, the process 900 assumes the WTRU 102 possesses the token by default.

As shown in block 902, the multi-access connection manager 107 may obtain the token. Given the token is possessed by the WTRU 102, the multi-access connection manager 107 may send to the WTRU 102 a message for requesting for the token ("token-request message"). The token-request message may be sent over the multi-access PDN connection or, alternatively, over another connection with the WTRU 102.

Responsive to the token-request message, the WTRU 102 may send the token to the multi-access connection manager 107. After obtaining the token, the multi-access connection manager 107 may send to the WTRU 102 an nw-initiated request to associate a given IP flow with the multi-access PDN connection, as shown in block 904.

The process 900 may also be performed by the WTRU 102 for a wtru-initiated IFOM request. Additionally, the multi-access connection manager 107 and the WTRU 102 may pass the token back and forth so as to facilitate a change in priority. Further, as one of ordinary skill in the art will appreciate, the process 900 may be appended to flows 300, 400 and 500 as an alternative to, or in lieu of, blocks 304, 404 and 502, respectively.

Figure 10:
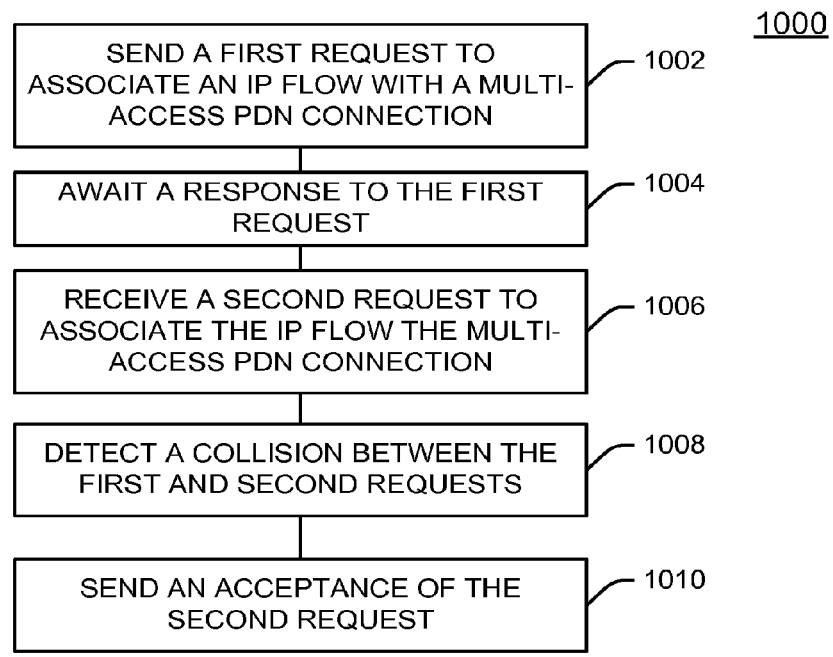
FIG. 10 is a flow diagram illustrating an example of a flow for performing IFOM across multiple access technologies.

FIG. 10 is a flow diagram illustrating an example of a process 1000 for performing IFOM across multiple access technologies. The process 1000 may be performed after a multi-access PDN connection is established, as, for example, by the process 200 of FIG. 2. The process 1000 may be performed after a multi-access PDN connection is established in other ways, as well. The process 1000 may be used to resolve and/or avert potential collisions between an nw-initiated IFOM request and a wtru-initiated IFOM request.

As shown in block 1002, the multi-access connection manager 107 may send an nw-initiated request to the WTRU 102 to associate a given IP flow with the multi-access PDN connection. The multi-access connection manager 107 may use a BU message to send the nw-initiated request.

After sending the nw-initiated request, the multi-access connection manager 107 may await a response, as shown in block 1004. While awaiting the response, the multi-access connection manager 107 may receive from the WTRU 102 a wtru-initiated request to associate the given IP flow with the multi-access PDN connection, as shown in block 1006. The WTRU 102 may use a BU message to send the wtru-initiated request.

As shown in block 1008, the multi-access connection manager 107 may detect a collision between the nw-initiated and wtru-initiated requests. The multi-access connection manager 107 may, for example, detect the collision as a result of recognizing receipt of the wtru-initiated request after sending the nw-initiated request and while awaiting a response to the nw-initiated request. Responsive to detecting the collision, the multi-access connection manager 107 may send an acceptance to the wtru-initiated request to the WTRU 102, as shown in block 1010.

Although the foregoing presumes performing the process 1000 for an nw-initiated IFOM request, the process 1000 may be performed for a wtru-initiated IFOM request, as well. For example, the WTRU 102 may send a wtru-initiated request to the multi-access connection manager 107 to associate a given IP flow with the multi-access PDN connection (1002). The WTRU 102 may use a BU message to send the wtru-initiated request.

After sending the wtru-initiated request, the WTRU 102 may await a response (1004). While awaiting the response, the WTRU 102 may receive from the multi-access connection manager 107 an nw-initiated request to associate the given IP flow with the multi-access PDN connection (1006). The multi-access connection manager 107 may use a BU message to send the nw-initiated request. The WTRU 102 may detect a collision between the nw-initiated and wtru-initiated requests (1008), for example, as a result of recognizing receipt of the nw-initiated request while awaiting a response to the wtru-initiated request. Responsive to the collision, the WTRU 102 may send an acceptance to the wtru-initiated request to the multi-access connection manager 107 (1010).

Figure 11:
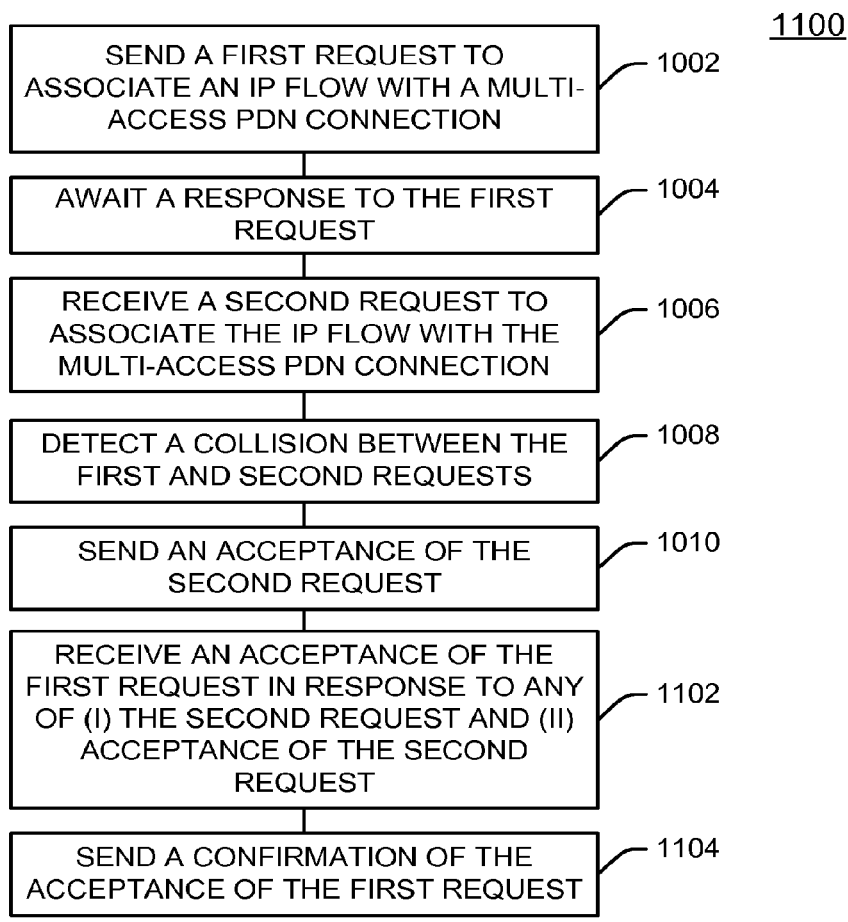
FIG. 11 is a flow diagram illustrating an example of a flow for performing IFOM across multiple access technologies.

Referring now to FIG. 11, a flow diagram illustrating an example of a process 1100 for performing IFOM across multiple access technologies is shown. The process 1100 of FIG. 11 is similar to the process 1000 of FIG. 10, except as described below.

As shown in block 1102, the multi-access connection manager 107 may receive from the WTRU 102 an acceptance of the nw-initiated request in responsive to any of the nw-initiated request and the acceptance of the wtru-initiated request. The acceptance of the nw-initiated request may be sent using a BU message. The multi-access connection manager 107 may send to the WTRU 102 a confirmation of the acceptance of the nw-initiated request, as shown in block 1104. The confirmation may be sent using a signaling message configured to confirm an acceptance of a previously accepted binding request ("binding confirmation message").

Although the foregoing presumes performing the process 1100 for an nw-initiated IFOM request, the process 1100 may be performed for a wtru-initiated IFOM request, as well.

FIGS. 12A-12E (collectively "FIG. 12") are block diagrams illustrating an example communications system 1200 in which one or more disclosed embodiments may be implemented. Like the communications system 100, the communications system 1200 may be suitable for implementing and/or carrying out any of bandwidth management, bandwidth aggregation and IFOM across multiple access technologies.

The communications system 1200 may be a multiple access system that provides content, such as voice, data, video, messaging, broadcast, etc., to multiple wireless users. For instance, the communications system 1200 may define an architecture that supports a plurality of access systems over which the multiple wireless users may access and/or exchange the content, and that supports having two or more of the access systems use and/or be configured in accordance with multiple access technologies. The communications system 1200 may enable the wireless users to access the content through sharing and/or distribution of system resources, including, for example, wireless bandwidth. The communications system 1200, for example, may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

The communications system 1200 may include wireless transmit/receive units ("WTRUs") 1202*a*, 1202*b*, 1202*c* and 1202*d*, a radio access network ("RAN") 1204, a core network 1206, a public switched telephone network ("PSTN") 1208, an internet 1210, and other networks 1212, though it will be appreciated that the disclosed embodiments contemplate any number of WTRUs, base stations, networks, and/or network elements.

Each of the WTRUs 1202*a*, 1202*b*, 1202*c* and 1202*d* may be any type of device configured to operate and/or communicate in a wireless environment. By way of example, the WTRUs 1202*a*, 1202*b*, 1202*c* and 1202*d* may be configured to transmit and/or receive wireless signals, and may include user equipment ("UE"), a mobile station, a fixed or mobile subscriber unit, a pager, a cellular telephone, a personal digital assistant ("PDA"), a Smartphone, a laptop, a netbook, a personal computer, a wireless sensor, consumer electronics, and the like.

The communications system 1200 may also include a base station 1214*a* and a base station 1214*b*. Each of the base stations 1214*a*, 1214*b* may be any type of device configured to wirelessly interface with at least one of the WTRUs and 1202*d*, and may facilitate access to one or more communication networks, such as the core network 1206, the internet 1210, and/or the other networks 1212. The base stations 1214a, 1214b may be, for example, any of a base transceiver station ("BTS"), a Node-B, an eNodeB, a Home Node-B, a Home eNodeB, a site controller, an access point ("AP"), a wireless router, and the like. Although depicted as a single element, each of the base stations 1214a, 1214b may nonetheless include any number of communicatively coupled base stations and/or network elements.

The base station 1214a may be part of the RAN 1204. As described in more detail below, the RAN 1204 may include base stations and/or network elements other than the base station 1214a (not shown), such as a base station controller ("BSC"), a radio network controller ("RNC"), relay nodes, etc. The base station 1214a and/or the base station 1214b may be configured to transmit and/or receive wireless signals within a particular geographic region, which may be referred to as a cell (not shown). The cell may further be divided into cell sectors. For example, the cell associated with the base station 1214a may be divided into three sectors. Thus, in one embodiment, the base station 1214a may include three transceivers, i.e., one for each sector of the cell. In another embodiment, the base station 1214a may employ multiple-input multiple output ("MIMO") technology and, therefore, may utilize multiple transceivers for each sector of the cell.

The base stations 1214a, 1214b may communicate with one or more of the WTRUs 1202a, 1202b, 1202c and 1202d over an air interface 1216, which may be any suitable wireless communication link (e.g., radio frequency ("RF"), microwave, infrared ("IR"), ultraviolet ("UV"), visible light, etc.). The air interface 1216 may be established using any suitable radio access technology ("RAT").

More specifically, as noted above, the communications system 1200 may be a multiple access system and may employ one or more channel access schemes, such as CDMA, TDMA, FDMA, OFDMA, SC-FDMA, and the like. For example, the base station 1214a in the RAN 1204 and the WTRUs 1202a, 1202b and 1202c may implement a radio technology such as Universal Mobile Telecommunications System ("UMTS") Terrestrial Radio Access ("UTRA"), which may establish the air interface 1216 using wideband CDMA ("WCDMA"). WCDMA may include communication protocols such as High-Speed Packet Access ("HSPA") and/or Evolved HSPA ("HSPA+"). HSPA may include High-Speed DL Packet Access ("HSDPA") and/or High-Speed UL Packet Access ("HSUPA").

In another embodiment, the base station 1214a and the WTRUs 1202a, 1202b and 1202c may implement a radio technology such as Evolved UMTS Terrestrial Radio Access ("E-UTRA"), which may establish the air interface 1216 using Long Term Evolution ("LTE") and/or LTE-Advanced ("LTE-A").

In other embodiments, the base station 1214a and the WTRUs 1202a, 1202b and 1202c may implement radio technologies such as IEEE 802.16 (i.e., Worldwide Interoperability for Microwave Access ("WiMAX")), CDMA2000, CDMA2000 12X, CDMA2000 EV-DO, Interim Standard 2000 ("IS-2000"), Interim Standard 95 ("IS-95"), Interim Standard 856 ("IS-856"), Global System for Mobile communications ("GSM"), Enhanced Data rates for GSM Evolution ("EDGE"), GSM EDGE ("GERAN"), and the like.

Figure 12A:
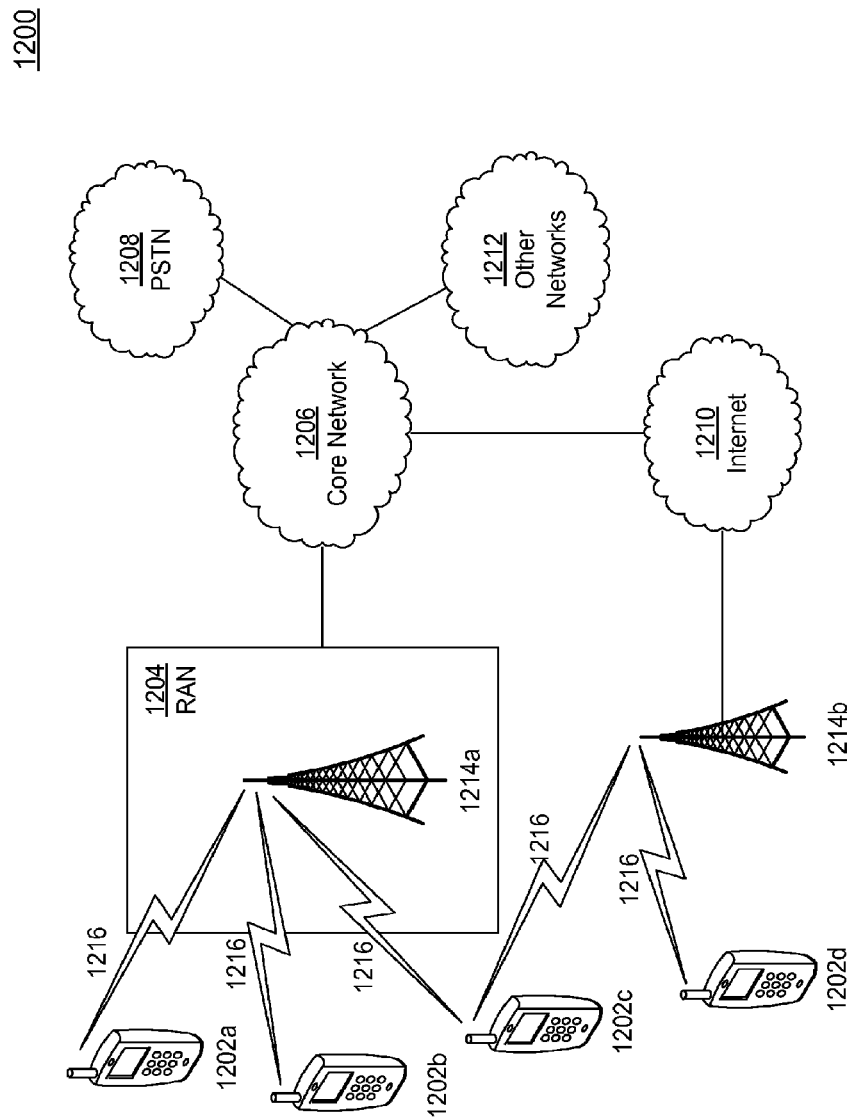
FIG. 12A is a block diagram illustrating an example of a communications system in which one or more disclosed embodiments may be implemented and/or carried out.

The base station 1214b in FIG. 12A may be a wireless router, Home Node-B, Home eNodeB, or access point, for example, and may utilize any suitable RAT for facilitating wireless connectivity in a localized area, such as a place of business, a home, a vehicle, a campus, and the like. In one embodiment, the base station 1214b and the WTRUs 1202c, 1202d may implement a radio technology such as IEEE 802.11 to establish a wireless local area network ("WLAN"). In another embodiment, the base station 1214b and the WTRUs 1202c, 1202d may implement a radio technology such as IEEE 802.15 to establish a wireless personal area network ("WPAN"). In yet another embodiment, the base station 1214b and the WTRUs 1202c, 1202d may utilize a cellular-based RAT (e.g., WCDMA, CDMA2000, GSM, LTE, LTE-A, etc.) to establish a picocell or femtocell. As shown in FIG. 12A, the base station 1214b may have a direct connection to the Internet 1210. Thus, the base station 1214b may not be required to access the Internet 1210 via the core network 1206.

The RAN 1204 may be in communication with the core network 1206, which may be any type of network configured to provide voice, data, applications, and/or voice over internet protocol ("VoIP") services to one or more of the WTRUs 1202a, 1202b, 1202c and 1202d. For example, the core network 1206 may provide call control, billing services, mobile location-based services, pre-paid calling, Internet connectivity, video distribution, etc., and/or perform high-level security functions, such as user authentication. Although not shown in FIG. 12A, it will be appreciated that the RAN 1204 and/or the core network 1206 may be in direct or indirect communication with other RANs that employ the same RAT as the RAN 1204 or a different RAT. For example, in addition to being connected to the RAN 1204, which may be utilizing an E-UTRA radio technology, the core network 1206 may also be in communication with another RAN (not shown) employing a GSM radio technology.

The core network 1206 may also serve as a gateway for the WTRUs 1202a, 1202b, 1202c and 1202d to access the PSTN 1208, the Internet 1210, and/or other networks 1212. The PSTN 1208 may include circuit-switched telephone networks that provide plain old telephone service ("POTS"). The Internet 1210 may include a global system of interconnected computer networks and devices that use common communication protocols, such as the transmission control protocol ("TCP"), user datagram protocol ("UDP") and the internet protocol ("IP") in the TCP/IP internet protocol suite. The networks 1212 may include wired or wireless communications networks owned and/or operated by other service providers. For example, the networks 1212 may include another core network connected to one or more RANs, which may employ the same RAT as the RAN 1204 or a different RAT.

Some or all of the WTRUs 1202a, 1202b, 1202c and 1202d of the communications system 1200 may include multi-mode capabilities, i.e., the WTRUs 1202a, 1202b, 1202c and 1202d may include multiple transceivers for communicating with different wireless networks over different wireless links. For example, the WTRU 1202c shown in FIG. 12A may be configured to communicate with the base station 1214a, which may employ a cellular-based radio technology, and with the base station 1214b, which may employ an IEEE 802 radio technology.

Figure 12B:
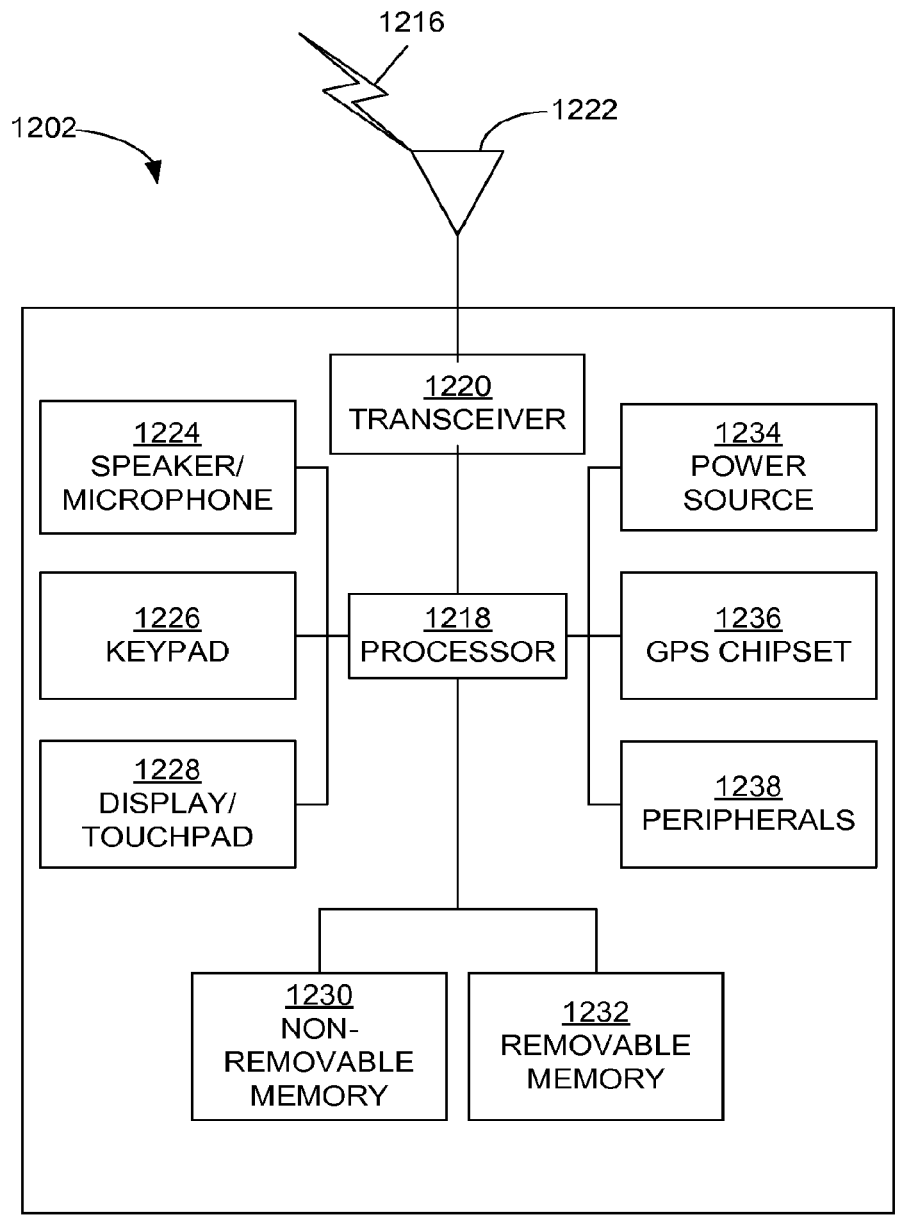
FIG. 12B is a block diagram illustrating an example wireless transmit/receive unit (WTRU) that may be used within the communications system illustrated in FIG. 12A.

FIG. 12B is a block diagram illustrating example architecture of a WTRU, such as the WTRU 1202 of FIG. 12A. As shown in FIG. 12B, the WTRU 1202 may include a processor 1218, a transceiver 1220, a transmit/receive element 1222, a speaker/microphone 1224, a keypad 1226, a display/touchpad 1228, a non-removable memory 1230, a removable memory 1232, a power source 1234, a global positioning system ("GPS") chipset 1236, and other peripherals 1238. It will be appreciated that the WTRU 1202 may include any sub-combination of the foregoing elements while remaining consistent with an embodiment.

The processor 1218 may be a general purpose processor, a special purpose processor, a conventional processor, a digital signal processor ("DSP"), a plurality of microprocessors, one or more microprocessors in association with a DSP core, a controller, a microcontroller, Application Specific Integrated Circuits ("ASICs"), Field Programmable Gate Array ("FP-GAs") circuits, any other type of integrated circuit ("IC"), a state machine, and the like. The processor 1218 may perform signal coding, data processing, power control, input/output processing, and/or any other functionality that enables the WTRU 1202 to operate in a wireless environment. The processor 1218 may be coupled to the transceiver 1220, which may be coupled to the transmit/receive element 1222. While FIG. 12B depicts the processor 1218 and the transceiver 1220 as separate components, it will be appreciated that the processor 1218 and the transceiver 1220 may be integrated together in an electronic package or chip.

The transmit/receive element 1222 may be configured to transmit signals to, or receive signals from, a base station (e.g., the base station 1214a) over the air interface 1216. For example, in one embodiment, the transmit/receive element 1222 may be an antenna configured to transmit and/or receive RF signals. In another embodiment, the transmit/receive element 1222 may be an emitter/detector configured to transmit and/or receive IR, UV, or visible light signals, for example. In yet another embodiment, the transmit/receive element 1222 may be configured to transmit and receive both RF and light signals. It will be appreciated that the transmit/receive element 1222 may be configured to transmit and/or receive any combination of wireless signals.

In addition, although the transmit/receive element 1222 is depicted in FIG. 12B as a single element, the WTRU 1202 may include any number of transmit/receive elements 1222. More specifically, the WTRU 1202 may employ MIMO technology. Thus, in one embodiment, the WTRU 1202 may include two or more transmit/receive elements 1222 (e.g., multiple antennas) for transmitting and receiving wireless signals over the air interface 1216.

The transceiver 1220 may be configured to modulate the signals that are to be transmitted by the transmit/receive element 1222 and to demodulate the signals that are received by the transmit/receive element 1222. As noted above, the WTRU 1202 may have multi-mode capabilities. Thus, the transceiver 1220 may include multiple transceivers for enabling the WTRU 1202 to communicate via multiple RATs, such as UTRA and IEEE 802.11, for example.

The processor 1218 of the WTRU 1202 may be coupled to, and may receive user input data from, the speaker/microphone 1224, the keypad 1226, and/or the display/touchpad 1228 (e.g., a liquid crystal display ("LCD") display unit or organic light-emitting diode ("OLED") display unit). The processor 1218 may also output user data to the speaker/microphone 1224, the keypad 1226, and/or the display/touchpad 1228. In addition, the processor 1218 may access information from, and store data in, any type of suitable memory, such as the non-removable memory 1230 and/or the removable memory 1232. The non-removable memory 1230 may include random-access memory ("RAM"), read-only memory ("ROM"), a hard disk, or any other type of memory storage device. The removable memory 1232 may include a subscriber identity ("ID") module ("SIM") card, a memory stick, a secure digital ("SD") memory card, and the like. In other embodiments, the processor 1218 may access information from, and store data in, memory that is not physically located on the WTRU 1202, such as on a server or a home computer (not shown).

The processor 1218 may receive power from the power source 1234, and may be configured to distribute and/or control the power to the other components in the WTRU 1202. The power source 1234 may be any suitable device for powering the WTRU 1202. For example, the power source 1234 may include one or more dry cell batteries (e.g., nickel-cadmium ("NiCd"), nickel-zinc ("NiZn"), nickel metal hydride ("NiMH"), lithium-ion ("Li-ion"), etc.), solar cells, fuel cells, and the like.

The processor 1218 may also be coupled to the GPS chipset 1236, which may be configured to provide location information (e.g., longitude and latitude) regarding the current location of the WTRU 1202. In addition to, or in lieu of, the information from the GPS chipset 1236, the WTRU 1202 may receive location information over the air interface 1216 from a base station (e.g., base stations 1214a, 1214b) and/or determine its location based on the timing of the signals being received from two or more nearby base stations. It will be appreciated that the WTRU 1202 may acquire location information by way of any suitable location-determination method while remaining consistent with an embodiment.

The processor 1218 may further be coupled to other peripherals 1238, which may include one or more software and/or hardware modules that provide additional features, functionality and/or wired or wireless connectivity. For example, the peripherals 1238 may include an accelerometer, an e-compass, a satellite transceiver, a digital camera (for photographs or video), a universal serial bus ("USB") port, a vibration device, a television transceiver, a hands free headset, a Bluetooth® module, a frequency modulated ("FM") radio unit, a digital music player, a media player, a video game player module, an Internet browser, and the like.

Figure 12C:
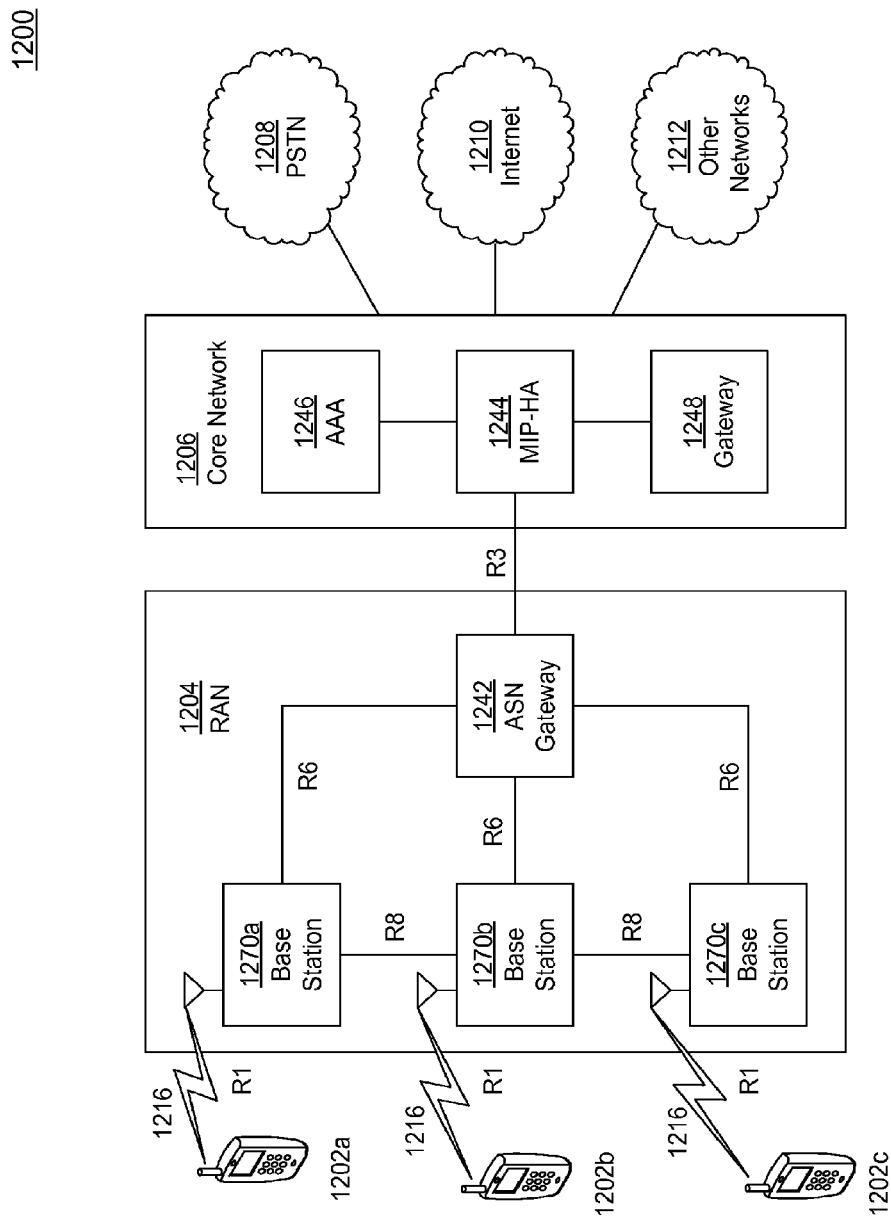
FIG. 12C is a block diagram illustrating an example radio access network ("RAN") and an example core network ("CN") that may be used within the communications system illustrated in FIG. 12A.

FIG. 12C is a block diagram illustrating example architectures of the RAN 1204 and core network 1206 according to an embodiment. The RAN 1204 may be an access service network ("ASN") that employs IEEE 802.16 radio technology to communicate with the WTRUs 1202a, 1202b and 1202c over the air interface 1216. As will be further discussed below, the communication links between the different functional entities of the WTRUs 1202a, 1202b and 1202c, the RAN 1204, and the core network 1206 may be defined as reference points.

As shown in FIG. 12C, the RAN 1204 may include base stations 1270a, 1270b and 1270c, and an ASN gateway 1242, though it will be appreciated that the RAN 1204 may include any number of base stations and ASN gateways while remaining consistent with an embodiment. The base stations 1270a, 1270b and 1270c may each be associated with a particular cell (not shown) in the RAN 1204 and may each include one or more transceivers for communicating with the WTRUs 1202a, 1202b and 1202c over the air interface 1216. In one embodiment, the base stations 1270a, 1270b and 1270c may implement MIMO technology. Thus, the base station 1270a, for example, may use multiple antennas to transmit wireless signals to, and receive wireless signals from, the WTRU 1202a. The base stations 1270a, 1270b and 1270c may also provide mobility management functions, such as handoff triggering, tunnel establishment, radio resource management, traffic classification, quality of service ("QoS") policy enforcement, and the like. The ASN gateway 1242 may serve as a traffic aggregation point and may be responsible for paging, caching of subscriber profiles, routing to the core network 1206, and the like.

The air interface 1216 between the WTRUs 1202a, 1202b and 1202c and the RAN 1204 may be defined as an R1 reference point that implements the IEEE 802.16 specification. In addition, each of the WTRUs 1202a, 1202b and 1202c may establish a logical interface (not shown) with the core network 1206. The logical interface between the WTRUs 1202a, 1202b and 1202c and the core network 1206 may be defined as an R2 reference point, which may be used for authentication, authorization, IP host configuration management, and/or mobility management.

The communication link between each of the base stations 1240a, 1240b and 1240c may be defined as an R8 reference point that includes protocols for facilitating WTRU handovers and the transfer of data between base stations. The communication link between the base stations 1240a, 1240b and 1240c and the ASN gateway 1242 may be defined as an R6 reference point. The R6 reference point may include protocols for facilitating mobility management based on mobility events associated with each of the WTRUs 1202a, 1202b, 1200c.

As shown in FIG. 12C, the RAN 1204 may be connected to the core network 1206. The communication link between the RAN 1204 and the core network 1206 may be defined as an R3 reference point that includes protocols for facilitating data transfer and mobility management capabilities, for example. The core network 1206 may include a mobile IP ("MIP") home agent ("MIP-HA") 1244, an authentication, authorization, accounting ("AAA") server 1246, and a gateway 1248. While each of the foregoing elements is depicted as part of the core network 1206, it will be appreciated that any one of these elements may be owned and/or operated by an entity other than the core network operator.

The MIP-HA may be responsible for IP address management, and may enable the WTRUs 1202a, 1202b and 1202c to roam between different ASNs and/or different core networks. The MIP-HA 1244 may provide the WTRUs 1202a, 1202b and 1202c with access to packet-switched networks, such as the Internet 1210, to facilitate communications between the WTRUs 1202a, 1202b and 1202c and IP-enabled devices. The AAA server 1246 may be responsible for user authentication and for supporting user services. The gateway 1248 may facilitate interworking with other networks. For example, the gateway 1248 may provide the WTRUs 1202a, 1202b and 1202c with access to circuit-switched networks, such as the PSTN 1208, to facilitate communications between the WTRUs 1202a, 1202b and 1202c and traditional land-line communications devices. In addition, the gateway 1248 may provide the WTRUs 1202a, 1202b and 1202c with access to the networks 1212, which may include other wired or wireless networks that are owned and/or operated by other service providers.

Although not shown in FIG. 12C, it will be appreciated that the RAN 1204 may be connected to other ASNs and the core network 1206 may be connected to other core networks. The communication link between the RAN 1204 the other ASNs may be defined as an R4 reference point, which may include protocols for coordinating the mobility of the WTRUs 1202a, 1202b and 1202c between the RAN 1204 and the other ASNs. The communication link between the core network 1206 and the other core networks may be defined as an R5 reference, which may include protocols for facilitating interworking between home core networks and visited core networks.

Figure 12D:
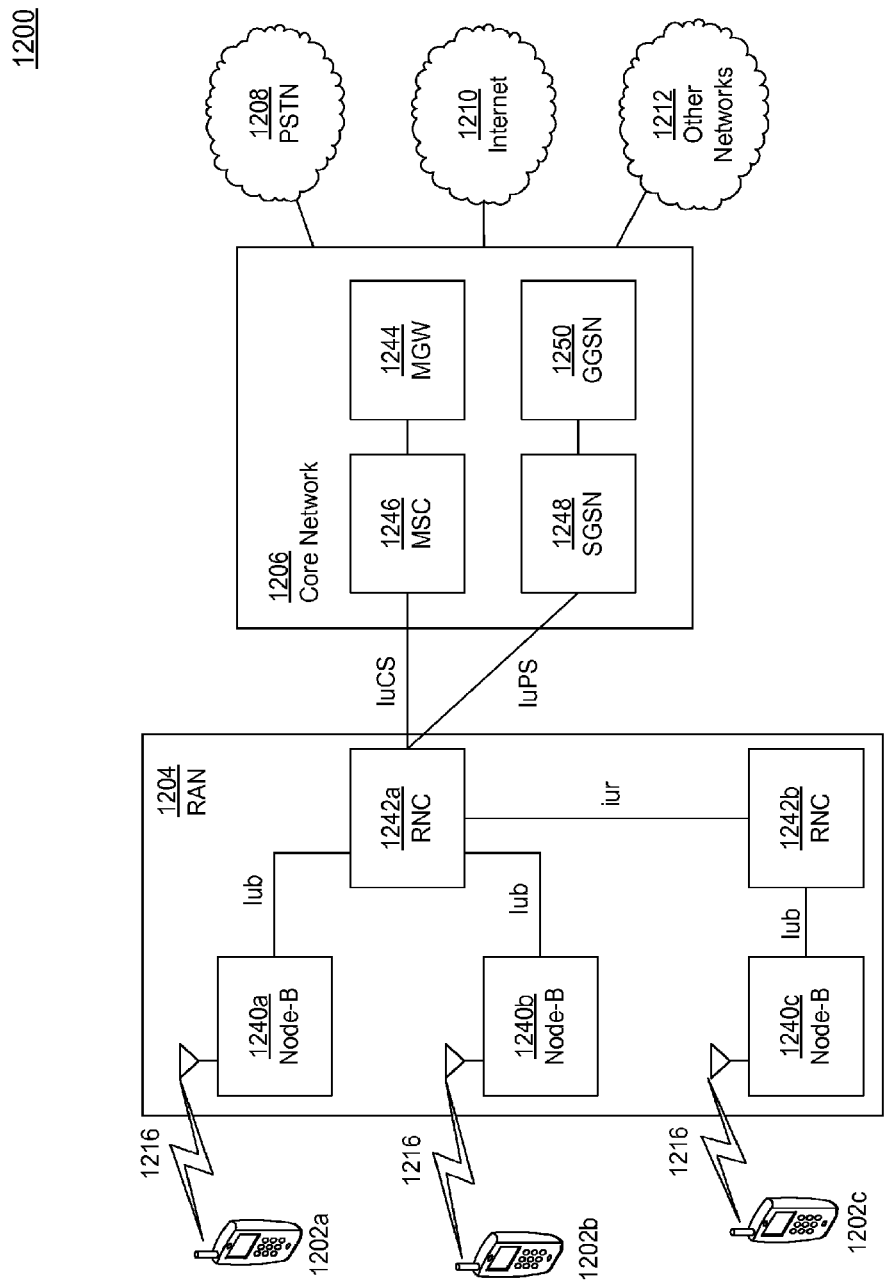
FIG. 12D is a block diagram illustrating an example of a RAN and a example of a CN.

FIG. 12D is a block diagram illustrating an example of the RAN 1204 and the core network 1206. As noted above, the RAN 1204 may employ a UTRA radio technology to communicate with the WTRUs 1202a, 1202b and 1202c over the air interface 1216. The RAN 1204 may also be in communication with the core network 1206. As shown in FIG. 12D, the RAN 1204 may include Node-Bs 1240a, 1240b and 1240c, which may each include one or more transceivers for communicating with the WTRUs 1202a, 1202b and 1202c over the air interface 1216. The Node-Bs 1240a, 1240b and 1240c may each be associated with a particular cell (not shown) within the RAN 1204. The RAN 1204 may also include RNCs 1242a, 1242b. It will be appreciated that the RAN 1204 may include any number of Node-Bs and RNCs while remaining consistent with an embodiment.

As shown in FIG. 12D, the Node-Bs 1240a, 1240b may be in communication with the RNC 1242a. Additionally, the Node-B 1240c may be in communication with the RNC 142b. The Node-Bs 1240a, 1240b and 1240c may communicate with the respective RNCs 1242a, 1242b via an Iub interface. The RNCs 1242a, 1242b may be in communication with one another via an Iur interface. Each of the RNCs 1242a, 1242b may be configured to control the respective Node-Bs 1240a, 1240b and 1240c to which it is connected. In addition, each of the RNCs 1242a, 1242b may be configured to carry out or support other functionality, such as outer loop power control, load control, admission control, packet scheduling, handover control, macrodiversity, security functions, data encryption, and the like.

The core network 1206 shown in FIG. 12D may include a media gateway ("MGW") 1244, a mobile switching center ("MSC") 1246, a serving GPRS support node ("SGSN") 1248, and/or a gateway GPRS support node ("GGSN") 1250. While each of the foregoing elements is depicted as part of the core network 1206, it will be appreciated that any one of these elements may be owned and/or operated by an entity other than the core network operator.

The RNC 1242a in the RAN 1204 may be connected to the MSC 1246 in the core network 1206 via an IuCS interface. The MSC 1246 may be connected to the MGW 1244. The MSC 1246 and the MGW 1244 may provide the WTRUs 1202a, 1202b and 1202c with access to circuit-switched networks, such as the PSTN 1208, to facilitate communications between the WTRUs 1202a, 1202b and 1202c and traditional land-line communications devices.

The RNC 1242a in the RAN 1204 may also be connected to the SGSN 1248 in the core network 1206 via an IuPS interface. The SGSN 1248 may be connected to the GGSN 1250. The SGSN 1248 and the GGSN 1250 may provide the WTRUs 1202a, 1202b and 1202c with access to packet-switched networks, such as the Internet 1210, to facilitate communications between and the WTRUs 1202a, 1202b and 1202c and IP-enabled devices.

As noted above, the core network 1206 may also be connected to the networks 1212, which may include other wired or wireless networks that are owned and/or operated by other service providers.

Figure 12E:
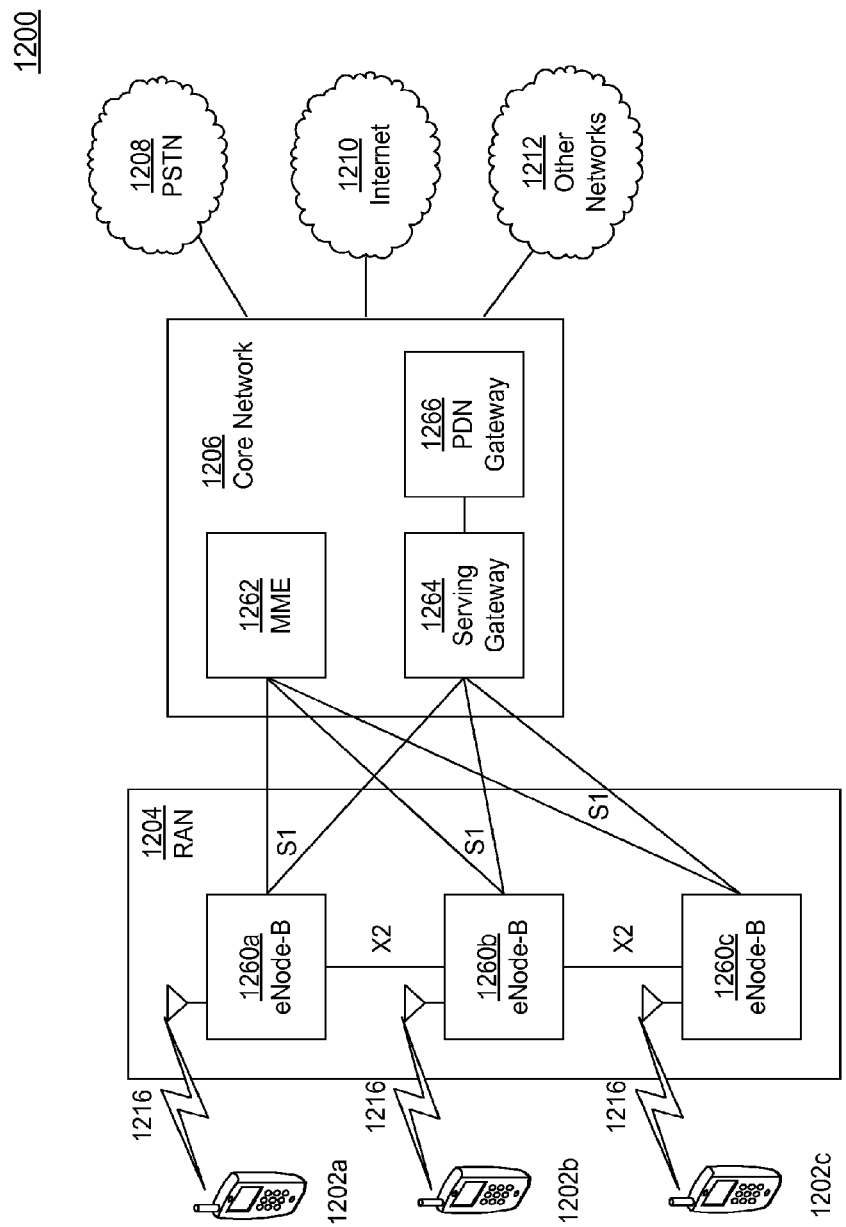
FIG. 12E is a block diagram illustrating an example of a RAN and a example of a CN.

FIG. 12E is a block diagram illustrating an example of the RAN 1204 and the core network 1206. As noted above, the RAN 1204 may employ an E-UTRA radio technology to communicate with the WTRUs 1202a, 1202b and 1202c over the air interface 1216. The RAN 1204 may also be in communication with the core network 1206.

The RAN 1204 may include eNode-Bs 1260a, 1260b and 1260c, though it will be appreciated that the RAN 1204 may include any number of eNode-Bs while remaining consistent with an embodiment. The eNode-Bs 1260a, 1260b and 1260c may each include one or more transceivers for communicating with the WTRUs 1202a, 1202b and 1202c over the air interface 1216. In one embodiment, the eNode-Bs 1260a, 1260b and 1260c may implement MIMO technology. Thus, the eNode-B 1260a, for example, may use multiple antennas to transmit wireless signals to, and receive wireless signals from, the WTRU 1202a.

Each of the eNode-Bs 1260a, 1260b and 1260c may be associated with a particular cell (not shown) and may be configured to handle radio resource management decisions, handover decisions, scheduling of users in the uplink and/or downlink, and the like. As shown in FIG. 12E, the eNode-Bs 1260*a*, 1260*b* and 1260*c* may communicate with one another over an X2 interface.

The core network 1206 shown in FIG. 12E may include a mobility management gateway ("MME") 1262, a serving gateway 1264, and a packet data network ("PDN") gateway 1266. While each of the foregoing elements is depicted as part of the core network 1206, it will be appreciated that any one of these elements may be owned and/or operated by an entity other than the core network operator.

The MME 1262 may be connected to each of the eNode-Bs 1260*a*, 1260*b* and 1260*c* in the RAN 1204 via an S1 interface and may serve as a control node. For example, the MME 1262 may be responsible for authenticating users of the WTRUs 1202*a*, 1202*b* and 1202*c*, bearer activation/deactivation, selecting a particular serving gateway during an initial attach of the WTRUs 1202*a*, 1202*b* and 1202*c*, and the like. The MME 1262 may also provide a control plane function for switching between the RAN 1204 and other RANs (not shown) that employ other radio technologies, such as GSM or WCDMA.

The serving gateway 1264 may be connected to each of the eNode Bs 1260*a*, 1260*b* and 1260*c* in the RAN 1204 via the S1 interface. The serving gateway 1264 may generally route and forward user data packets to/from the WTRUs 1202*a*, 1202*b* and 1202*c*. The serving gateway 1264 may also perform other functions, such as anchoring user planes during inter-eNode B handovers, triggering paging when downlink data is available for the WTRUs 1202*a*, 1202*b* and 1202*c*, managing and storing contexts of the WTRUs 1202*a*, 1202*b* and 1202*c*, and the like.

The serving gateway 1264 may also be connected to the PDN gateway 1266, which may provide the WTRUs 1202*a*, 1202*b* and 1202*c* with access to packet-switched networks, such as the Internet 1210, to facilitate communications between the WTRUs 1202*a*, 1202*b* and 1202*c* and IP-enabled devices.

The core network 1206 may facilitate communications with other networks. For example, the core network 1206 may provide the WTRUs 1202*a*, 1202*b* and 1202*c* with access to circuit-switched networks, such as the PSTN 1208, to facilitate communications between the WTRUs 1202*a*, 1202*b* and 1202*c* and traditional land-line communications devices. For example, the core network 1206 may include, or may communicate with, an IP gateway (e.g., an IP multimedia subsystem ("IMS") server) that serves as an interface between the core network 1206 and the PSTN 1208. In addition, the core network 1206 may provide the WTRUs 1202*a*, 1202*b* and 1202*c* with access to the networks 1212, which may include other wired or wireless networks that are owned and/or operated by other service providers.

Figure 13:
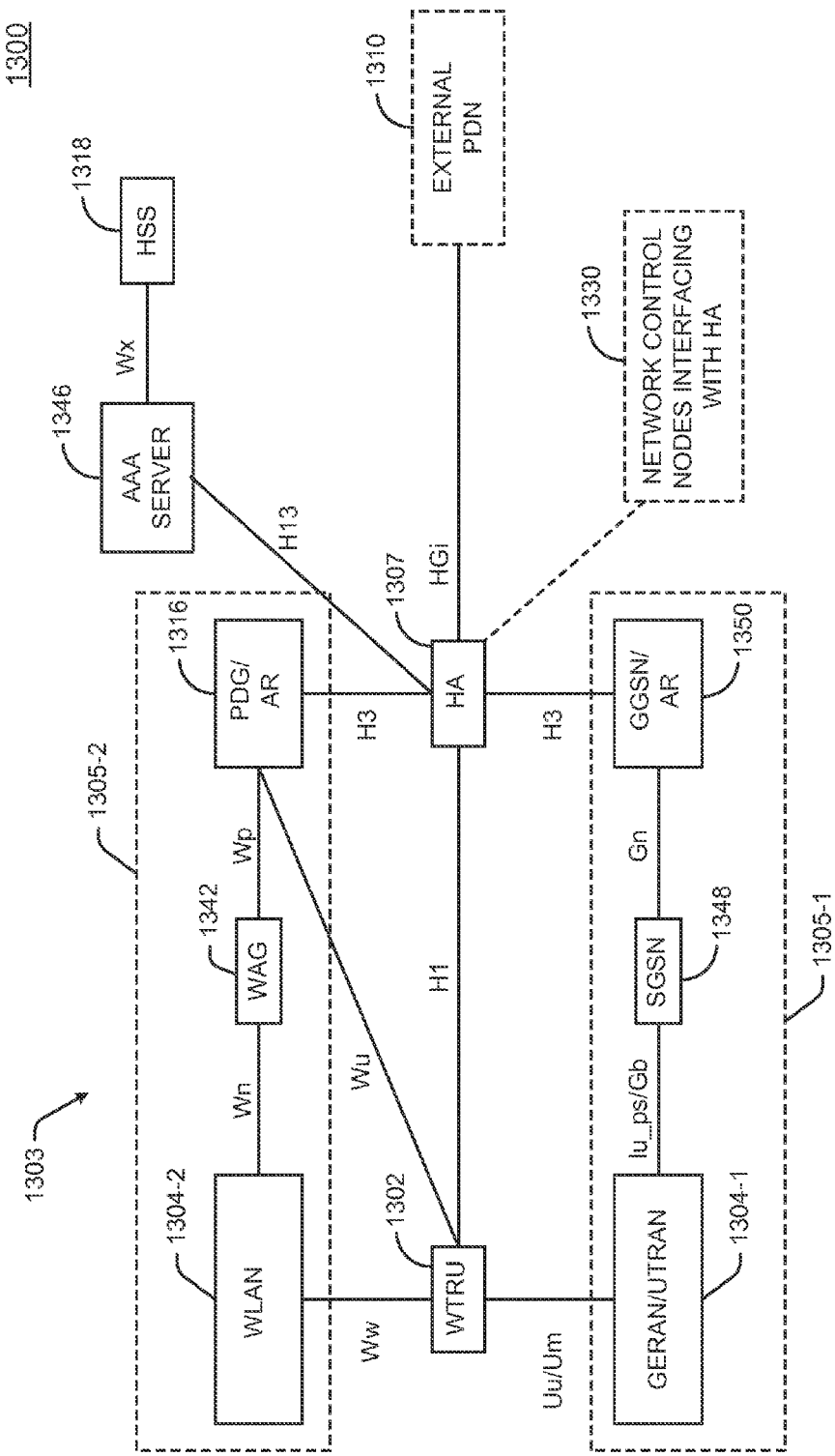
FIG. 13 is a block diagram illustrating an example of a communications system in which one or more disclosed embodiments may be implemented and/or carried out.

FIG. 13 is a block diagram illustrating an example of a communications system 1300 in which one or more disclosed embodiments may be implemented and/or carried out. The communications system 1300 may be suitable for implementing and/or carrying out any of BWM, BWA and IFOM across multiple access technologies. And like the communications systems 100, 1200 of FIGS. 1, 12A-E, respectively, the communications system 1300 may include multiple access systems configured in accordance with multiple access technologies.

The communications system 1300 may include a WTRU 1302 and a network 1303. The network 1303 may be configured, for example, in accordance with a home mobility service architecture for interworking WLAN ("I-WLAN") mobility. The network 1303 may include first and second access systems $1305_1$, $1305_2$, a home agent ("HA") 1307, an authentication, authorization and accounting ("AAA") server 1346, a home subscriber server ("HSS") 1318 and network control nodes 1330 interfacing with the HA 1307. The AAA server 1346 may be, for example, a 3GPP AAA server. As shown, the HA 1307 may communicate with an external PDN 1310 via an HGi interface. The external PDN 1310 may be, for example, any of a public internet network and an operator service network.

The first access system $1305_1$ may be configured in accordance with at least one release of 3GPP, and/or an access technology protocol of a non-3GPP cellular or cellular-like protocol (collectively hereinafter "3GPP/Cellular access system $1305_1$"). The 3GPP/Cellular access system $1305_1$ may include, for example, a GERAN/UTRAN $1304_1$, a SGSN 1348 and a GGSN/access router ("AR") 1350. The GERAN/UTRAN $1304_1$ may communicate with the WTRU 102 via a Uu/Um interface, and with the SGSN 1348 via an Iu_ps/Gb interface. The SGSN 1348 may communicate with the GGSN/AR 1350 using a Gn interface. The GGSN/AR 1350 may communicate with the HA 1307 via a connection established using an H3 reference point ("H3 connectivity").

The second access system $1305_2$ may be configured in accordance with an access technology of a WLAN, WPAN and like-type wireless networks (collectively hereinafter "WLAN access system $1305_2$"). The WLAN access system $1305_2$ may include a WLAN access network $1304_2$, a WLAN access gateway ("WAG") 1342 and a PDG/AR 1316. The WLAN access network $1305_2$ may communicate with the WTRU 1302 via a Ww interface, and with the WAG 1342 via a Wn interface. The WAG 1314, in turn, may communicate with the PDG/AR 1316 using a Wp interface. The PDG/AR 1316 may communicate with the HA 1307 using H3 connectivity.

The WTRU 1302 may communicate with the PDG/AR 1316 via a Wu interface. The Wu interface may be a defined interface of the WLAN access network $1305_2$, for example. The WTRU 1302 and the HA 1307 may communicate via a connection established using, for example, an H1 reference point ("H1 connection"). The H1 connection may be established via any of the 3GPP/Cellular and WLAN access systems $1305_1$, $1305_2$. The H1 interface may be realized via a Dual Stack MIP ("DSMIP") tunnel between the WTRU 1302 and HA 1307 inside an IPSec tunnel between the WTRU 1302 and PDG/AR 1316.

The HA 1307 and WTRU 1302 may, for example, exchange signaling messages over the H1 connection. The signaling messages may include DSMIPv4 signaling messages; DSMIPv6 signaling messages; signaling messages that are based on, extensions of, related to, modifications of the DSMIPv4 and DSMIPv6 signaling messages; and other like-type signaling messages (collectively "DSMIP signaling messages"). Examples of the DSMIP signaling messages include a binding update ("BU") message, a binding acknowledgment ("BA") message, a reject binding update ("Rej-BU") message, a modify binding update request ("Mod-BU") message and a binding confirmation ("BC") message.

The HA 1307 and WTRU 1302 may use the DSMIP signaling messages, for example, to keep track of which of the 3GPP/Cellular and WLAN access systems $1305_1$, $1305_2$ the WTRU 220 is camping on and/or has recently camped on. The HA 1307 and WTRU 1302 may also use the DSMIP signaling messages to facilitate multi access PDN connectivity and IFOM ("MAPIM"), as described in more detail below. The DSMIP signaling messages may traverse the H1 connection using UDP over IP, and may be transparent to the GGSN/AR 1350 and the PDG/AR 1316.

Although the HA 1307 is shown as a stand-alone entity in FIG. 13, the HA 1307 may be co-located with and/or distributed among any of the GGSN/AR 1350, PDG/AR 1316 or another entity of the 3GPP/Cellular and/or WLAN access systems 1305$_1$, 1305$_2$ (not shown). Alternatively, functionality of the HA 1307 may be distributed among any of the GGSN/AR 1350, PDG/AR 1316 or another entity of the 3GPP/Cellular and/or WLAN access systems 1305$_1$, 1305$_2$.

Figure 14A:
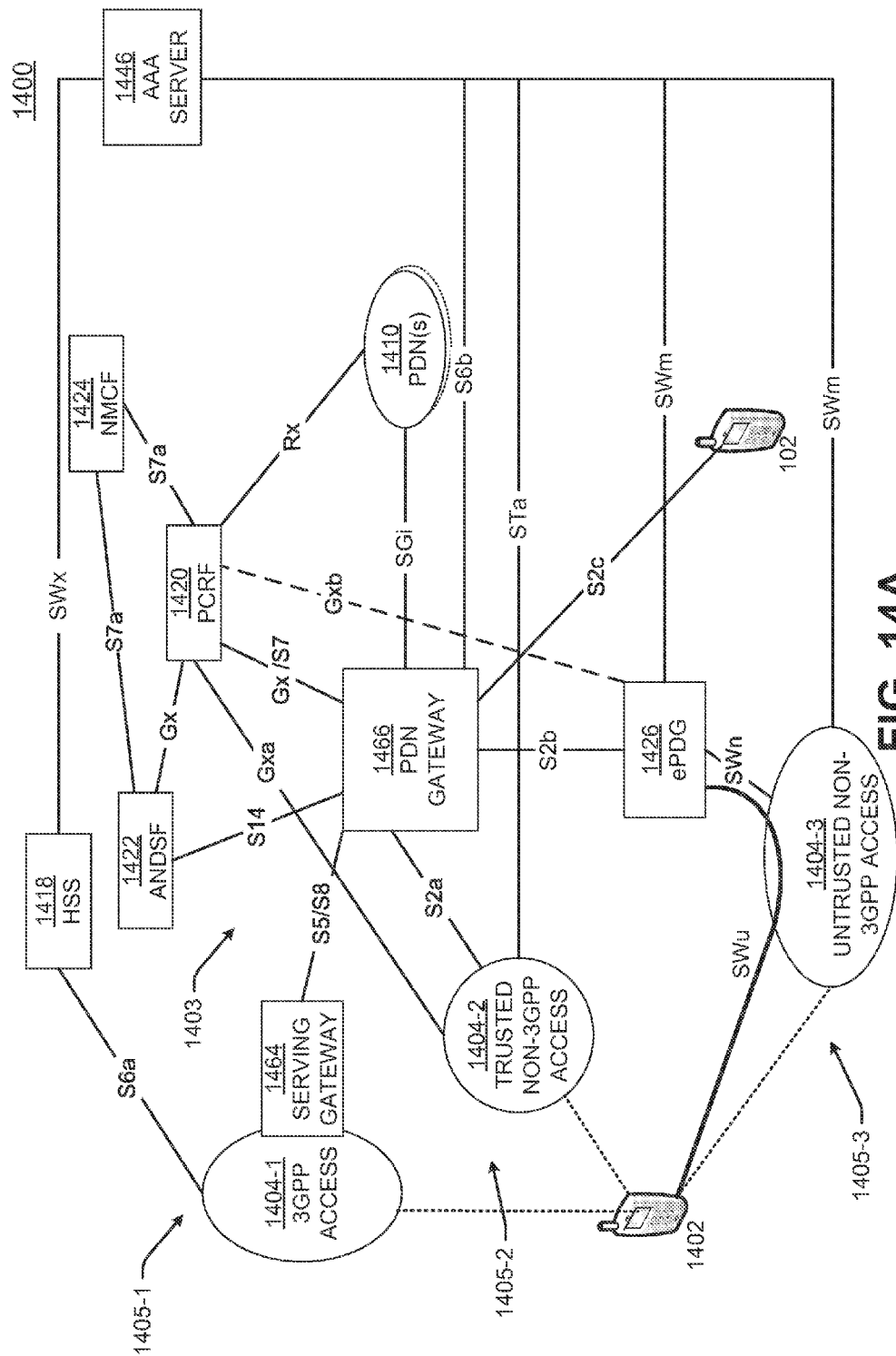

FIGS. 14A-14B are block diagrams illustrating an example of a communications system 1400 in which one or more disclosed embodiments may be implemented and/or carried out. The communications system 1400 may be suitable for implementing and/or carrying out any of bandwidth management, bandwidth aggregation and IFOM across multiple access technologies.

The communications system 1400 may include a WTRU 1402 and an enhanced packet core ("EPC") network (shown generally 1403). The EPC network 1403 may include a 3GPP access 1404$_1$, a trusted non-3GPP access 1404$_2$, an untrusted non-3GPP access 1404$_3$, a HA 1407 (FIG. 14B), a HSS 1418, a policy and charging rules function ("PCRF") 1420, an access network discovery and selection function ("ANDSF") 1422, a network monitoring and control function ("NMCF") 1424, an evolved PDG ("ePDG") 1426, a 3GPP AAA server 1446, a SGW 1464 and a PGW 1466. Although the PGW 1466 includes the functionality of HA 1407, as shown in FIG. 14B, such functionality of the HA 1407 may be implemented as a stand-alone entity, as an entity of the EPC 1403 other than the PGW 1466. As an alternative, the functionality of the HA 1407 may be distributed among a number of entities of the EPC network 1403. As another alternative, the HA 1407 may be co-located with any of the PGW 1466 and another entity of the EPC network 1403 (not shown).

The EPC 1403 may define a 3GPP access system 1405$_1$, a trusted-non-3GPP-access system 1405$_2$ (e.g., a 1evDo access system) and an untrusted-non-3GPP-access system 1405$_3$ (e.g., a WLAN access system). As shown, the 3GPP access system 1405$_1$ may include the 3GPP access network 1404$_1$, the SGW 1464 and the PGW 1466. The trusted-non-3GPP-access system 1405$_2$ may include the trusted non-3GPP access 1404$_2$, and the PGW 1466. The untrusted-non-3GPP-access system 1405$_3$ may include the untrusted non-3GPP access 1404$_3$, the ePDG 1426 and the PGW 1466.

The WTRU 1402 may exchange DSMIP signaling messages with the HA 1407 via any of the 3GPP access system 1405$_1$, trusted-non-3GPP-access system 1405$_2$ and untrusted-non-3GPP-access system 1405$_3$. The DSMIP signaling messages may be carried via an S2c interface or any other suitable interface.

The NMCF 1424 may collect metrics (e.g., any of congestion, connectivity, loads, latency, etc.) for local radio and backhaul links via interfaces on the 3GPP access 1404$_1$, trusted non-3GPP access 1404$_2$, and untrusted non-3GPP access 1404$_3$. These local radio and backhaul metrics may include radio reports obtained from the WTRU 1402 ("WTRU radio reports"), from the untrusted non-3GPP access 1404$_3$ (e.g., WLAN AP radio reports"), and from the 3GPP access 1404$_1$ (e.g., eNB radio network reports). For scalability, these local radio and backhaul metrics may be aggregated by network edge nodes (aggregation points) for exchange with the NMCF 1424. The ePDG 1426 may be the aggregation point for links of the untrusted non-3GPP access 1404$_3$. For the 3GPP access 1404$_1$, the SGW 1464 may be the aggregation point for the multiple eNBs. Aggregation may be based on an OAM-type interface to permit information such as performance data and alarm notifications are conveyed, however real-time status is required for making accurate decisions. The latter may include probing or passive monitoring techniques. One such function is the generation of statistics related to packet retransmissions. When the number or rate of retransmissions in a particular RAT reaches an operator's defined maximum, or retransmission threshold, the NMCF 1424 may send such statistics to a retransmission coordination function ("RCF")(not shown). Such statistics may be sent on a per-access-basis. Retransmission threshold values may be defined as policies per access in an evolved PCRF ("ePCRF").

The NMCF 1424 may provide the information to a BWM function ("BWMF") that may also be implemented as part of an evolved and/or enhanced PCEF ("ePCEF"). The NMCF 1424 may directly exchange information with the PCRF 1420 via an interface defined between the NMCF 1424 and PCRF 1420; for example interface S7a. This S7a may be based on a modification on S7/Gx interface.

The NMCF 1424 may send to an enhanced ANDSF ("eANDSF") updates for modifying WTRU-specific policies based on current network loads. The WTRU 1402 may request this information from the eANDSF as required or it may be pushed to the WTRU 1402 based on some event trigger.

Alternatively, the NMCF 1424 may send updates to a subscriber profile repository ("SPR") that may be enhanced (e.g, configured) with BWM policy-related information, if, for example, a direct interface between NMCF and eANDSF is not available. The enhanced SPR ("eSPR") may provide such updates to the eANDSF so as to allow to the eANDSF to modify the WTRU-specific policies based on current network loads. An interface between eANDSF and eSPR may be realized as a manifestation of the Ud interface. An interface the NMCF 1424 and ePCRF may also be realized via Ud.

To enable IP flow level control, the ANDSF 1422 may include IP flow class specific inter system mobility policies. These inter-system mobility policies may be provided by a network operator, and may be defined per access point name ("APN"), per IP flow class under any APN or per IP flow class under a specific APN.

The IP flow class may be identified via any of a media type (e.g. audio), IMS Communication Service Identifier (e.g., MMTEL) for IMS applications and respective 5-tuple (IP source address, IP destination address, source port, destination port, protocol type) for any type of application. The 5-tuple may include wildcard values in any of the possible fields. For example, the ANDSF 1422 may indicate that 3GPP has a highest priority access for a given IP flow class, and a Wi-Fi has a highest priority access for another IP flow class.

When establishing the connection with the ANDSF 1422, the WTRU 1402 may indicate to the ANDSF 1422 a capability to support IP flow class specific inter system mobility policies. Based on policies provided by the ANDSF 1422, the WTRU 1402 may send a request to the HA 1407 to route IP flows to an appropriate access.

The WTRU 1402 may include an application, e.g., a client application, to facilitate exchange of the DSMIP signaling messages and/or user data transfer with the HA 1407 (hereinafter "DSMIP client"). The DSMIP client may be configured with IFOM functionality, as well. The HA 1407 may include corresponding functionality.

Figure 15A:
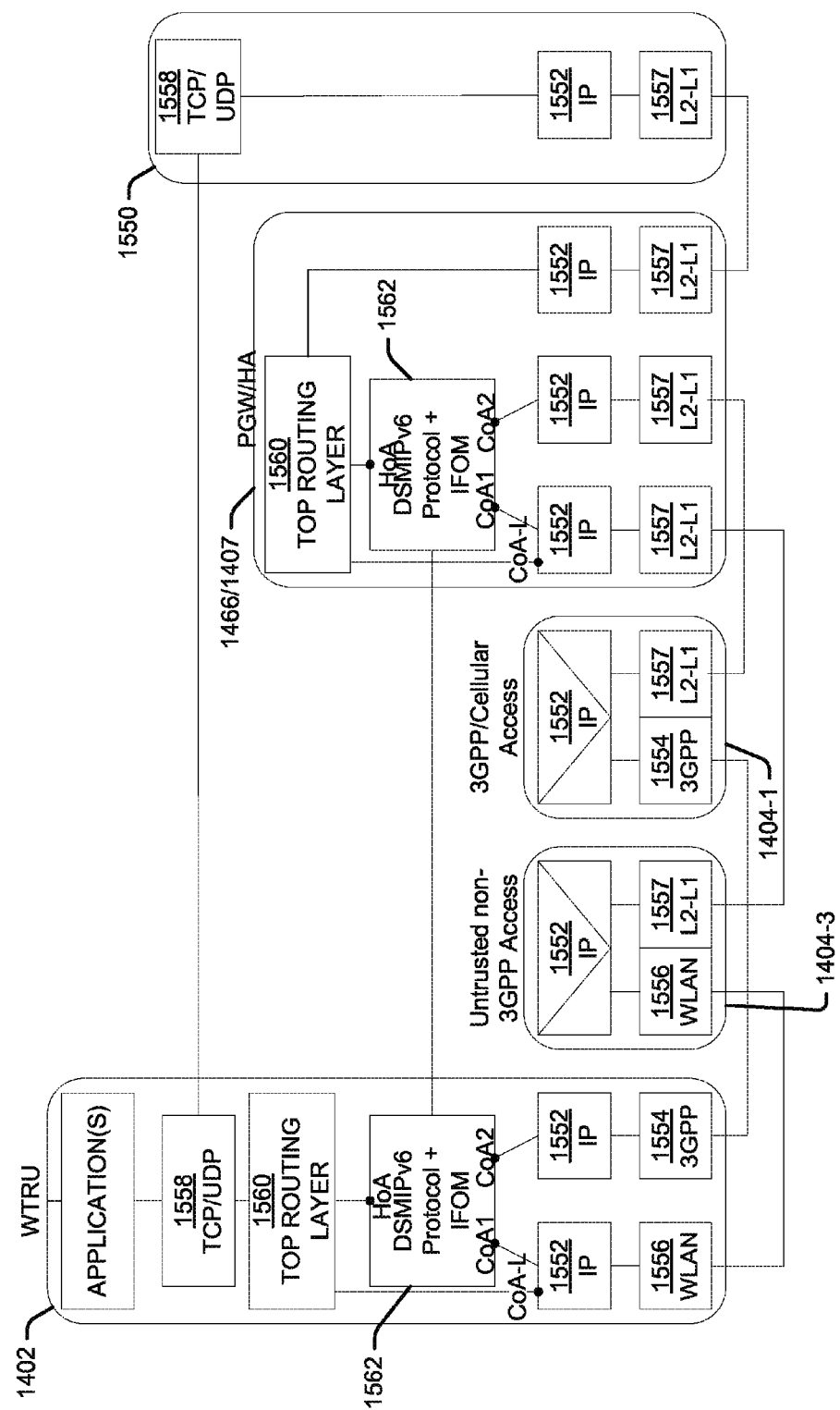
FIG. 15A is a block diagram illustrating protocols that may be used to provide any og bandwidth management ("BMW"), bandwidth aggregation ("BWA") and IFOM in a communications system.

Referring now to FIG. 15A, a block diagram illustrating protocols that may be used to provide any of BMW, BWA and IFOM in a communications system is shown. This communications system may be any of the communications systems disclosed herein as well as other applicable communications systems. For simplicity of exposition, the protocols of FIG. 15A are described with reference to the communications system 1400.

The WTRU 1402, the untrusted non-3GPP access 1404$_3$, 3GPP access 1404$_1$, the PGW/HA 1466/1407 and a server/peer 1550 may include IP layers 1552. The WTRU 1402 and the 3GPP access 14041 may also include a cellular layer 1554. The WTRU 1402 and the untrusted non-3GPP access 1404$_3$ may also include a WLAN layer 1556. The untrusted non-3GPP access 1404$_3$, 3GPP access 1404$_1$, the PGW/ HA 1466/1407 and the server/peer 1550 may include layer 1 (L1) and layer 2 (L2) (shown collectively "L2-L1") 1557. The WTRU 2702 and a server/peer 1550 may include respective TCP layers 1558. The WTRU 2702 and the PGW/HA 1466/1407 may include a top routing protocol layer 1560 and a combined DSMIP and IFOM protocol layer 1562.

The DSMIP client and equivalent functionality of the HA 1407 may implement the combined DSMIP and IFOM protocol layer 1562. The combined DSMIP and IFOM protocol layer may include an IFOM routing engine. The IFOM routing engine may be adapted to steer a given IP flow toward a given access system, such as the 3GPP access 1404$_1$ and/or towards the untrusted non-3GPP access 1404$_3$. Such steering may be based on one or more Inter-System Routing Policies ("ISRPs") received from ANDSF 1422 or based on network initiated policies, such as disclosed herein.

At the top routing layer 1560, the WTRU 1402 and/or the HA 1407 may make a routing decision between the HoA and a Local CoA ("CoA-L") for non-seamless offload. This routing decision may be on a per-flow basis FIG. 15B is a chart illustrating an example of a flow table 1500 for performing IFOM across multiple access technologies. The flow table 1500 may be representative of a binding cache of a HA and/or a binding list of a WTRU. The flow table 1500 defines, for each multi-access PDN connection, a mapping between routing addresses and an anchor or home address along with a mapping between the routing addresses and respective IP flows.

The flow table 1500 may define a first binding 1502 between an anchor address ("HoA1") and a first routing address ("CoA1"), and a second binding 1504 between the HoA1 and a second routing address ("CoA2"). The first binding 1502 may include a binding ID ("BID"), namely, BID 1, and the second binding may include BID 2.

The first binding 1502 may include first and second flow registrations 1506, 1508. The first flow registration 1506 may include a flow identifier ("FID"), namely, FID 1, and a first routing filter. The second flow registration 1508 may include FID 2 and a second routing filter.

The second binding 1504 may include a third flow registration 1510. The third flow registration 1510 may include FID 2 and a third routing filter.

Figure 16:
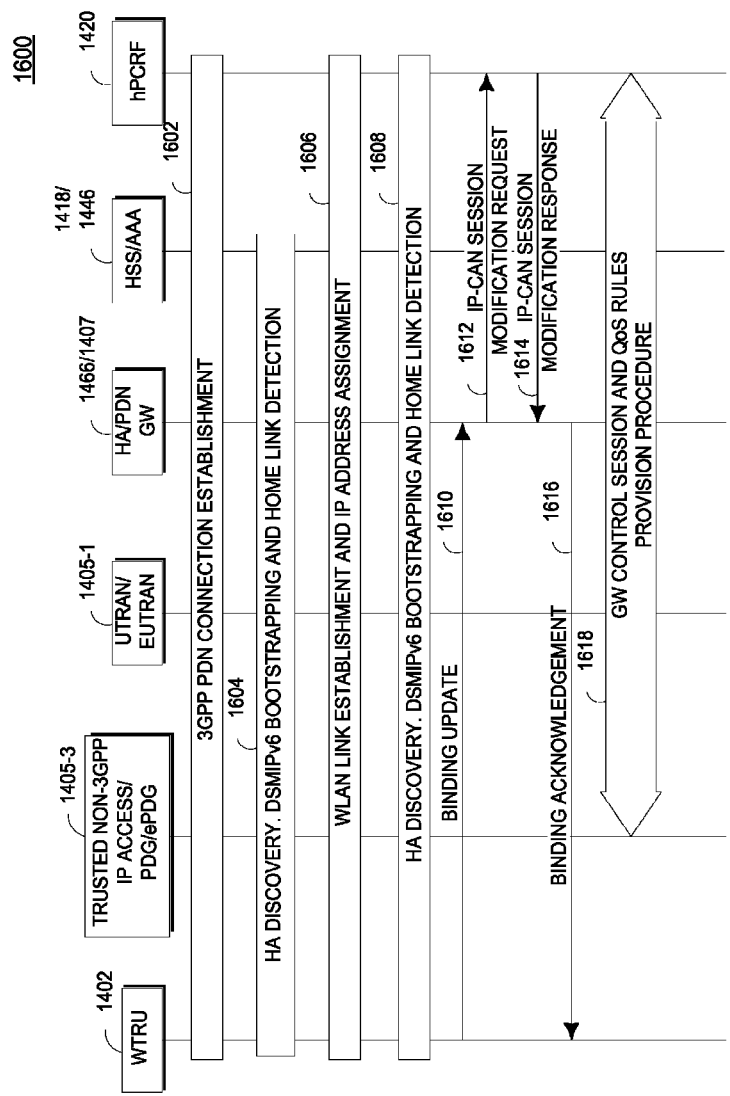
FIG. 16 is a message flow diagram illustrating an example of a process for establishing a multiple access PDN connection with support for IFOM.

FIG. 16 is a message flow diagram illustrating an example of a process 1600 for establishing a multiple access PDN connection with support for IFOM. The process 1600 is described with reference to the communications system 1400 of FIGS. 14A-14B and to the flow table 1500 of FIG. 15B. The process 1600 may be carried out using other communications systems, as well.

The WTRU 1402 may establish an initial PDN connection with the PGW 1466 through the 3GPP access system 1405$_1$ (1602). During establishment of the initial PDN connection, the anchor address HoA1 may be assigned to the WTRU 1402. After establishing the initial PDN connection, the WTRU 1402 may perform HA discovery, DSMIPv6 bootstrapping and home link detection (1604).

Thereafter, the WTRU 1402 may discover the untrusted non-3GPP access system 1405$_3$, establish connectivity and obtain the routing address CoA1 (1606). The WTRU 1402 may perform HA discovery, DSMIPv6 bootstrapping and DSMIPv6 home link detection if not already performed through the 3GPP access system 1405$_1$ (1608).

The WTRU 1420 may then send a BU (HoA, CoA, Lifetime, BID, FID, flow description) message to the HA 1407 (1610) over the untrusted non-3GPP access system 1405$_3$, or alternatively, the 3GPP access system 1405$_1$. This BU (HoA, CoA, Lifetime, BID, FID, flow description) may include the first binding 1502 and the second binding 1504. As noted above, the first binding 1502 may include the HoA1, CoA1, BID 1, FID1 and first routing rule for the first flow registration 1506. The first binding 1502 may include the HoA1, CoA1, BID 1, FID2 and second routing rule for the second flow registration 1506. The second binding may include the HoA1, CoA2, BID 2, FID3 and third routing rule for the third flow registration. The BU (HoA, CoA, Lifetime, BID, FID, flow description) message may also include an indication indicating simultaneous connection over the untrusted non-3GPP access system 1405$_3$ and the 3GPP access system 1405$_1$.

The PGW 1466 may send an IP Connectivity Access Network ("IP-CAN") session modification request to the PCRF 1420 (1612). In this request, the PGW 1466 may provide updated routing rules to the PCRF 1420. The PCRF 1420 may store the first and second bindings 1502, 1504 including, for example, a mapping between the flow registrations 1506, 1508 and 1510 and respective routing addresses CoA1, CoA1 and CoA2.

Based on the successful establishment of resources, the PCRF 1420 may send an IP-CAN session modification response message to the PGW 1466 with an acknowledgement of the IP-CAN session modification request message (1614). The IP-CAN session modification response may include updated PCC rules, if appropriate. The PGW 1466 may pass the updated routing rules to the HA 1407.

The HA 1407 may create the first and second bindings 1502, 1504, and install the first, second and third IP flow routing filters. The HA 1407 may then send a BA (Lifetime, HoA, CoA, BID, FID) message to indicate the first, second and third routing filters are accepted (1616).

Based on the IP-CAN session modification request (1612), the PCRF 1420 may ensure that the relevant QoS rules for the first, second and third flows are installed in a target bearer binding and event reporting function ("BBERF"). This may be done by a GW control session and QoS rules provision procedure (1618).

Figure 17:
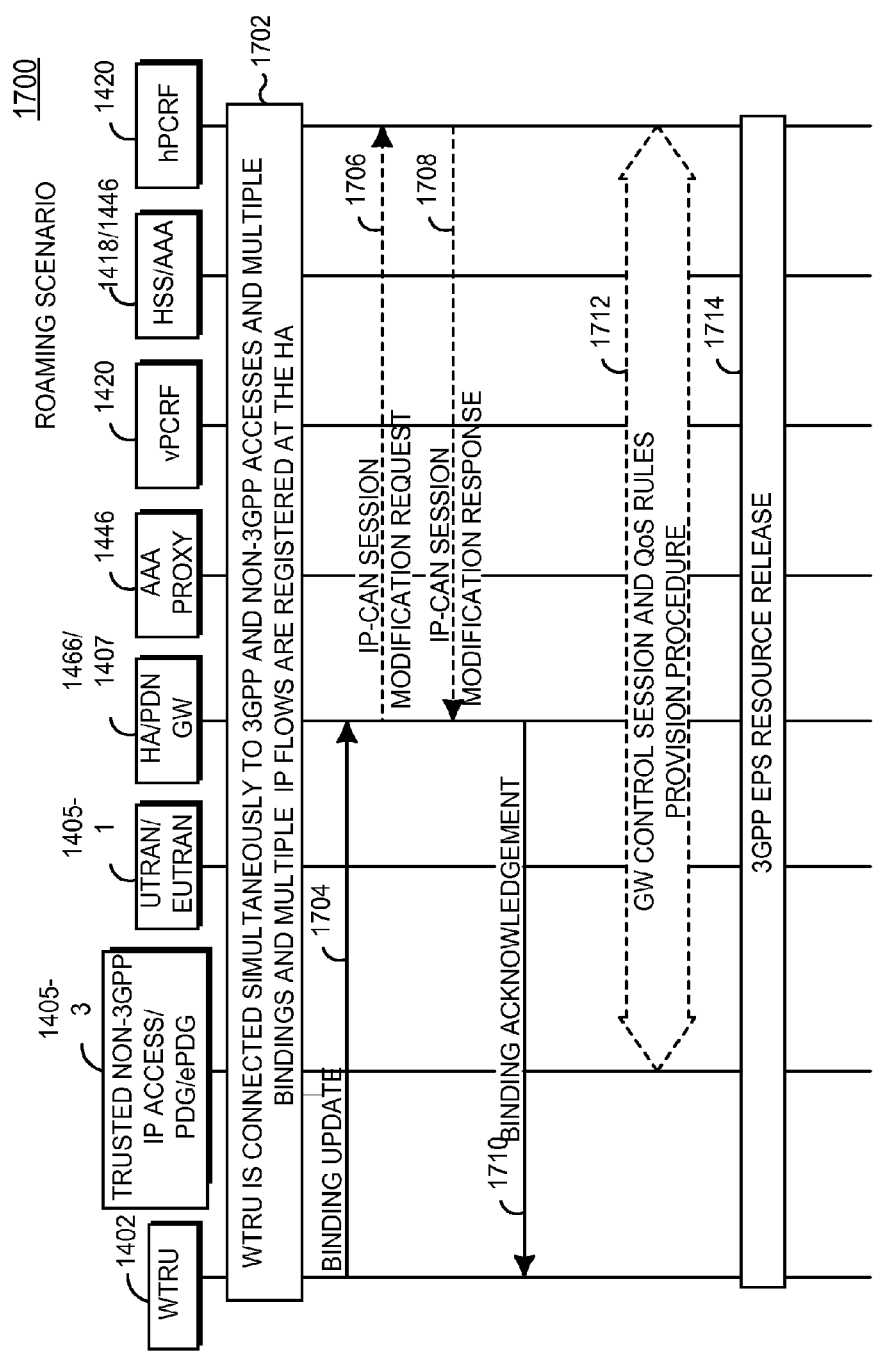
FIG. 17 is a message-flow diagram illustrating an example of a process for performing WTRU-initiated IFOM.

Figure 17 is a message flow diagram illustrating an example of a process 1700 for performing wtru-initiated IFOM. The process 1700 is described with reference to the communications system 1400 of FIGS. 14A-14B and the flow table 1500 of FIG. 15B. In this process 1700, a new routing rule may be activated and/or an existing routing rule may modified by the WTRU 1402 moving one traffic flow from one access to another access, e.g., moving the first flow from the 3GPP access system 1403$_1$ to the untrusted non-3GPP access system 1405$_3$.

The WTRU 1402 may be simultaneously connected to the 3GPP access system 1405$_1$ to the untrusted non-3GPP access system 1403$_3$ (1702). The WTRU 1420 may send a BU (HoA, BID, FID) message to the HA 1407 (1704) to install the new routing rule for the first flow or, alternatively, modify the routing address of the first routing rule to route the first flow (identified by the FID) through the untrusted non-3GPP access system 1405$_3$ (identified by the included BID) or to remove the first routing rule from the first binding 1502.

For the new routing rule, the WTRU 1402 may include the routing filter description. The WTRU 1402 may send the BU (HoA, BID, FID) via either the 3GPP access system 1405₁ or the untrusted non-3GPP access system 1405₃.

The PGW 1466 may send an IP-CAN session modification request message with the updated routing rules to the PCRF 1420 (1706). The PCRF 1420 may process the updated routing rules from the IP-CAN session modification request message, and then store the updated routing rules in an updated mapping.

Based on the successful establishment of resources in the untrusted non-3GPP access system 1405₃, the PCRF 1420 may send an IP-CAN session modification response message to the PGW 1466 with an acknowledgement of the IP-CAN session modification request message (1708). The IP-CAN session modification response may include updated PCC rules, if appropriate. The PGW 1466 may pass the updated routing rules to the HA 1407.

The HA 1407, in turn, may send to the WTRU 1402 a BA (lifetime, HoA, BID, FID) message (1710) so as to signal to the WTRU 1420 acceptance of the updated routing rules.

The HA 1407 may then send the BA (lifetime, HoA, BID, FID) message to the PCRF 1420 (1710). In some instances, the HA 1407 may send the BA message prior to the PGW 1466 receiving from the PCRF 1420 a reply to the IP-CAN session modification request message.

Based on the IP-CAN session modification request, the PCRF 1420 may ensure that relevant quality of service ("QoS") rules are installed in the target access system or relevant QoS rules are uninstalled from the source access system. For non-3GPP access systems (trusted or untrusted), this may be performed by a GW control session and QoS rules provision procedure (1712). Appropriate EPS resource release procedures may be executed for resources that were moved away from the 3GPP access system 1405₁ or appropriate EPS resource allocation procedures are executed for those resources that were moved to the 3GPP access system 1405₁(1714).

FIGS. 18-25 are message flow diagrams illustrating respective examples of processes 1800-2500 for performing IFOM across multiple access technologies. Each of the processes 1800-2500 is described with reference to the communications system 1400 of FIG. 14. The processes 1800-2500 may be carried out using other architectures, as well. Where applicable, reference may be made between and/or among the processes 1800-2500 or elements thereof.

Figure 18:
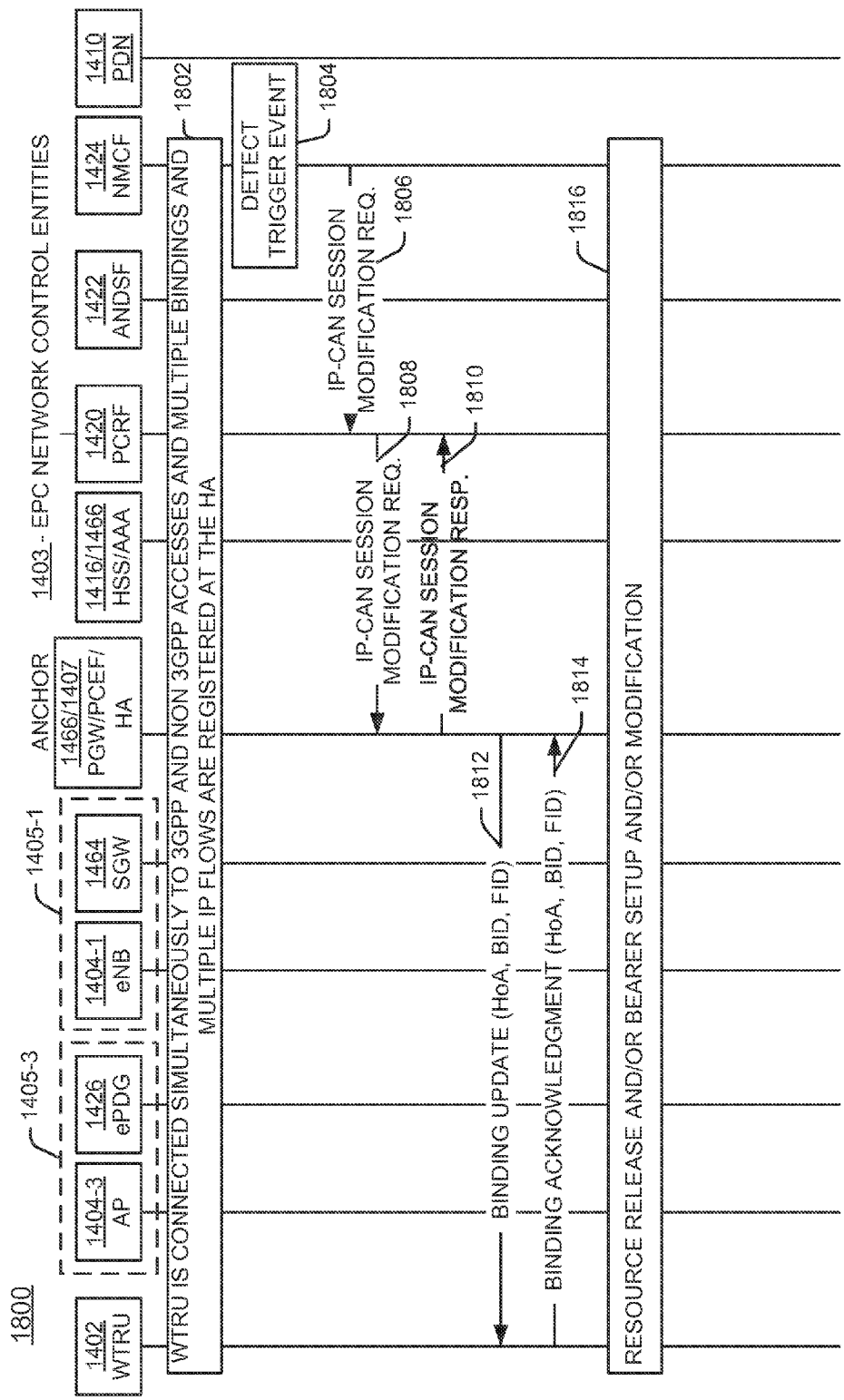
FIG. 18 is a message flow diagram illustrating an example of a process for performing network-initiated IFOM over multiple access technologies.

Referring to FIG. 18, a procedure (1802) for establishing a multiple-access PDN connection and for the first and second bindings 1502, 1504 along with first, second and third flow bindings 1506, 1508, 1510 at the HA 1407 (1802) is carried out, as, for example, using the process 1600 of FIG. 16. The procedure 1802 may be carried out in other ways as well.

The NMCF 1424 may be continually collecting and monitoring the local radio and backhaul metrics for the flow-updating events. Collection of the local radio and backhaul metrics may be carried out in real time, in near real time, at a given frequency, etc. While collecting and monitoring the local radio and backhaul metrics, NMCF 1424 may detect a flow-updating event (1804). After detecting the flow-updating event, the NMCF 1424 may determine that a reassignment of the third IP flow from the untrusted non-3GPP access system 1405₃ to the 3GPP access system 1405₁ may be warranted. To facilitate such reassignment, the NMCF 1424 may query the PCRF 1420 to obtain the second flow binding 1504. The NMCF 1424 may then generate a service data flow ("SDF") change request. The SDF change request may include the HoA1, CoA1, BID1, FID3 and the third routing filter. The SDF change request may include other information, as well.

After generating the SDF change request, the NMCF 1424 may populate it into an IP CAN session modification request message. The NMCF 1424 may thereafter send the IP CAN session modification request to the PCRF 1420 (1806).

The PCRF 1420, in turn, may process the SDF change request from the IP CAN session modification request message, and then relay the SDF change request unchanged to the PGW 1466 in another IP CAN session modification request message (1808). Alternatively, the PCRF 1420 may modify the SDF change request before sending the IP CAN session modification message to the PGW 1466. The PCRF 1420 may modify the SDF change request, for example, to handle differences in the interface between the PCRF 1420 and PGW 1466 and the interface between the PCRF 1420 and NMCF 1424. Alternatively, the PCRF 1420 may modify the SDF change request to format it for the HA 1407.

Responsive to the IP CAN session modification request message, the PGW 1466 may send to the PCRF 1420 an IP CAN session modification response message populated with a response acknowledging receipt of the request (1810). The response may include other information, as well. The PGW 1466 may also process the SDF change request from the IP CAN session modification message, and then pass the SDF change request to the HA 1407. The HA 1407, in turn, may process the SDF change request to obtain the HoA1, CoA1, BID1, FID3 and the third routing filter. Thereafter, the HA 1407 may populate the HoA1, CoA1, BID1, FID3 and the third routing filter into a BU (HoA, CoA, BID, FID and the routing filter) message, and send the BU message to the WTRU 1402 (1812).

Responsive to the BU message, the WTRU 1402 may process the HoA, CoA, BID, FID and the third routing filter from the BU (HoA, CoA, BID, FID and the routing filter) message, and decide to accept the BU request for the IP flow as signaled by the BU message. The WTRU 1402 may then update the WTRU binding list in accordance with the BU request by associating the FID3 and routing filter 3 with the BID1, and de-associating the FID3 and routing filter 3 from the BID2.

Additionally, the WTRU 1402 may populate the HoA1, CoA1, BID1, FID3 and the third routing filter into a BA (HoA, CoA, BID, FID and the routing filter) message, and then send the BA message to the HA 1407_(1814). Receipt of the BA message at the HA 1407 may signal to the HA 1407 an acknowledgement of receipt of the BU message at the WTRU 1402, and inclusion of the CoA1, BID1, FID3 may signal to the HA 1407 an acceptance of the BU (HoA, CoA, BID, FID and the routing filter) request by the WTRU 1402. Responsive to the acceptance of the BU (HoA, CoA, BID, FID and the routing filter) request, the HA 1407 may update the HA binding cache in accordance with the BU request by associating the FID3 and routing filter 3 with the BID1, and de-associating the FID3 and routing filter 2 from the BID2.

An EPS resource release or EPS bearer setup or modification procedure may be performed responsive to and in accordance with the accepted BU request (1816). Although not shown in FIG. 1800, the NMCF 1424 may send the SDF change request (in, for example, an IP CAN session modification request message) to the PGW 1466. The PGW 1466, in turn, may populate the SDF change request into an IP CAN session modification request message, and send such message to the PCRF 1420. The PGW 1466 may send the SDF change request to the PCRF 1420 using other types of signaling messages, as well.

Figure 19:
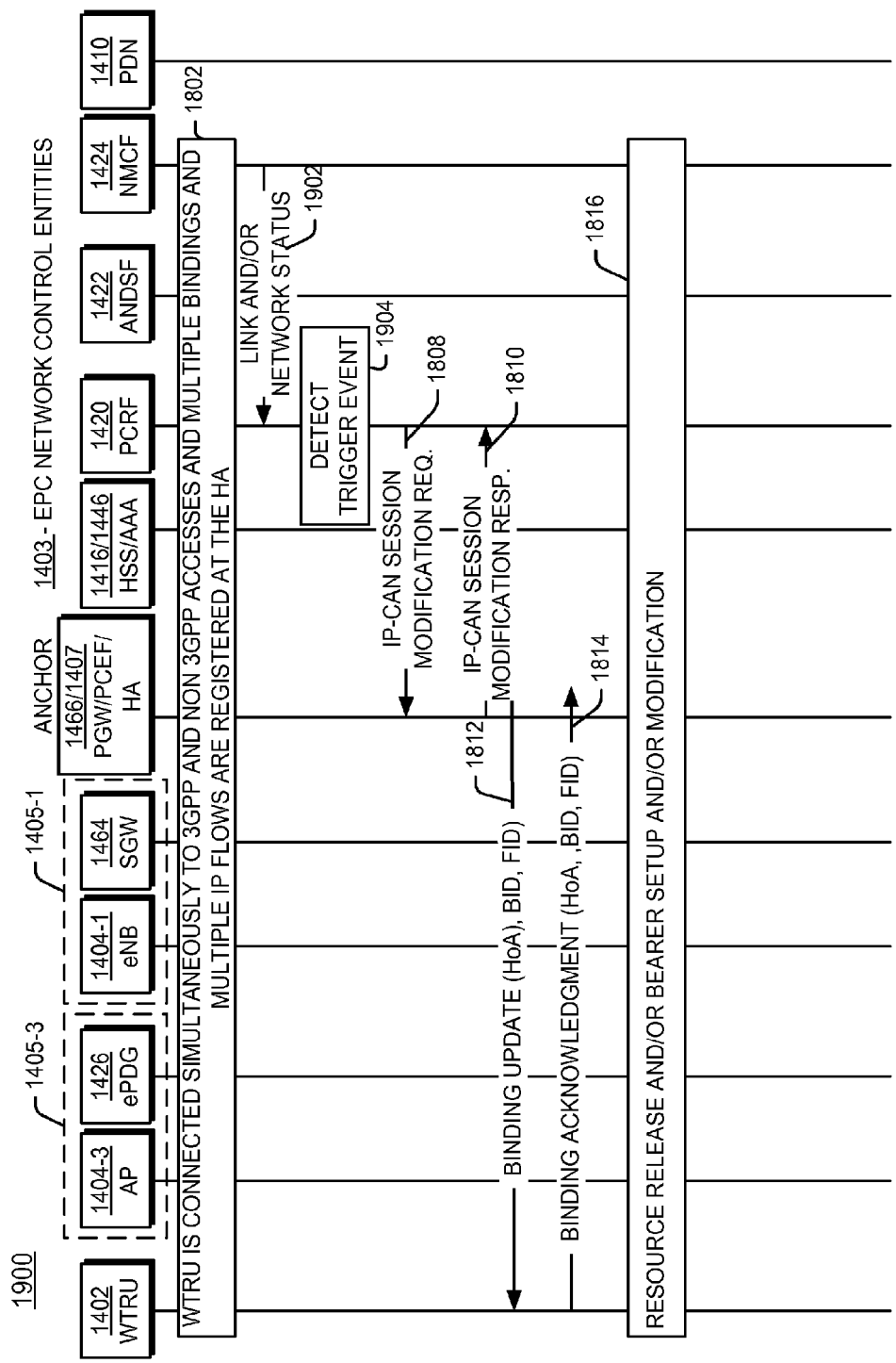
FIG. 19 is a message flow diagram illustrating an example of a process for performing network-initiated IFOM over multiple access technologies.

FIG. 19 is a message-flow diagram illustrating an example of a process 1900 for network-initiated IFOM across multiple access technologies. The process 1900 of FIG. 19 is similar to the process 1800 of FIG. 18, except as described herein below. To facilitate the process 1900, the PCRF 1420 may be configured with capabilities to process and make flow mobility decisions based the link and network status information sent from the NMCF 1424. Additionally and/or alternatively, the NMCF 1424 may be replaced with another entity (not shown) having monitoring functionality of the NMCF 1424, without the flow mobility decision making functionality.

The NMCF 1424 may be continually collecting the local radio and backhaul metrics. While collecting, the NMCF 1424 may send the local radio and backhaul metrics to the PCRF 1420 (1902). The NMCF 1424 may send the local radio and backhaul metrics to the PCRF 1420 over any suitable interval, including, for example, in real time, in near real time, at a given frequency, etc.

The PCRF 1420 may monitor the local radio and backhaul metrics for flow updating events. After detecting a flow updating event (1904), the PCRF 1420 may determine that a reassignment of the first IP flow from the 3GPP access system $1405_1$ to the untrusted non-3GPP access system $1405_3$ may be warranted. The PCRF 1420 may then generate a SDF change request with the first binding 1502 for the first registered flow, FID1. The SDF change request may include the HoA1, CoA2, BID2, FID1 and the first routing filter. The SDF change request may include other information, as well.

After generating the SDF change request, the PCRF 1420 may populate the SDF request into a IP CAN session modification message, send the IP CAN session modification message to the HA 1407 (1808). Thereafter the process 1900 may continue as described with respect to the process 1800 of FIG. 18 starting from (1810).

Figure 20:
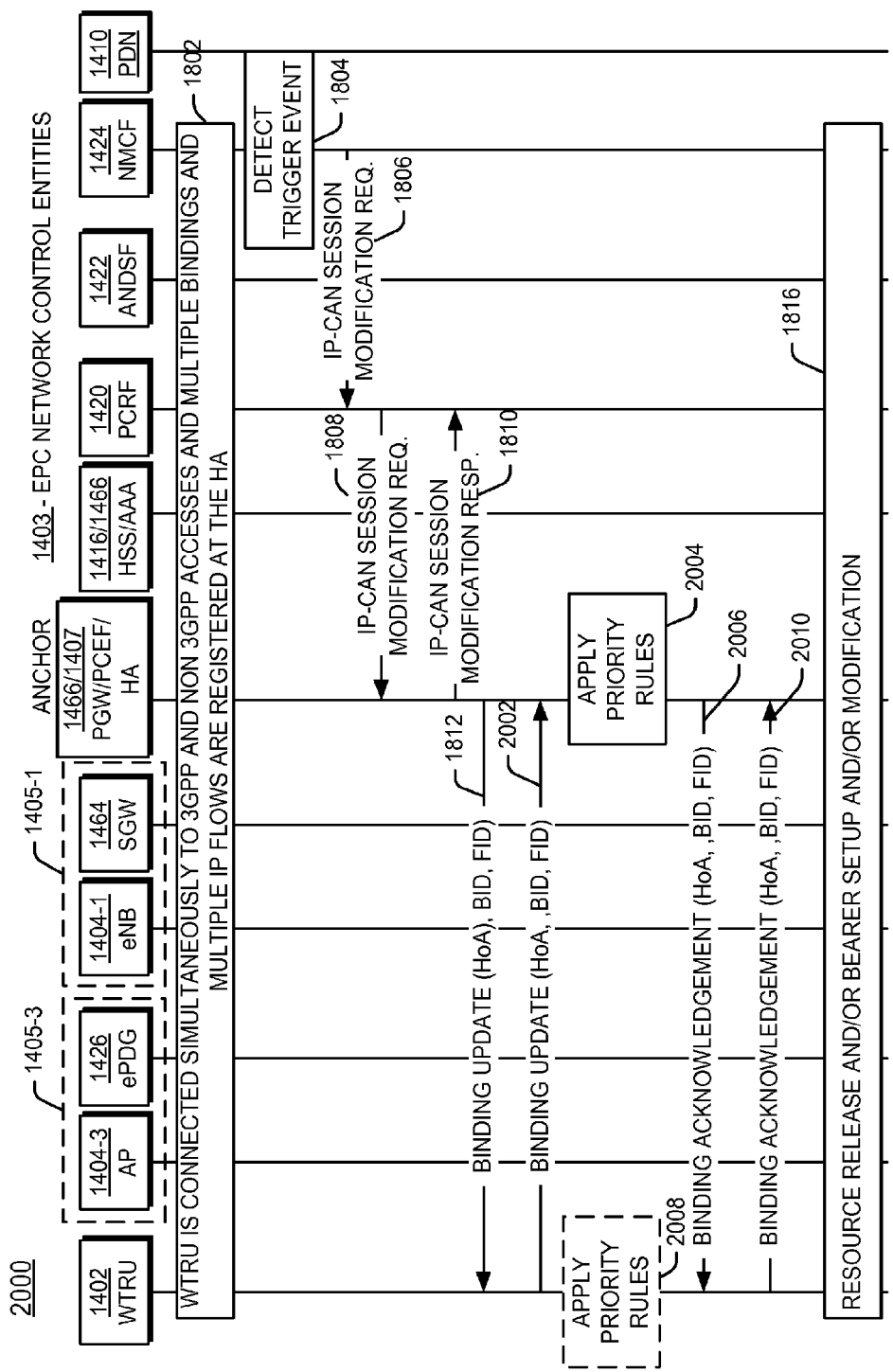
FIG. 20 is a message flow diagram illustrating an example of a process for performing IFOM over multiple access technologies.

FIG. 20 is a message-flow diagram illustrating an example of a process 2000 for performing IFOM across multiple access technologies. The process 2000 of FIG. 20 is similar to the process 1800 of FIG. 18, except as described herein below.

The process 2000 may be used to resolve and/or avert potential collisions between a BU message initiated by the HA 1407 ("nw-initiated BU message") and a BU message initiated by the WTRU 1402 ("wtru-initiated BU message"). To facilitate the process 2000, the HA 1407 and WTRU 1402 are provisioned with respective priorities ("ha-priority" and "wtru-priority", respectively); one being subordinate to the other. The HA 1407 and WTRU 1402 may refer to these priorities to resolve a potential collision between nw-initiated and wtru-initiated BU messages. The provisioning of the ha-priority and wtru-priority with HA 1407 and WTRU 1402 may be carried out, for example, as described above with respect to process 600 of FIG. 6. Provisioning of the ha-priority and wtru-priority may be carried out in other ways, as well.

The HA 1407 may receive a wtru-initiated BU message from the WTRU 1402 (2002) after sending the nw-initiated BU message to the WTRU 1402 (1812) and while awaiting a response to such nw-initiated BU message. Responsive to the wtru-initiated BU message, the HA 1407 may refer to the ha-priority and the wtru-priority, and then apply the ha-priority and the wtru-priority to priority rules (2004). After determining the ha-priority is subordinate to the wtru-priority, the HA 1407 may send to the WTRU 1402 a BA message configured to acknowledge and accept the wtru-initiated BU message (2006). Additionally, the WTRU 1402 may discard the nw-initiated BU message, and the HA 1407 may abandon the nw-initiated BU message.

The process 2000 may be also carried out when the WTRU 1402 receives the nw-initiated BU message from the HA 1407 (1812) after sending the wtru-initiated BU message to the WTRU 1402 (1812) and while awaiting a response to the wtru-initiated BU message. For example, after receiving the nw-initiated BU message, the WTRU 1402 may refer to the ha-priority and the wtru-priority, and apply the ha-priority and the wtru-priority to the priority rules (2008). Responsive to determining the wtru-priority is subordinate to the ha-priority, the WTRU 1402 may send to the HA 1407 a BA message configured to acknowledge and accept the ha-initiated BU message (2010). The HA 1407 may discard the nw-initiated BU message, and the WTRU 1402 may abandon the nw-initiated BU message.

Although not shown in FIG. 20, if, after determining the wtru-priority (or ha-priority) is subordinate to the ha-priority (or wtru-priority), the HA 1407 (or WTRU 1402) may reject the wtru-initiated (or nw-initiated) BU message, and send to the WTRU 1402 (or HA 1407) a BA message specifying an error code for rejecting the wtru-initiated (or nw-initiated) BU message (e.g. "collision—lower priority"). Alternatively, the HA 1407 (or WTRU 1402) may resend the nw-initiated (or wtru-initiated) BU request (or another nw-initiated (or wtru-initiated) BU request).

As another alternative, the WTRU 1402 (or HA 1407) may include an overriding priority indicator in the wtru-initiated (or nw-initiated) BU message. In response to the overriding priority indicator, the HA 1407 (or WTRU 1402) may override (e.g., not consider) ha-priority and the wtru-priority, and instead, determine the wtru-initiated (or nw-initiated) BU message takes precedence over the nw-initiated (or wtru-initiated) BU message. The HA 1407 (or WTRU 1402) may then send to the WTRU 1402 (or HA 1407) a BA message configured to acknowledge and accept the wtru-initiated (or nw-initiated) BU message.

In yet another alternative, the HA 1407 and the WTRU 1402 may refer to priority indicators associated with any of the first, second and third routing filters in the HA binding cache and WTRU binding list (e.g., as represented in flow table 1500) to determine whether any of the first, second and third routing filters may be modified. The priority indicators may be populated into the HA binding cache and WTRU binding list during an assignment of the IP flows. The priority indicators may be part of the routing filters description and/or may be maintained in a separate entry of the HA binding cache and WTRU binding list. The priority indicators may be maintained in other parts of the HA binding cache and WTRU binding lists. For example, the priority indicators may be defined as part of the FIDs. The priority indication may prevent the HA 1407 from sending an nw-initiated BU message when the priority indicator indicates the WTRU 1402 has priority over the HA 1407. Conversely, the priority indication may prevent the WTRU 1402 from sending a wtru-initiated BU message when the priority indicator indicates the HA 1407 has priority over the WTRU 1402.

Alternatively, before the HA 1407 and/or the WTRU 1402 initiate BU messages, the HA 1407 and/or the WTRU 1402 may refer to a timeout value associated with a selected routing filter in the HA binding cache and WTRU binding list (e.g., as represented in flow table 1500) to determine a time after which the routing filter can be modified. For example, a condition with the network 1403 may warrant the HA 1407 movement of the first flow from the 3GPP access system $1405_1$ to the untrusted non-3GPP access system $1405_3$. Prior to the HA 1407 sending a nw-initiated BU message to initiate the move, the HA 1407 may refer to the HA binding cache for a timeout value for the first routing filter, whereupon the HA

1407 may be informed that the timeout value has not expired and the HA 1407 may prohibited from sending the nw-initiated BU message for the first routing filter until expiry of such timeout value.

The timeout value(s) may be added to the HA binding cache and WTRU binding list during assignment of the IP flow. The timeout value(s) may be part of the routing filters description and/or may be maintained in a separate entry of the HA binding cache and WTRU binding list. Alternatively, the timeout value(s) may be maintained in other parts of the HA binding cache and WTRU binding lists, such as, for example, the FID(s).

Figure 21:
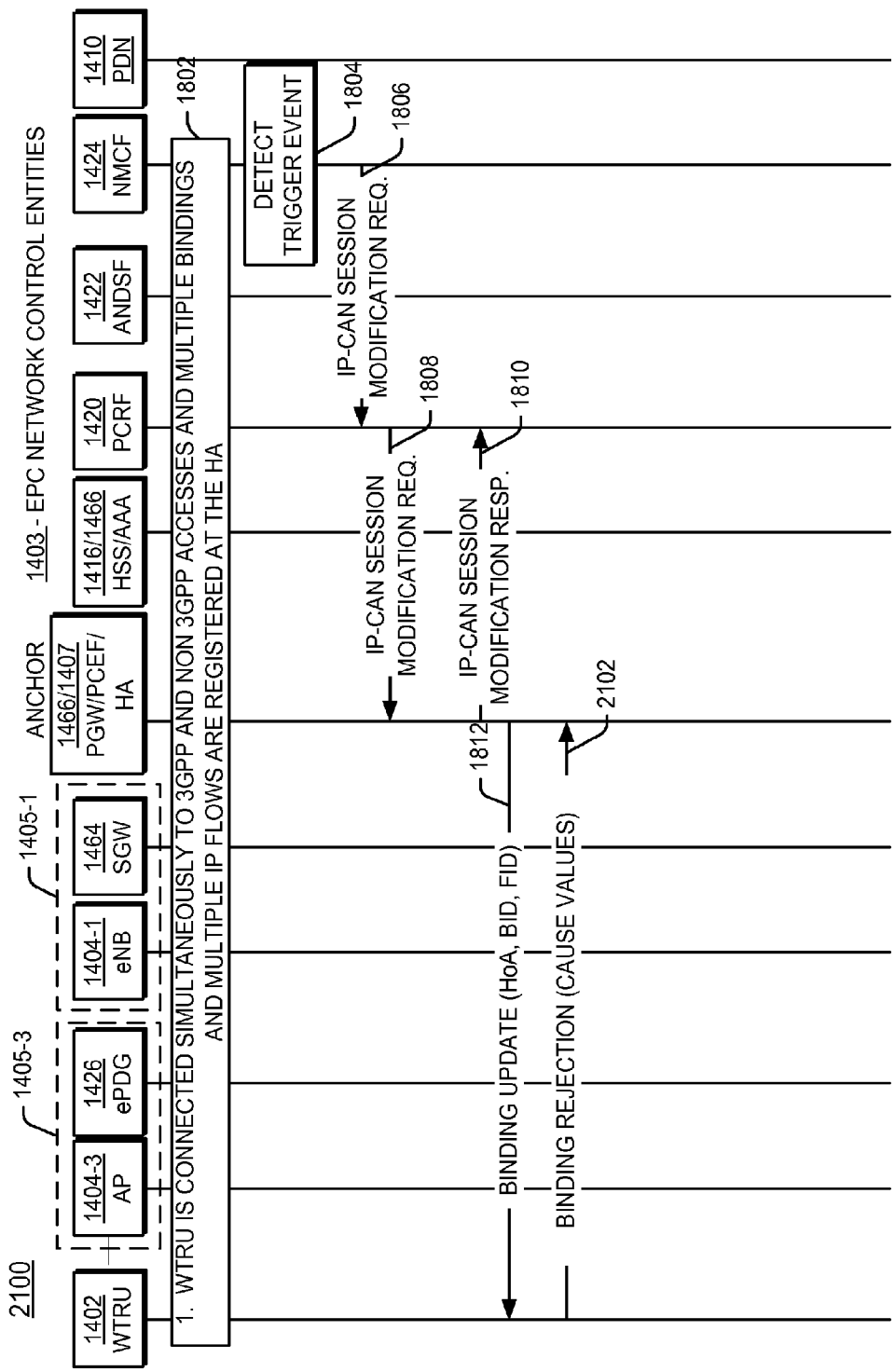
FIG. 21 is a message flow diagram illustrating an example of a process for performing IFOM over multiple access technologies.

FIG. 21 is a message-flow diagram illustrating an example of a process 2100 for performing IFOM across multiple access technologies. The process 2100 of FIG. 21 is similar to the process 1800 of FIG. 18, except as described herein below.

After receiving the nw-initiated BU request from the HA 1407 (1812), the WTRU 1402 may send to the HA 1407 a Rej-BU message with cause values to signal to the HA 1407 a rejection of the nw-initiated BU request and to provide one or more causes for the rejection (2102). The cause values include values to indicate that the rejection was due to (e.g., suboptimal) local radio conditions with for access system requested in the BU message, battery conditions and the like. The cause values may indicate other causes for the rejection, as well.

Figure 22:
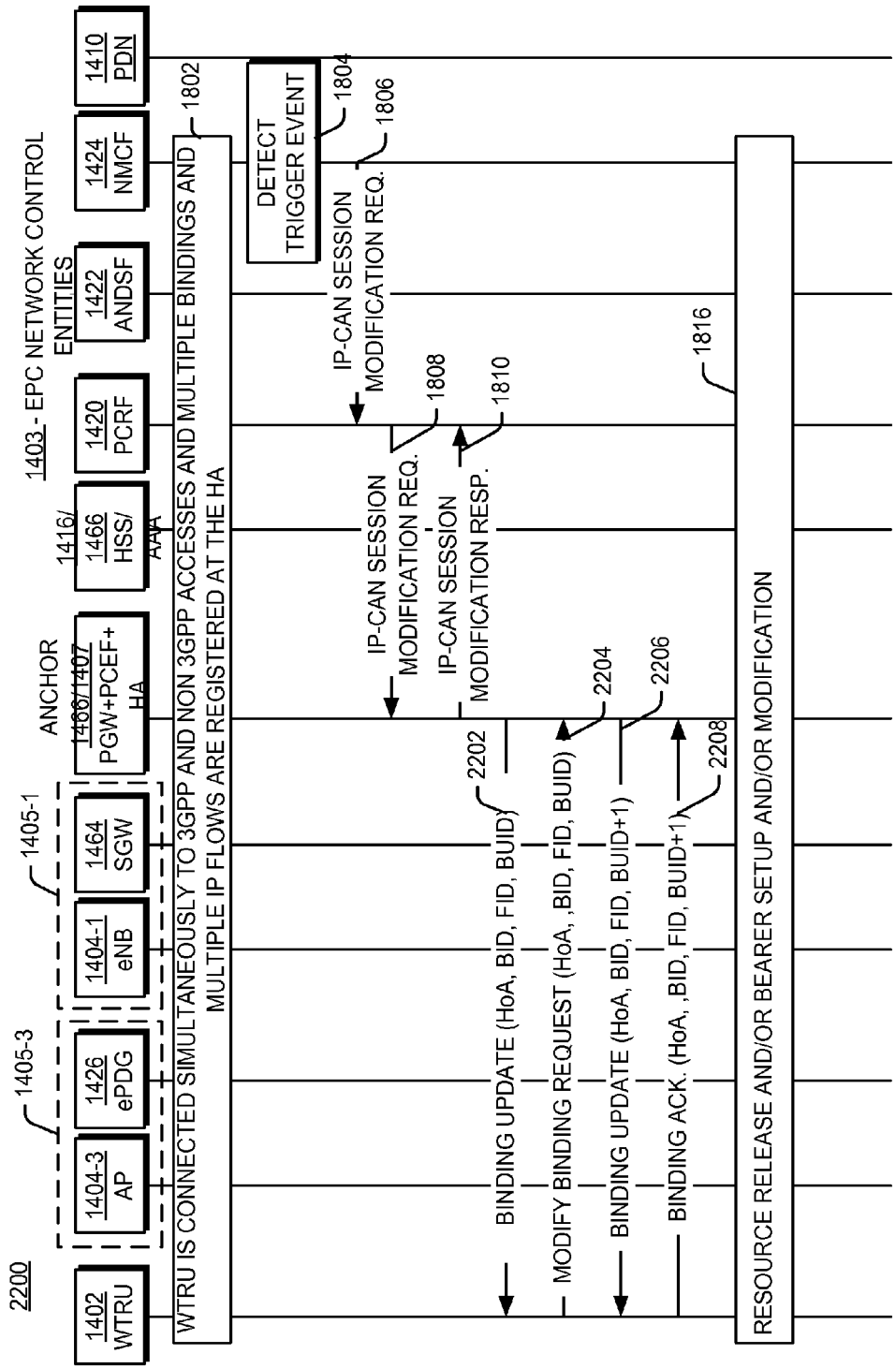
FIG. 22 is a message flow diagram illustrating an example of a process for performing IFOM over multiple access technologies.

FIG. 22 is a message-flow diagram illustrating an example of a process 2200 for performing IFOM across multiple access technologies. The process 2200 of FIG. 22 is similar to the process 1800 of FIG. 18, except as described herein below.

The process 2200 may be useful for the HA 1407 and the WTRU 1402 to negotiate various for flow mobility operations, including flow splitting operations. To facilitate the negotiations, the HA 1407 and/or the WTRU 1402 may use a binding update ID ("BUID") to track the modifications requests. For example, the HA 1407 may initiate the negotiation by populating a BUID into a BU message to form, for example, a BU (HoA, BID, FID, BUID) message. Thereafter the HA 1407 may send the BU (HoA, BID, FID, BUID) message to the WTRU 1402 (2202).

The WTRU 1402 may respond to the BU (HoA, BID, FID, BUID) message with a request to modify one or more parameters of the BU (HoA, BID, FID, BUID) message. The WTRU 1402 may send the request by populating a Mod-BU message with the requested parameter and the BUID so as to form a Mod-BU (HoA, BID, FID, BUID) message (2204).

The HA 1407 may then make the requested changes of the parameters of the BU message, populate a BU message with the requested changes and a second BUID so as to form a BU (HoA, BID, FID, BUID+1) message, and then send a BU (HoA, BID, FID, BUID+1) message to the WTRU 1402 (2206). The WTRU 1402 may respond with a BA message populated with the BUID+1 (2208).

As shown, the BUID may be incremented to track the modification requests. The BUID may be a function other than incrementing by one, as well. Additionally, the HA 1407 and the WTRU 1402 may use the process 2200 to negotiate parameters including alternative suggestions for flow splitting operations. For example, if the BU (HoA, BID, FID, BUID) message suggests a 50-50 split in a single flow across two interfaces, then the WTRU 1204 may respond back with a suggestion that 30-70 split may be preferred. Alternatively, the WTRU 1204 may respond with a Mod-BU message that indicates that the flow to be moved cannot be sustained by the new radio link, but only a fraction of that flow may be supportable.

The BUID may be used in all BU-BA-like message exchanges. Using the BUID may help identify a particular BU message in consideration (e.g., when a BU message does not evoke a BA message). For example, the when both the WTRU 1402 and HA 1407 use BUIDs, a BU message under consideration may be resolved using the BUIDs.

Figure 23:
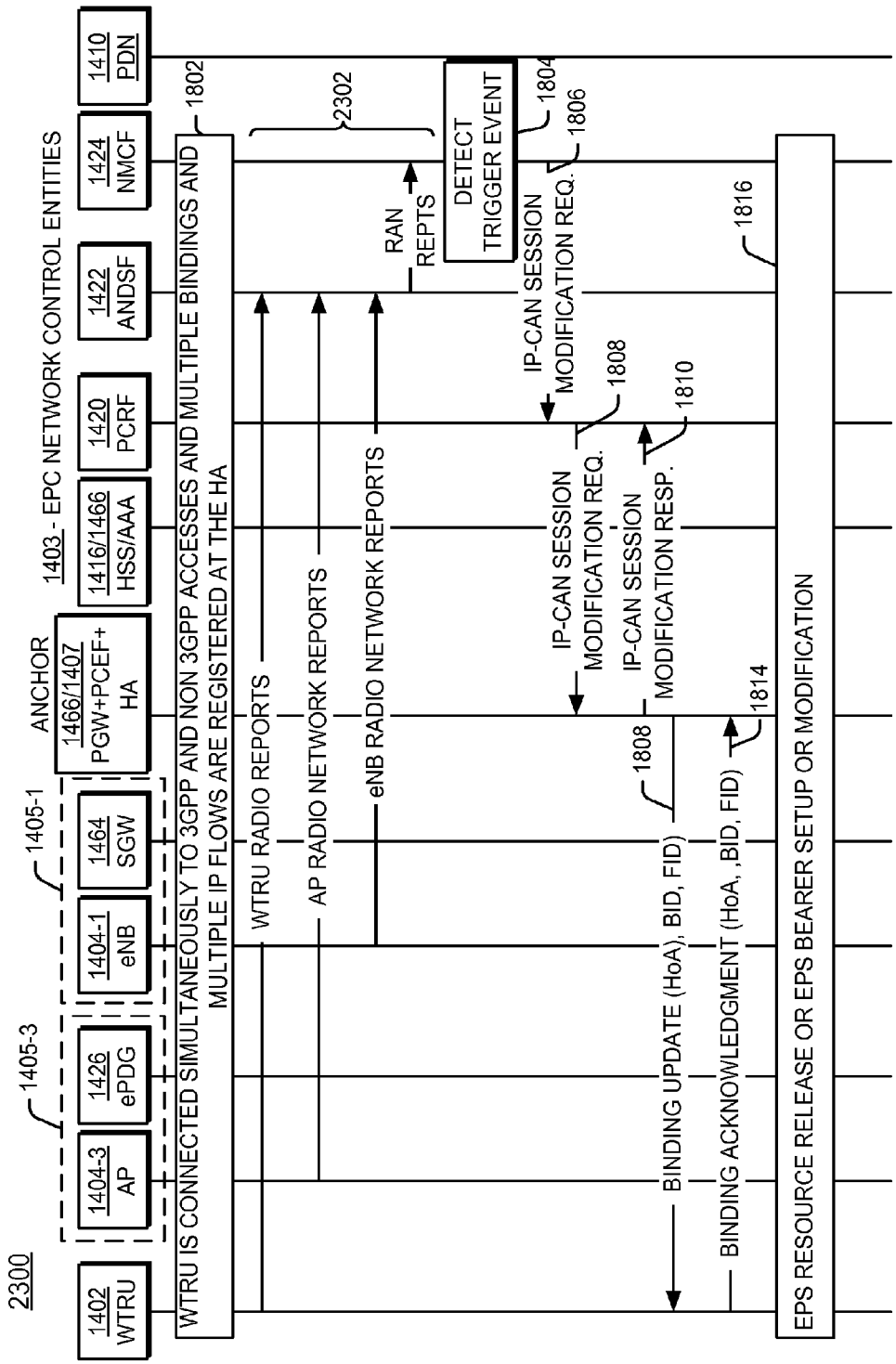
FIG. 23 is a message flow diagram illustrating an example of a process for performing IFOM over multiple access technologies.

FIG. 23 is a message flow diagram illustrating an example process for performing IFOM over multiple access technologies. The process 2300 of FIG. 23 is similar to the process 1800 of FIG. 18, except as described herein below.

Each of the WTRU 1402, an eNB 1404$_1$ and/or AP 1404$_3$ may provide radio network related information to the ANDSF 1422 (2302). The ANDSF 1422 may collect such information and process and pass it to the NMCF 1424 for making decisions regarding flow mobility, etc. In one embodiment, functionality of the NMCF 1424 may be integrated with the AN 1422.

Figure 24:
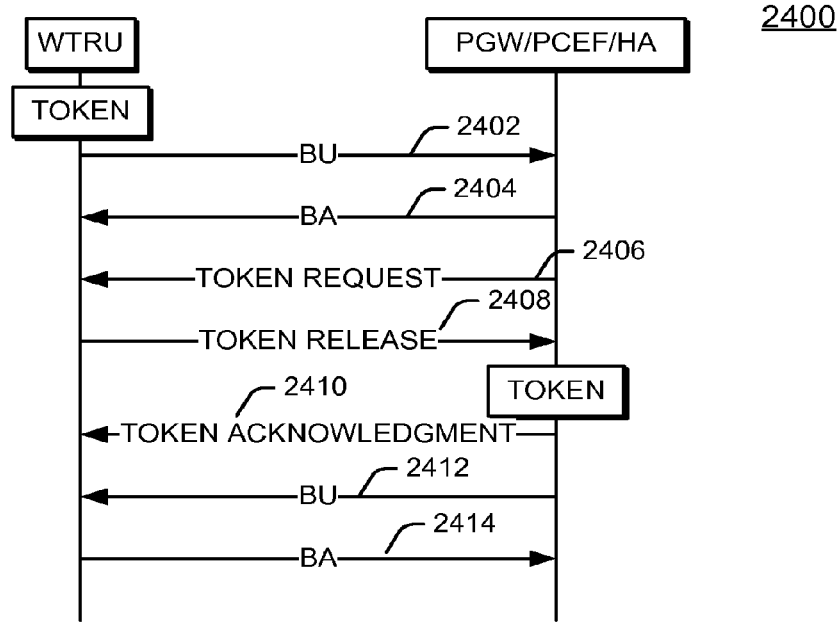
FIG. 24 is a message flow diagram illustrating an example of a process for performing IFOM over multiple access technologies.

FIG. 24 is a message flow diagram illustrating an example of a process 2400 for performing IFOM over multiple access technologies. The process 2400 may be used to resolve and/or avert potential collisions between an nw-initiated BU message and a wtru-initiated BU message. To facilitate the process 240, a token, whose possession is required to initiate a BU message, may be made available to the HA 1407 and to the WTRU 1402. The token may be maintained by either the HA 1407 or the WTRU 1402 by default, and returned when not being used. Alternatively, a network entity of the network 1403 may maintain the token, and issue it to the HA 1407 or the WTRU 1402 on request. As another alternative, an instance of the token may be generated when another instance is not in use. The token instance may expire after use or other event (e.g., a given time period). For simplicity of exposition, the process 2300 assumes the WTRU 1402 possesses the token by default.

Given the token is possessed by the WTRU 1402, the WTRU may send a BU message to the HA 1407 (2402). The HA 1407 may respond with a BA message (2404). The HA 1407 may send to the WTRU 1402 a token-request message. The token-request message may be sent over the multi-access PDN connection or, alternatively, over another connection with the WTRU 1402 (2406). Responsive to the token-request message, the WTRU 1402 may send the token to the HA 1407 (2408). After obtaining the token, the HA 1407 may send to the WTRU 1402 an nw-initiated BU message (2412). The HA 1407 may receive from the WTRU 1402 a BA message acknowledging the nw-initiated BU message (2414).

Figure 25:
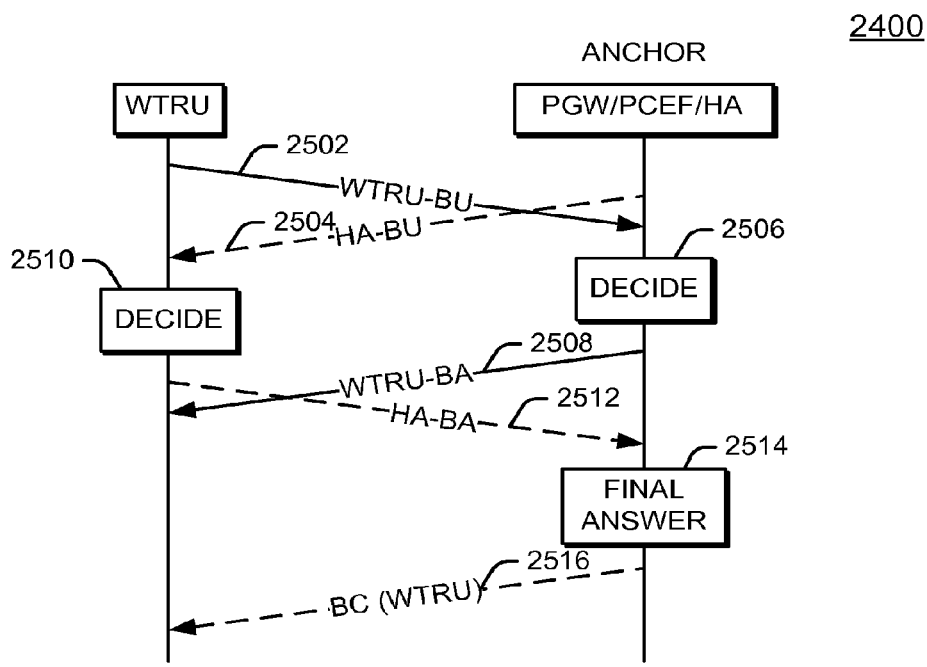
FIG. 25 is a message flow diagram illustrating an example of a process for performing IFOM over multiple access technologies.

FIG. 25 is a message flow diagram illustrating an example of a process 2500 for performing IFOM over multiple access technologies. The process 2500 may be used to resolve and/or avert potential collisions between an nw-initiated BU message and a wtru-initiated BU message.

The WTRU 1402 may send a wtru-initiated BU message (2502). The HA 1407 may initiate an nw-initiated BU message (2504) while the wtru-initiated BU message is in transit towards the HA 1407, but has not reached the HA 1407. When the wtru-initiated BU message arrives at the HA 1407, the HA 1407 detects a collision and decides on either accepting the wtru-initiated BU message or insisting on the nw-initiated BU message (2506). The HA 1407 may decide to accept the wtru-initiated BU message, and responsively, sends a BA message to the WTRU 1407 (2508).

The WTRU 1402 may receive the nw-initiated BU message, and detects the BU collision. The WTRU 1402 may then make a decision to either accept the nw-initiated BU message or insist on the wtru-initiated BU message. The WTRU 1402 may decide to accept the wtru-initiated BU message, and sends a BA message to the HA 1407.

The BA message may be received by the HA 1407. The HA 1407 may thereafter determine that the WTRU 1402 wants to keep the nw-initiated BU message, whereas it wanted to keep the wtru-initiated BU message, causing a conflict. Responsively, the HA 1407 may make a decision which BU message to keep (2514) and include the selected BU message in a BC message (2516).

Figure 26:
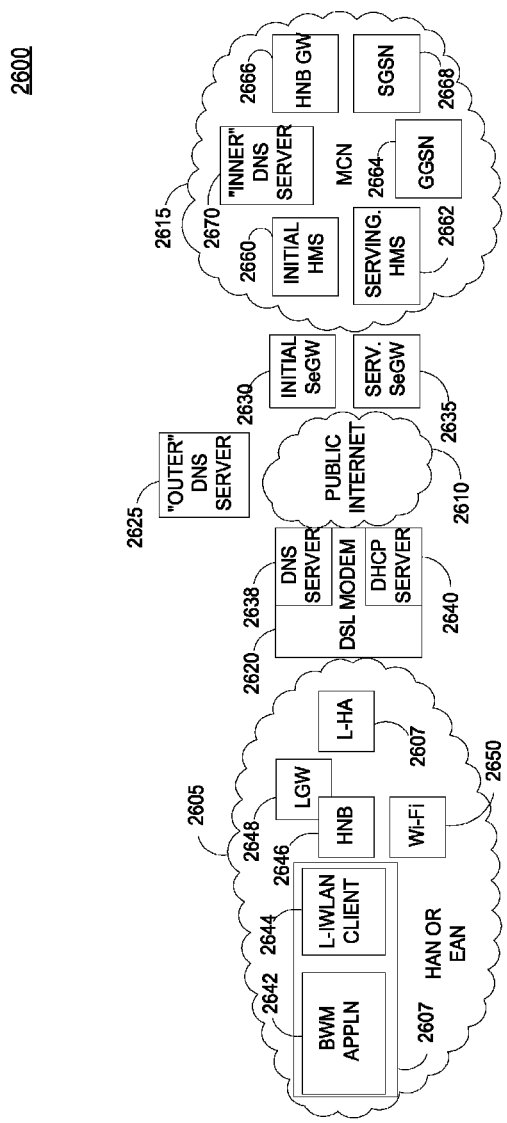
FIG. 26 is a block diagram illustrating an example of a communications system for performing BWM.

FIG. 26 is a block diagram illustrating an example of a communications system 2600 for performing bandwidth management ("BWM"). The communications system 2600 may include a home area network ("HAN") or enterprise area network ("EAN") (hereinafter HAN/EAN) 2605, a public internet 2610, an MCN 2615, a digital subscriber line ("DSL") (i.e., broadband) modem 2620, an outer domain name system ("DNS") server 2625, an initial SeGW 2630 and a serving SeGW 2635.

The DSL modem 2620 may include a DNS server 2638 for resolving domain names to IP addresses, and a dynamic host configuration protocol ("DHCP") server 2640 for assigning dynamic IP addresses. The HAN/EAN 2605 may include a WTRU having a BWM application 2642 that may run over and a local IWLAN ("L-IWLAN") client 2644 (e.g., a DSMIP based client). The HAN/EAN 2605 may also include an HNB 2646, a Wi-Fi AP connected to an AR (collectively "AP/AR") 2650, a local HA ("L-HA") 2607 and a local gateway ("LGW") 2648 (e.g., a local variant of a GGSN).

The MCN 2615 may include an initial home Node-B management system ("HMS") 2660, a serving HMS 2662, a GGSN 2664, a HNB GW 2666, an SGSN 2668 and an inner DNS server 2670. The outer DNS server 2625 and the inner DNS server 2670 may serve similar functions within the public internet 2610 and the MCN 2615, respectively. The initial serving SeGW 930 and the serving SeGW 935 may serve as security gateways.

A local IP access ("LIPA") or other local IP (collectively "local IP") connection may be set up, with direct tunnel establishment between an HNB 946 and an LGW 948. This may be implemented by a WTRU 2602 sending a PDP context request along with an access point name ("APN") to the SGSN 968, which resolves the APN to identify the LGW 948 (as a local GGSN) for the WTRU 2602 to connect to. Thereafter a direct tunnel between the HNB 946 and the LGW 948 may be established, bypassing the SGSN 968 (data path).

An IP connection may then be set up between the LGW 948 and the GGSN 964 of the MCN 2615 on the Gi interface. The WTRU 2702 may register with the L-HA 2707 using DSMIP procedures (e.g., as described in processes 1600-1800 of FIGS. 16-18 above). A Wi-Fi radio link may be set up by sending a BU message to the L-HA 2707 over an H1 interface (e.g., as described in processes 1600-1800 of FIGS. 16-18 above). The cellular and Wi-Fi links may be managed by sending BU and/or other DSMIP signaling messages between the WTRU 2702 and the L-HA 2707 (e.g., as described in processes 1600-2500 of FIGS. 16-25 above).

Alternatively, a split GTP tunnel may be set up between a WTRU 2702 and the SGSN 2668 via the L-HA 2707. The WTRU 2702 may be registered with the L-HA 2707 using DSMIP procedures (e.g., as described in processes 1600-1800 of FIGS. 16-18 above). A Wi-Fi radio link may also be set up and added by sending (e.g., a BU) message to the L-HA 2707 over an H1 interface. The cellular and Wi-Fi links may be managed by sending BU and/or other DSMIP signaling messages between the WTRU 2702 and the L-HA 2707 (e.g., as described in processes 1600-2500 of FIGS. 16-25 above).

Other processes may provide (e.g., BWM) control over movement of IP-flows and IP-sub flows among the various RATs of the communications systems disclosed herein. The BWM control may be provided by the WTRU or by the network. The BWM control may be performed at service level or at (network) policy level. Service-level application programming interfaces (APIs) may be used. Alternatively, network-level APIs and policy enforcing entities such as a PCRF of a MCN 2615 may be implemented. Additionally and/or alternatively, a single IP flow may be split into multiple IP sub flows, which may be transported over multiple simultaneous connections.

In one embodiment, IP flow splitting may be performed over the multiple access system of the communication system 2600. To facilitate the IP flow splitting, a multilink point-to-point protocol (PPP) may be implemented. In one embodiment, each IP-flow (or IP-sub flow) may be defined as a set of rules defining a routing filter in a binding cache and/or binding list, such as, for example, represented in the flow table 1500 of FIG. 15B.

The IP flow may be split, for example, into two IP sub-flows, with the IP sub-flows being defined alternating or other by a rule defining the distribution of the IP packets. Each of the IP sub-flows (as shown, e.g., in flow table 1500 as first and second (sub)flows 1506, 1510) may be defined by respective routing filters, and these filters may carry an encoded version of the rules, which may be processed by an L-HA 2652 to appropriately route the first and second sub flows 1506, 1510 to the CoA1 and CoA2.

FIGS. 27A-27K are block diagrams illustrating examples of communications systems 2700A-2700K in which one or more disclosed embodiments may be implemented and/or carried out. Any of the communications systems 2700A-2700K may be implemented as the HAN/EAN 2605 of FIG. 26. For simplicity of exposition, the communications systems 2700A-2700F are described with reference to the communication system 2600 of FIG. 26. The communications systems 2700A-2700K may be implemented in other communications systems, as well.

Figure 27A:
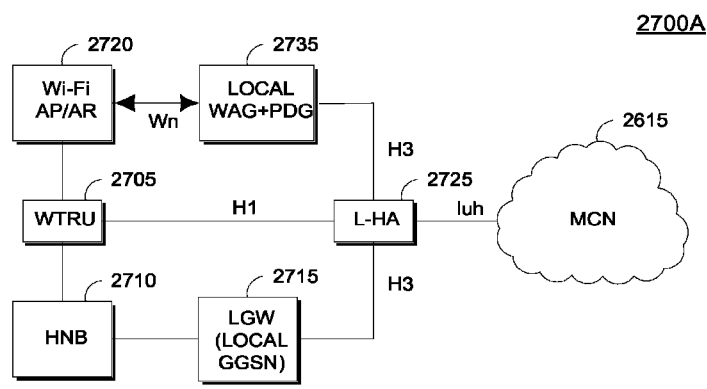
FIGS. 27A-27K are block diagrams illustrating examples of communications systems in which one or more disclosed embodiments may be implemented and/or carried out.

Referring to FIG. 27A, the communications system 2700A may define, for example, a femtocell and LGW-based I-WLAN architecture. The communications system 2700A may include a WTRU 2702, a HNB 2710, a LGW 2715, a Wi-Fi AP/AR 2720, an L-HA 2707 and a local WAG combined with a local PDG (collectively "WAG/PDG") 2735.

The WTRU 2702 may terminate cellular radio links to the HNB 2710 and Wi-Fi radio links with the Wi-Fi AP/AR 2720. The HNB 2710 may connect to the LGW 2715. The Wi-Fi AP/AR 2720 may connect to the local WAG/PDG 2735.

The Wi-Fi AP/AR 2720 and the local WAG/PDG 2735 may output IP packets, which may be transported to the L-HA 2707 via H3 interfaces. The L-HA 2707 may provide protocol conversion from IP to Iuh towards an MCN 2730. The L-HA 2707 may optionally support deep packet inspection ("DPI") capabilities to assist in steering of IP packets across the cellular and Wi-Fi links. The L-HA 2707 may also manage aggregation of IP flows from (i) the HNB 2710 and the LGW 2715, and (ii) the Wi-Fi AP/AR 2720 and the local WAG/PDG 2735. The HA 2707 may support mobility of IP flows over the cellular and Wi-Fi links, as well.

The L-HA 2707 may use the I-WLAN protocols, suitably modified for local application. Combined IP flows from the L-HA 2707 may be transported to the SeGW 2635 of the MCN 2615 via GTP tunnels, which may be secured within an IPSec tunnel. The physical medium may be the broadband link from the L-HA 2707 to the MCN 2615. The L-HA 2707 may encapsulate IP packets on the H1 interface to GTP packets on the Iuh interface, and vice versa. The L-HA 2707 may be controlled by an SGSN signaling plane of the MCN 2615.

Figure 27B:
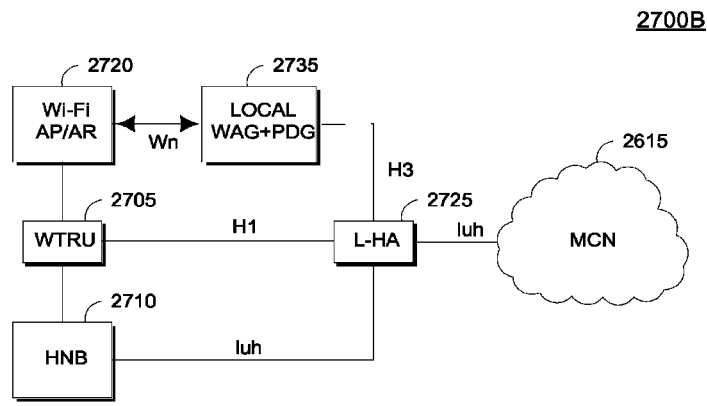

Referring now to FIG. 27B, a block diagram illustrating an example of the communications system 2700B is shown. The communications system 2700B may define, for example, a femtocell-based I-WLAN architecture. The communications system 2700B is similar to the communications system 2700A of FIG. 27A, except that the HNB 2710 may directly connect to the L-HA 2707 via an Iuh interface without using an LGW.

Figure 27C:
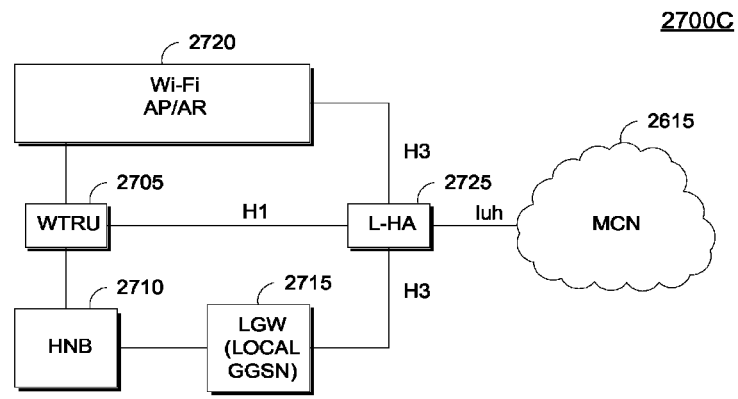

FIG. 27C is a block diagram illustrating an example of the communications system 2700C. The communications system 2700C may define, for example, a LGW-based I-WLAN architecture. The communications system 2700C is similar to the communications system 2700A of FIG. 27A, except that the Wi-Fi AP/AR 2720, as a trusted entity of the L-HA 2707, may directly connect to the L-HA 2707 via an H3 interface (e.g., without using a local WAG/PDG).

Figure 27D:
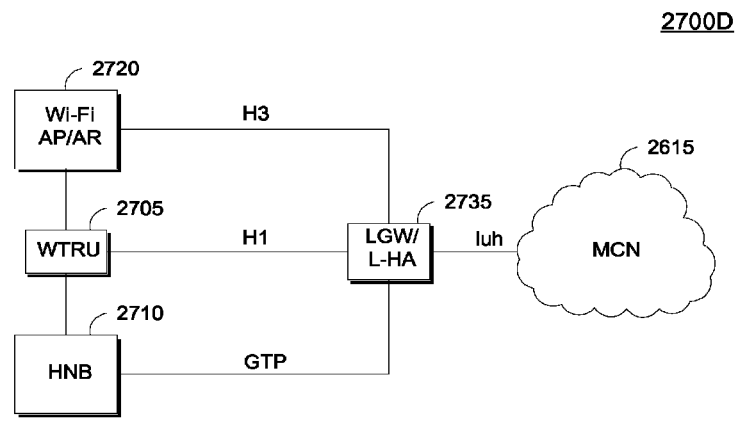

FIG. 27D is a block diagram illustrating an example of the communications system 2700D. The communications system 2700D may define a joint implementation of an LGW and L-HA ("LGW/L-HA") 2735 in an I-WLAN architecture. The LGW/L-HA 2735 may communicate with the WTRU 2702 via an H1 interface, with an HNB 2710 via a GTP interface, and with a Wi-Fi AP/AR 2720 via an H3 interface. The LGW/L-HA 2735 may also communicate with the MCN 2730 via an Iuh interface. The H3 interface may carry IP packets between the Wi-Fi AP/AR 2720 and LGW/L-HA 2735. The GTP interface may carry IP packets the HNB 2710 and the LGW/L-HA 2735. The WTRU 2702 and the L-HA 2707 may exchange signaling and user data transfer via the H3 interface (e.g., transported over IP connectivity provided by IWLAN or 3GPP access system). The Iuh interface may transport IP packets via GTP tunnels with the MCN 2615.

Figure 27E:
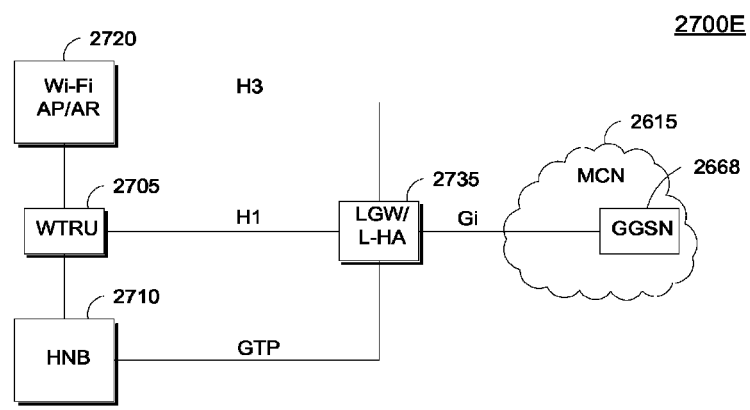

Referring now to FIG. 27E, a block diagram illustrating an example of the communications system 2700E is shown. The communications system 2700E may define an IWLAN architecture configured to bypass the SGSN 2668 of the MCN 2615. The communications system 2700E is similar to the communications system 2700D of FIG. 27D, except as described herein.

The LGW/L-HA 2735 may support a Gi interface to and operate as a Gi proxy for the GGSN 2664 in the MCN 2615. A packet data connection from the WTRU 2702 may terminate at the LGW/L-HA 2735 via a direct tunnel between the HNB 2710 and LGW/L-HA 2735. An IP connection may be established between the LGW/L-HA 2735 and GGSN 2664 through an IPSec tunnel between the LGW/L-HA 2735 and the SeGW 2635 of the MCN 2615.

Although not shown the FIGS. 27A-27E, SGSN functionality may be implemented within the HAN/EAN domains, for example, with in the various embodiments of the LGW. A LGW with SGSN functionality may limit, for example, user mobility related signaling traffic traverse the MCN 2615 and permit user mobility management within a large enterprise environment a LGW/LHA may manage multiple HNBs.

Figure 27F:
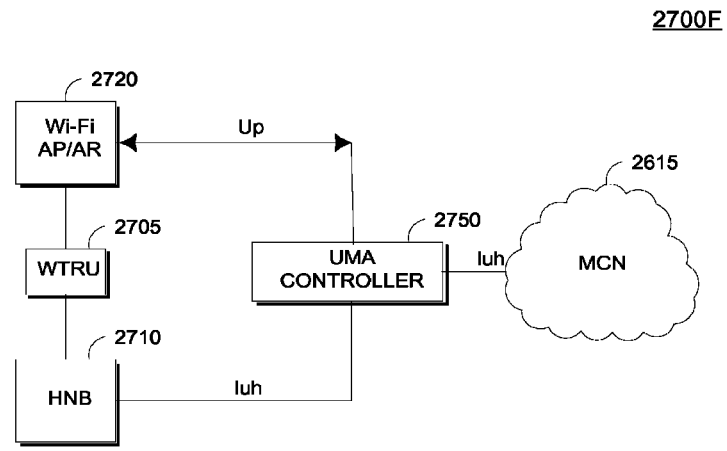

FIG. 27F is a block diagram illustrating an example of the communications system 2700F. The communications system 2700F may define an unlicensed mobile access ("UMA")-based femtocell BWM architecture. UMA or generic access network ("GAN") refers to 3GPP standardized solutions for accessing a cellular core network using unlicensed access, such as by a WLAN. The Wi-Fi AP/AR 2720 may access an MCN 2615 via a UMA or GAN controller 2750.

Although each of the communications systems 2700A-2700F as shown the FIGS. 27A-27E assume the MCN 2615 having a UTMS architecture. The communications systems 2700A-2700F may also be implemented with an MCN having an EPC architecture.

Figure 27G:
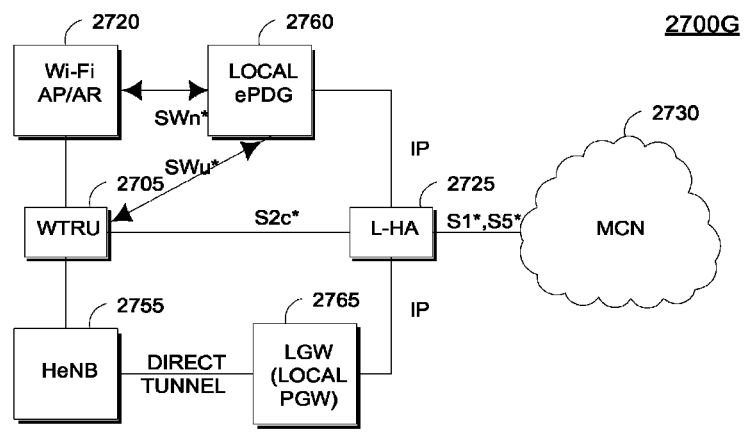

FIG. 27G is a block diagram illustrating an example of the communications system 2700F. The communications system 2700F may define a femtocell and LGW-based EPC architecture. The communications system 2700F may include the WTRU 2702, a HeNB 2755, a LGW 2765, a Wi-Fi AP/AR 2720, a L-HA 2707 and a local ePDG 2760.

The WTRU 2702 may terminate cellular radio links to the HeNB 2755 and Wi-Fi radio links with the Wi-Fi AP/AR 2720. The HeNB 2755 may connect to the LGW 2765, (e.g., a local PGW). The Wi-Fi AP/AR 2720 may connect to the local ePDG 2760 as an untrusted access by the L-HA 2707. An IPSec tunnel may be established between the WTRU 2702 and the local ePDG 2760 over the SWu* reference point. (Standard reference points are annotated with an asterisk (*) to indicate possible adaptations for local variants.)

The L-HA 2707 may provide protocol conversion from IP to S1 and/or S5 interfaces towards an MCN 2730. The L-HA 2707 may manage the aggregation of the IP flows from the HeNB 2755 and the LGW 2765, and from the Wi-Fi AP/AR 2720. The L-HA 2707 also may support mobility of IP flows between the cellular and Wi-Fi links.

The L-HA 2707 may use EPC IP mobility protocols, suitably modified for local application. Combined IP flows from the L-HA 2707 may be transported to a SeGW of the MCN 2730 via GTP tunnels. These GTP tunnels may be secured within an IPSec tunnel.

Figure 27H:
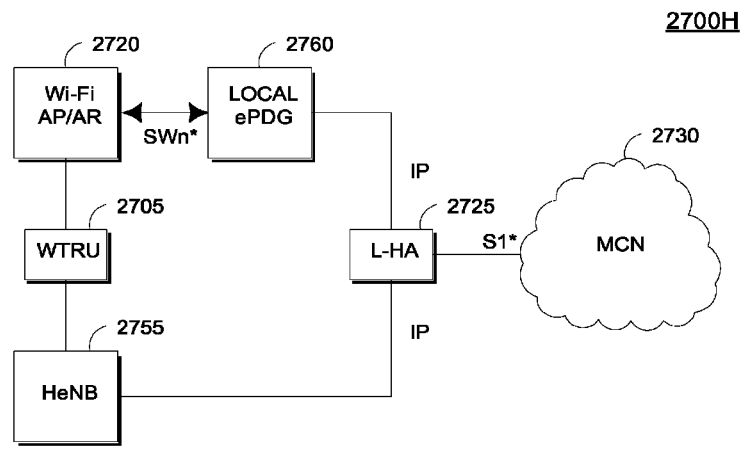

FIG. 27H is a block diagram illustrating an example of the communications system 2700H is shown. The communications system 2700H may define, for example, a femtocell-based EPC architecture 2700H that is similar to the communications system 2700G of FIG. 27G, except that there are no SWu or S2c interfaces, and the HeNB 2755 directly connects to the L-HA 2707 via an IP interface without using an LGW.

Figure 27I:
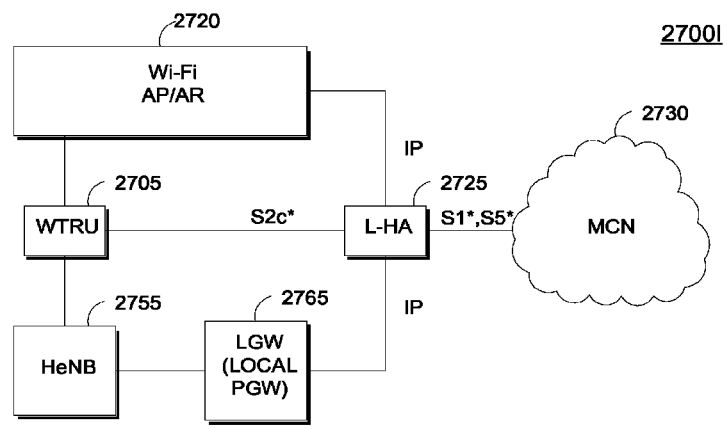

FIG. 27I is a block diagram illustrating an example of the communications system 2700I. The communications system 2700I may define, for example, an LGW-based EPC architecture 2700I. The communications system 2700I is similar to the communications system 2700G of FIG. 27G, except that the Wi-Fi AP/AR 2720 directly connects to the L-HA 2707 via an IP interface without using a local ePDG. In addition, the Wi-Fi access is considered as "trusted" and a local ePDG/IPSec tunnel might not be required toward the WTRU 2702.

Figure 27J:
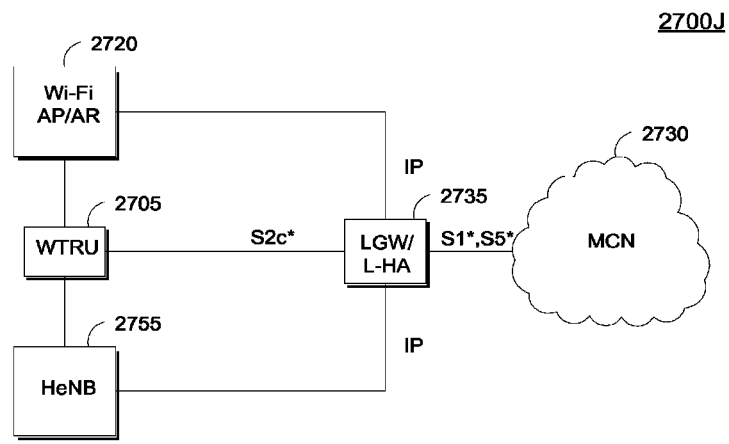

FIG. 27J is a block diagram illustrating an example of the communications system 2700J. The communications system 2700J may define a joint implementation LGW/L-HA 2735 in an EPC architecture. The LGW/L-HA 2735 may communicate with the WTRU 2702 via an S2c interface, and with the HeNB 2755 and the Wi-Fi AP/AR 2720 via respective IP interfaces. The LGW/L-HA 2735 may also communicate with the MCN 2730 via S1 and S5 interfaces.

Figure 27K:
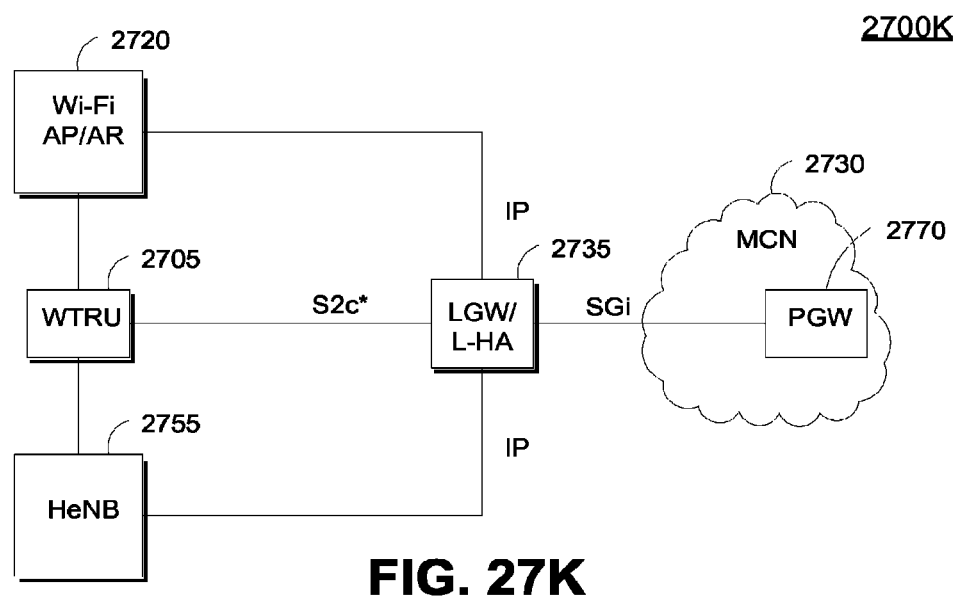

FIG. 27K is a block diagram illustrating an example of the communications system 2700K. The communications system 2700K may define an EPC architecture configured to bypass the SGW (not shown) of the MCN 2730. The communications system 2700K is similar to the communications system 2700J of FIG. 27J, except as described herein.

The LGW/L-HA 2735 may support a Gi interface to and operate as a Gi proxy for a PGW 2770 in the MCN 2730. A packet data connection from the WTRU 2702 may terminate at the LGW/L-HA 2735 via a direct tunnel between the HeNB 275 and LGW/L-HA 2735. An IP connection may be established between the LGW/L-HA 2735 and a PGW 2770 through an IPSec tunnel between the LGW/L-HA 2735 and the SeGW of the MCN 2730.

Although not shown the FIGS. 27G-27K, the SGW of the MCN 2730 may be moved to the HAN/EAN domains. This may may allow the HeNB 2755 and SGW to communicate without a direct tunnel, and may support implementation of alternatives for remote IP address ("RIPA"), local IP access ("LIPA") and selective IP traffic offloading ("SIPTO") connections.

In one embodiment, all three types of connections, RIPA, LIPA and SIPTO, traverse via the LGW. LGW may connect to the PGW 2770 using a SGi interface into the internet, and may operate as a SGi Proxy for RIPA. In one embodiment, the LIPA and SIPTO connections traverse via the LGW, and the RIPA traffic traverse via a local SGW.

Figure 28:
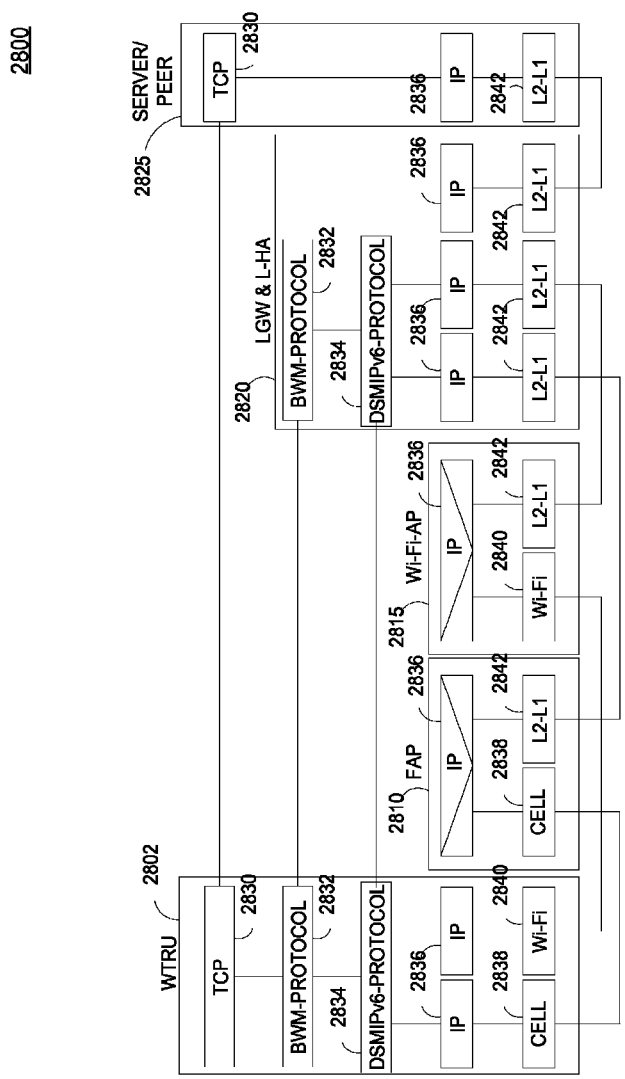
FIG. 28 is a block diagram illustrating protocols for providing any of BMW, BWA and/or IFOM in a communications system.

Referring now to FIG. 28, a block diagram illustrating protocols that may be used to provide any of BMW, BWA and IFOM in a communications system is shown. This communications system may be any of the communications systems disclosed herein as well as other applicable communications systems. For simplicity of exposition, the protocols of FIG. 28 are described with reference to a communications system 2800 including a WTRU 2802, a femtocell-based access point ("FAP") 2810, a Wi-Fi AP 2815, an LGW/L-HA entity 2820 and a server/peer 2825. The WTRU 2805 and the server/peer 2825 may include respective TCP layers 2830. The WTRU 2802 and the LGW/L-HA entity 2820 may include a BWM protocol layer 2832 and a DSMIP protocol layer 2834.

The BWM protocol layer 2832 may add a BWM protocol header. The BWM protocol header may include fields for defining the IP-flow, which may be mapped in FIDs as shown in the flow table of FIG. 15B. In one embodiment, the BWM protocol header may contain an FID, for instance. In one embodiment, the BWM protocol header may also include a sequence number, which may be used to implement an in-sequence delivery and retransmission protocol between the client and server BWM protocol layers 2832. When the BWM protocol layer 2832 includes sequence numbers, the partitioning of the IP flow from upper layers by the BWM protocol 2832 may be achieved in a "feed-forward" manner, (i.e., not having to inform the receiving BWM protocol 2832 about the specifics of the partitioning), and thus with low latency, (as compared to the case where a message sequence is involved regarding the partitioning). This may enable the IP-flow partitioning to be performed in a highly dynamic manner, (e.g., based on varying channel conditions on the access links).

The WTRU 2802, the FAP 2810, the Wi-Fi-AP 2815, the LGW/L-HA entity 2820 and the server/peer 2825 may include IP layers 2836. The WTRU 2805 and the FAP 2810 may also include a cellular layer 2838. The WTRU 1005 and the Wi-Fi-AP 1015 may also include a Wi-Fi layer 2840. The FAP 2810, the Wi-Fi AP 2815, the LGW/L-HA entity 2820 and the server/peer 2825 may include layer 1 (L1) and layer 2 (L2).

In one embodiment, flow splitting may be performed at the application layer. For example, it is known that file transfer protocols (FTPs) and hypertext transfer protocols (HTTPs) allow for fragmented delivery of a large file, by including the start and end points of the file to be delivered.

Referring to FIG. 15B, if a client wants to download a file of 1M bytes, an FTP client may send a request to an FTP server to download the first 100K bytes with a certain port number, which may map to FID1. The FTP client may send a second request to download the next 100K bytes via CoA2, (which may map to FID3). The FTP server may separately and simultaneously download these 100K byte segments to a multi-RAT FTP client. Upon receiving the 200K bytes, the FTP client may request that the next segment (e.g., 200K bytes), be downloaded by partitioning the next segment into N and M bytes across CoA1 and CoA2, where N and M may be determined by the quality of the links estimated by the previous transmission of 200K bytes, thus providing an adaptive scheme. The IP flow splitting techniques described above and the protocol architecture of FIG. 28 may be implemented for BW aggregation, as well.

Figure 29:
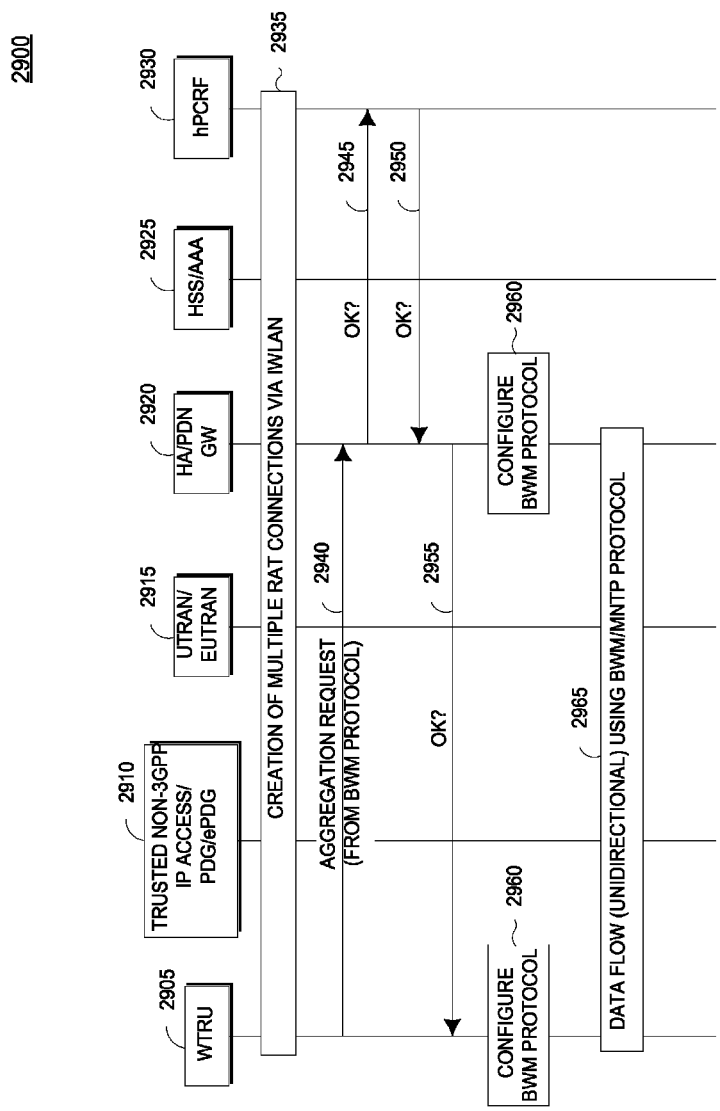
FIG. 29 is a flow diagram illustrating an example of a process for performing any of BMW, BWA and/or IFOM in a communications system.

FIG. 29 is a flow diagram illustrating an example of a procedure 2900 that may be implemented in a system including a WTRU 2905, a trusted non-3GPP IP access network/PDG/ePDG 2910, a UTRAN/eUTRAN 2915, an HA/PDN GW 2920, an HSS/AAA 2925 and an hPCRF 2930. Multiple RAT connections may be created by an I-WLAN (2935). The BWM protocol layer of the WTRU 2905 may send an aggregation request to the BWM protocol layer of the HA/PDN GW 2920 (2940). A BWM protocol may then be configured at the WTRU 2905 and the HA/PDN GW 2920 (2960), and a unidirectional data flow may be established using the BWM protocol and a multi-network transport protocol (MNTP).

Conclusion

In one embodiment, a method may include selecting, from a PDN connection formed through a plurality of access systems communicatively coupled with a WTRU, an access system over which to transport a flow of internet protocol ("IP") traffic to and/or from the WTRU; and sending, to the WTRU, a request to associate the flow of IP traffic with the selected access system.

In some embodiments, the method may further include associating, at an entity of the network, the flow of IP traffic with the selected access system. In some embodiments, the associating the flow of IP traffic with the selected access system may include associating, at an entity of the network, the flow of IP traffic with the selected access system responsive to an acceptance of the request.

In some embodiments, the method may include receiving, from the WTRU, an acknowledgement to the request. In some embodiments, the acknowledgement may include a rejection of the request. In some embodiments, the acknowledgement may include and/or be the acceptance of the request. In some embodiments, the method may include inferring, at the network entity, the acceptance of the request.

In some embodiments, sending the request to associate the flow of IP traffic with the selected access system may include sending the request to the WTRU via any of the plurality of access systems. In some embodiments, at least one access system of the plurality of access systems is configured in accordance with a protocol promulgated by any of the third generation partnership project ("3GPP"), the Institute of Electrical and Electronics Engineers ("IEEE") and Internet Engineering Task Force ("IETF").

In some embodiments, sending the request may include sending the request responsive to an event. In some embodiments, selecting an access system may include selecting the access system responsive to an event. In some embodiments, sending the request and selecting an access system may occur responsive to an event.

In some embodiments, the method may further include monitoring the network for the event. In some embodiments, the WTRU may communicatively couple with the plurality of access systems via a respective plurality of wireless links, and the method may further include monitoring any of the network and plurality of wireless links for the event. In some embodiments, monitoring any of the network and plurality of events may include monitoring any of the network, plurality of access systems and plurality of wireless links for the event.

In some embodiments, the method may further include monitoring the network for an event; generating a trigger responsive to detection of the event; and using the trigger to initiate any of selecting an access system and sending a request.

In some embodiments, the event may be and/or include a condition associated with any of the network and PDN connection. In some embodiments, the condition may include a measure of congestion. In some embodiments, the condition may include a measure of congestion. In some embodiments, the condition may include any of (i) a first measure of connectivity between the first access system and WTRU, and (ii) a second measure of connectivity between the second access system and WTRU. In some embodiments, the first measure of connectivity may include a first signal strength of the first wireless link, and wherein the second measure of connectivity may include a second signal strength of the second wireless link. In some embodiments, the first and second measures of connectivity comprise a measurement received from the WTRU.

In some embodiments, the request may be and/or include a binding update ("BU") message. In some embodiments, the BU message may include a home address associated with the WTRU for the PDN connection, a care of address associated with the WTRU, and a traffic selector associated with the flow of traffic. In some embodiments, the acknowledgment may be and/or include a binding acknowledgement ("BA") message. In some embodiments, the BA message may include the home address associated with the WTRU for the PDN connection, the care of address associated with the WTRU, and the traffic selector associated with the flow of traffic.

In some embodiments, the request may be and/or include a BU message, the acknowledgment may be and/or include a binding reject ("Rej-BU") message, and the Rej-BU message may include an indication of a reason for rejecting the BU message.

In some embodiments, the method may further include selecting, from the PDN connection, a second access system over which to transport the flow of IP traffic to and/or from the WTRU; and sending, to the WTRU, a second request to (i) associate the flow of IP traffic to the second selected access system, and (ii) de-associate the flow of IP traffic from the first selected access system. In some embodiments, the method may further include associating, at the network entity, the flow of IP traffic with the second selected access system; and de-associating, at the network entity, the flow of IP traffic from the first selected access system.

In some embodiments, the method may further include receiving, from the WTRU, a second acknowledgement to the second request. In some embodiments, the second request may be and/or include a second BU message, and the second acknowledgement may be and/or include a second BA message.

In some embodiments, the method may further include sending, to the WTRU, a second request to de-associate the flow of IP traffic and from the selected access system. In some embodiments, responsive to acceptance of the third request, de-associating, at the network entity, the flow of IP traffic from the selected access system.

In some embodiments, the method may further include awaiting a response to the request sent to the WTRU; receiving, from the WTRU, a second request to associate the flow of IP traffic with a second access system of the plurality of access systems; and responsive to a priority associated with the first request being subordinate to a priority associated with the second request, sending, to the WTRU, an acceptance of the second request.

In some embodiments, the method may further include awaiting a response to the request sent to the WTRU; receiving, from the WTRU, a second request to associate the flow of IP traffic with a second access system of the plurality of access systems; and responsive to a priority associated with the second request being subordinate to a priority associated with the first request, sending, to the WTRU, the request to associate the flow of IP traffic to the first selected access system.

In some embodiments, the method may further include awaiting a response to the request sent to the WTRU; receiving, from the WTRU, a second request to modify the first request; sending, to the WTRU, a third request comprising a modification to the first request; and receiving, in responsive to the third request, an acceptance of the third request. In some embodiments, the second request and the modification to the first request may be and/or include a request to associate the flow of IP traffic with a second access system of the plurality of access systems.

40. In some embodiments, the method may further include obtaining, at a network entity prior to sending the request, a token whose possession is required to send the request to associate to the WTRU. In some embodiments, the method may further include receiving, from the WTRU, a request for the token; and sending the token to the WTRU.

In some embodiments, the method may further include awaiting a response to the request sent to the WTRU; receiving, from the WTRU at a network entity of the network prior to receiving the response to the request, a second request to associate the flow of IP data with a second access system of the plurality of access systems; detecting, at the network entity, a collision between the first and second requests; and sending, to the WTRU responsive to the collision, an acceptance of the second request. In some embodiments, the method may further include receiving, from the WTRU in response to any of the second request and the acceptance of the request, an acceptance of the first request; and sending, to the WTRU in response to the acceptance of the second request, a confirmation of the acceptance of the first request.

In some embodiments, the method may further include receiving, from the WTRU, a second request to associate the flow of IP data with a second access system of the plurality of access systems; and sending, to the WTRU, an acceptance of the second request.

In some embodiments, the method may further include selecting, from the PDN connection, a second access system over which to transport a sub-flow of the flow of IP traffic to, from or to and from the WTRU; ands ending, to the WTRU, a second request to (i) associate the sub-flow with the second selected access system the second care-of address and (ii) de-associate such sub-flow from the first selected access system. In some embodiments, the method may further include associating, at the network entity, the sub-flow with the second selected access system; and de-associating, at the network entity, the sub-flow from the first selected access system. In some embodiments, the method may further include receiving, from the WTRU, a second acknowledgement to the second request. In some embodiments, the second request may be and/or include a second BU message. In some embodiments, the second acknowledgement may be and/or include a second binding acknowledgement message. In some embodiments, the method may further include sending, to the WTRU, information for reordering of packets to facilitate reconstruction of the flow of traffic.

In one embodiment, a method may include selecting, from a PDN connection formed via a plurality of access systems communicatively coupled with a WTRU, a first access system over which to transport a first sub-flow of a flow of IP traffic to and/or from the WTRU; selecting, from the PDN connection, a second access system over which to transport a second sub-flow of the flow of IP traffic to and/or from the WTRU; sending, to the WTRU, a request to associate the first sub-flow with the first selected access system, and to associate the second sub-flow with the second selected access system.

In some embodiments, the method may further include receiving, from the WTRU, an acknowledgement to the request. In some embodiments, the request may be and/or include a BU message, and the acknowledgement may be and/or include a BA message.

In one embodiment, a method may include receiving, at a WTRU, a request to associate a flow of IP traffic with an access system selected for transport of the flow of IP traffic to and/or from the WTRU, wherein the access system is selected from a PDN connection formed through a plurality of access systems communicatively coupled with the WTRU.

In some embodiments, the method may further include associating, at the WTRU, the flow of IP traffic with the selected access system. In some embodiments, the method may further include sending, to an entity of the network, an acknowledgement to the request. In some embodiments, the acknowledgement may be and/or include a rejection of the request. In some embodiments, the acknowledgement may be and/or include an acceptance of the request. In some embodiments, receiving a request to associate the flow of IP traffic with the selected access system may include receiving the request via any of the plurality of access systems.

In some embodiments, the selected access system may be selected responsive to an event. In some embodiments, the event may be and/or include a condition associated with any of the network and PDN connection.

In one embodiment, an apparatus may include memory adapted to store executable instructions; a processor adapted to execute the executable instructions to select, from a PDN connection formed through a plurality of access systems communicatively coupled with a WTRU, an access system over which to transport a flow of internet protocol ("IP") traffic to, from or to and from the WTRU; and a transmitter adapted to send, to the WTRU, a request to associate the flow of IP traffic with the selected access system. In some embodiments, the memory may be further adapted to store, in association, an identifier of the flow of IP traffic with a parameter associated with the selected access system. In some embodiments, the apparatus may further include a receiver adapted to receive, from the WTRU, an acknowledgement to the request. In some embodiments, the transmitter may be further adapted to send the request to the WTRU via any of the plurality of access systems.

In some embodiments, the processor may be further adapted to execute the executable instructions to select the access system, and the transmitter may be further adapted to send the request responsive to an event.

In one embodiment, a system may include a mobility agent adapted to (i) participate in forming a PDN connection through a plurality of access systems communicatively coupled with a WTRU, and (ii) select, from the plurality of access systems responsive to an event, an access system over which to transport a flow of IP traffic to and/or from the WTRU; a network monitor adapted to (i) monitor any of the network and PDN connection for the event, and (ii) cause the mobility agent to be notified of a detection of the event; and a transmitter adapted to send, to the WTRU, a request to associate the flow of IP traffic with the selected access system.

In some embodiments, the network monitor may be further adapted to monitor a plurality of wireless links, communicatively coupling the WTRU and plurality of access systems, for the event. In some embodiments, the system may further include a policy enforcement entity adapted to (i) receive, from the network monitor, a notification of a detection of an event; and (ii) notify the mobility agent of the detection of an event, wherein the network monitor is further adapted to send the notification to the policy enforcement entity. In some embodiments, the network monitor may be further adapted to (i) receive measurements from the WTRU, and (ii) monitor the measurements for the event.

In one embodiment, a method for performing BWM in a network comprising first and second access systems configured in accordance with cellular and WLAN access technologies, respectively, is provided. The method may include establishing a local IP (e.g., LIPA) connection via an access node of the first access system; establishing a direct tunnel between the access node and a LGW of the first access system; and establishing an IP connection between the LGW and a gateway of a MCN.

In some embodiments, establishing the LIPA connection may include establishing a first wireless link with a WTRU, and registering the WTRU with a L-HA in connection with the local IP connection; establishing a second wireless link with a access node of the second access system; adding the second wireless link to the local IP connection; and managing the first and second wireless links in connection with transport of traffic over the local IP connection.

In some embodiments, the access node of the first access system may be and/or include a home Node-B, the gateway of the MCN comprises a GGSN of the MCN, the access node of the second access system may be and/or include a WLAN access point, wherein the first wireless link comprises a cellular link, and the second wireless link may be and/or include a WLAN radio link. In some embodiments, establishing the IP connection may include establishing the IP connection between the LGW and the GGSN on a Gi interface. In some embodiments, the method may further include sending a packet data protocol (PDP) context request and an APN to a SGSN of the MCN. In some embodiments, the direct tunnel may bypass the SGSN on a data plane.

In some embodiments, adding the second wireless link may include sending a BU message to the L-HA. In some embodiments, sending the BU message may include sending the BU message to the L-HA over an H1 interface. In some embodiments, managing the first and second wireless links comprises any of (i) sending, from the L-HA to the WTRU, a BU message and receiving, at the L-HA from the WTRU, a responsive BA message, and (ii) receiving, at the L-HA from the WTRU, a BU message and sending, from the L-HA to the WTRU, a responsive BA messages.

In one embodiment, a method for performing bandwidth management ("BWM") in a network comprising first and second access systems configured in accordance with cellular and WLAN access technologies, respectively, is disclosed. The method may include establishing a first wireless link between a WTRU and an access node of the first access system; establishing a PDN connection using a split tunnel established between the WTRU and a SGSN of a MCN via a L-HA of the network; registering the WTRU with the L-HA in connection with the PDN connection; establishing a second wireless link with a access node of the second access system; adding the second wireless link to the PDN connection; and managing the first and second wireless links in connection with transport of traffic over the PDN connection.

In some embodiments, the split tunnel may be and/or include a split GTP tunnel. In some embodiments, adding the second wireless link may include sending a BU message to the L-HA. In some embodiments, sending a binding update message may include sending the BU message to the L-HA over an H1 interface.

In one embodiment, an apparatus may be configured to perform the method as in any of the foregoing BWM embodiments.

A system for performing BWM in a network comprising first and second access systems configured in accordance with cellular and WLAN access technologies, respectively, is disclosed. In one embodiment, the system may include a WTRU having a BWM application; a first access node of the first access system; a second access node of the second access system; a LGW of the network; a direct tunnel established between the second access node and the LGW; a local IP (e.g., a LIPA) connection established via the first access node and the second access node; a first wireless link between the WTRU and the first access node; a second wireless link between the WTRU and the second access node; an IP connection established between the LGW and a gateway of a MCN; and a L-HA of the network adapted to (i) register the WTRU therewith in connection with the local IP connection, and (ii) manage first and second wireless links.

In some embodiments, the system may further include a local WLAN access gateway ("WAG") in communication with the second access node and the L-HA. In some embodiments, the LGW and the L-HA may be formed as a single entity. In some embodiments, the L-HA may be further adapted to provide to the MCN any of ingress into and egress from the network.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

Variations of the method, apparatus and system described above are possible without departing from the scope of the invention. In view of the wide variety of embodiments that can be applied, it should be understood that the illustrated embodiments are exemplary only, and should not be taken as limiting the scope of the following claims. For instance, in the exemplary embodiments described herein include handheld devices, which may include or be utilized with any appropriate voltage source, such as a battery and the like, providing any appropriate voltage.

Moreover, in the embodiments described above, processing platforms, computing systems, controllers, and other devices containing processors are noted. These devices may contain at least one Central Processing Unit ("CPU") and memory. In accordance with the practices of persons skilled in the art of computer programming, reference to acts and symbolic representations of operations or instructions may be performed by the various CPUs and memories. Such acts and operations or instructions may be referred to as being "executed," "computer executed" or "CPU executed."

One of ordinary skill in the art will appreciate that the acts and symbolically represented operations or instructions include the manipulation of electrical signals by the CPU. An electrical system represents data bits that can cause a resulting transformation or reduction of the electrical signals and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to or representative of the data bits. It should be understood that the exemplary embodiments are not limited to the above-mentioned platforms or CPUs and that other platforms and CPUs may support the described methods.

The data bits may also be maintained on a computer readable medium including magnetic disks, optical disks, and any other volatile (e.g., Random Access Memory ("RAM")) or non-volatile (e.g., Read-Only Memory ("ROM")) mass storage system readable by the CPU. The computer readable medium may include cooperating or interconnected computer readable medium, which exist exclusively on the processing system or are distributed among multiple interconnected processing systems that may be local or remote to the processing system. It should be understood that the exemplary embodiments are not limited to the above-mentioned memories and that other platforms and memories may support the described methods.

No element, act, or instruction used in the description of the present application should be construed as critical or essential to the invention unless explicitly described as such. Also, as used herein, each of the articles "a" and "an" are intended to include one or more items. Where only one item is intended, the terms "a single" or similar language is used. Further, the terms "any of" followed by a listing of a plurality of items and/or a plurality of categories of items, as used herein, are intended to include "any of," "any combination of," "any multiple of," and/or "any combination of" multiples of the items and/or the categories of items, individually or in conjunction with other items and/or other categories of items. Further, as used herein, the term "set" is intended to include any number of items, including zero. Further, as used herein, the term "number" is intended to include any number, including zero.

Moreover, the claims should not be read as limited to the described order or elements unless stated to that effect. In addition, use of the term "means" in any claim is intended to invoke 35 U.S.C. §112, ¶6, and any claim without the word "means" is not so intended.

What is claimed is:

1. A method implemented in a local gateway (LGW) communicatively coupled with a gateway of a mobile core network via a reference point over which the LGW and the gateway use tunneling to exchange internet protocol ("IP") traffic, the method comprising:
   establishing a single packet data network ("PDN") connection with a wireless transmit/receive unit (WTRU) via a plurality of access systems, wherein the single PDN connection terminates at the LGW;
   selecting, from the plurality of access systems, first and second access systems over which to transport respective flows of the IP traffic to, from or to and from the WTRU;

sending, to the WTRU, at least one request to associate the first and second flows with the selected first and second access systems;

transporting the first flow, to, from or to and from the WTRU, via a first interface in a general packet radio service (GPRS) Tunneling Protocol (GTP) tunnel;

transporting the second flow, to, from or to and from the WTRU, via a second interface using IP connectivity;

performing protocol conversion to at least the second flow to facilitate exchange of one or more packets of the second flow to, from or to and from the gateway; and transporting, to, from or to and from the gateway, at least one of the converted one or more packets.

2. The method of claim 1, wherein selecting first and second access systems comprises: selecting either the first access system or the second access system responsive to an event.

3. The method of claim 2, wherein sending at least one request to associate the first and second flows with the first and second access systems comprises: sending the at least one request responsive to an event.

4. The method of claim 2, wherein the event comprises a condition associated with any of the plurality of access systems, the communicative coupling between the LGW and the gateway, the mobile core network, the WTRU, and the PDN connection.

5. The method of claim 2, further comprising: monitoring any of the plurality of access systems, the LGW, the gateway, the WTRU, the network mobile core for the event.

6. The method of claim 1, further comprising:
awaiting a response to the at least one request sent to the WTRU;
receiving, from the WTRU, a request to associate the first flow of IP traffic with the second access system;
interpreting the received request as a non-acknowledgment to the at least one request at least with respect to associating the first flow to the first access system; and
responsive to a priority associated with the at least one request being subordinate to a priority associated with the received request, sending, to the WTRU, a response indicating acceptance of the received request.

7. The method of claim 1, further comprising:
awaiting a response to the at least one request sent to the WTRU;
receiving, from the WTRU, a request to modify the at least one request;
sending, to the WTRU, another request comprising a modification to the at least one request; and
receiving a response indicating acceptance of the other request.

8. The method of claim 7, wherein the received request and the modification to the at least one request comprises a request to associate the second flow with the first access system.

9. The method of claim 1, further comprising: obtaining, at the LGW prior to sending the at least one request, a token whose possession is required to send the at least one request.

10. The method of claim 1, further comprising:
selecting the second access system to transport a sub-flow of the first flow to, from or to and from the WTRU; and
sending, to the WTRU, another request to (i) associate the sub-flow with the second access system and (ii) de-associate such sub-flow from the first access system.

11. The method of claim 10, further comprising: sending, to the WTRU, information for reordering of packets to facilitate reconstruction of the first flow.

12. The method of claim 1, further comprising: transporting, to, from or to and from the gateway, at least one packet of the first flow.

13. The method of claim 1, wherein transporting, to, from or to and from the gateway, at least one of the converted one or more packets comprises: transporting, to, from or to and from the gateway, at least one of the converted one or more packets and at least one packet of the first flow.

14. The method of claim 1, further comprising:
combining one or more packets from each of the first and second flows to form a combined flow; and
reordering at least one packet of the combined flow, wherein:
performing protocol conversion to at least the second flow comprises: performing protocol conversion to the combined flow to facilitate exchange of one or more packets of the combined flow to, from or to and from the gateway; and
transporting, to, from or to and from the gateway, at least one of the converted one or more packets comprises: transporting, to, from or to and from the gateway, at least one packet of the combined flow.

15. The method of claim 14, further comprising: performing deep packet inspection of GTP packets received on the first interface to identify the one or more packets of the first flow.

16. The method of claim 1, wherein the reference point supports a Iuh interface.

17. A local gateway (LGW) comprising a transmitter, a receiver and a processor, wherein:
the transmitter and receiver are configured to:
communicatively couple with a gateway of a mobile core network via a reference point over which the LGW and the gateway use tunneling to exchange internet protocol ("IP") traffic; and
establish a single packet data network ("PDN") connection with a wireless transmit/receive unit (WTRU) via a plurality of access systems, wherein the single PDN connection terminates at the LGW;
the processor is configured to select, from the plurality of access systems, first and second access systems over which to transport respective flows of the IP traffic to, from or to and from the WTRU;
the transmitter is configured to send, to the WTRU, at least one request to associate the first and second flows with the selected first and second access systems;
the transmitter and receiver are configured to:
transport the first flow, to, from or to and from the WTRU, via a first interface in a general packet radio service (GPRS) Tunneling Protocol (GTP) tunnel; and
transport the second flow, to, from or to and from the WTRU, via a second interface using IP connectivity;
the processor is configured to perform protocol conversion to at least the second flow to facilitate exchange of one or more packets of the second flow to, from or to and from the gateway; and
the transmitter and receiver are configured to transport, to, from or to and from the gateway, at least one of the converted one or more packets.

18. The LGW of claim 17, wherein selecting first and second access systems comprises: selecting either the first access system or the second access system responsive to an event, and wherein the event comprises a condition associated with any of the plurality of access systems, the communicative coupling between the LGW and the gateway, the mobile core network, the WTRU, and the PDN connection.

19. The LGW of claim 17, wherein:
the processor is configured to select the second access system to transport a sub-flow of the first flow to, from or to and from the WTRU; and
the transmitter and receiver are configured to send, to the WTRU, another request to (i) associate the sub-flow with the second access system and (ii) de-associate such sub-flow from the first access system.

20. The LGW of claim 17, wherein the transmitter and receiver are configured to transport, to, from or to and from the gateway, at least one packet of the first flow.

21. The LGW of claim 17, wherein:
the processor is configured to:
combine one or more packets from each of the first and second flows to form a combined flow;
reorder at least one packet of the combined flow; and
perform protocol conversion to the combined flow to facilitate exchange of one or more packets of the combined flow to, from or to and from the gateway; and
the transmitter and receiver are configured to transport, to, from or to and from the gateway, at least one packet of the combined flow.

22. The LGW of claim 21, wherein the processor is configured to: perform deep packet inspection of GTP packets received on the first interface to identify the one or more packets of the first flow.

23. The LGW of claim 17, wherein the reference point supports a Iuh interface.

\* \* \* \* \*